US012019947B2

(12) United States Patent
Qian et al.

(10) Patent No.: US 12,019,947 B2
(45) Date of Patent: Jun. 25, 2024

(54) PROJECTION METHOD AND SYSTEM

(71) Applicant: HUAWEI TECHNOLOGIES CO., LTD., Guangdong (CN)

(72) Inventors: Kai Qian, Shenzhen (CN); Weisong Nie, Xi'an (CN); Manjie Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/254,998

(22) PCT Filed: Nov. 29, 2021

(86) PCT No.: PCT/CN2021/134117
§ 371 (c)(1),
(2) Date: May 30, 2023

(87) PCT Pub. No.: WO2022/111701
PCT Pub. Date: Jun. 2, 2022

(65) Prior Publication Data
US 2024/0004603 A1 Jan. 4, 2024

(30) Foreign Application Priority Data
Nov. 30, 2020 (CN) .......................... 202011384624.X

(51) Int. Cl.
*G06F 3/14* (2006.01)
*G06F 3/01* (2006.01)
*G06F 3/0485* (2022.01)
(52) U.S. Cl.
CPC ............ *G06F 3/1454* (2013.01); *G06F 3/017* (2013.01); *G06F 3/0485* (2013.01)

(58) Field of Classification Search
None
See application file for complete search history.

(56) References Cited

U.S. PATENT DOCUMENTS

2012/0017147 A1* 1/2012 Mark ................... G06F 3/0346
715/848

FOREIGN PATENT DOCUMENTS

| CN | 102646012 A | 8/2012 |
| CN | 110719584 A | 1/2020 |

(Continued)

OTHER PUBLICATIONS

International Search Report and Written Opinion in International Appln. No. PCT/CN2021/134117, mailed on Feb. 15, 2022, 15 pages (with English translation).

*Primary Examiner* — Kenneth Bukowski
(74) *Attorney, Agent, or Firm* — Fish & Richardson P.C.

(57) ABSTRACT

Projection methods and systems are disclosed in this disclosure. In an implementation, a method includes: A first device that displays first content, detects a first gesture operation, and recognizes the detected first gesture operation, where the first gesture operation is a continuous and moving gesture operation; a second device detects the first gesture operation, and recognizes the detected first gesture operation, where the second device establishes a communication connection to the first device; if recognizing that the first gesture operation is a projecting gesture, the first device projects, to the second device, the first content displayed by the first device; and if recognizing that the first gesture operation is a projected gesture, the second device receives the first content projected by the first device, and displays the first content on the second device.

20 Claims, 29 Drawing Sheets

(56) References Cited

FOREIGN PATENT DOCUMENTS

| CN | 111176431 | A | 5/2020 |
|---|---|---|---|
| CN | 111897507 | A | 11/2020 |

\* cited by examiner (a)          (b)

PROJECTION METHOD AND SYSTEM

CROSS-REFERENCE TO RELATED APPLICATIONS

This application is a National Stage of International Application No. PCT/CN2021/134117, filed on Nov. 29, 2021, which claims priority to Chinese Patent Application No. 202011384624.X, filed on Nov. 30, 2020. Both of the aforementioned applications are hereby incorporated by reference in their entireties.

TECHNICAL FIELD

This application relates to the field of terminal technologies, and in particular, to a projection method and system.

BACKGROUND

With development of terminal technologies, projection technologies are widely used. Projection is to project screen content on one device to another device for display. For example, a video on a mobile phone is projected to a smart television for display, so that a user can watch the video on the mobile phone on the smart television with a larger screen.

In a related technology, projection needs to be triggered through a series of interface operations. Projection from a mobile phone to a smart television is used as example. If a user wants to project screen content on the mobile phone to the smart television, the user needs to first open a "Settings" menu of the mobile phone, and select a "Device connection" option in the "Settings" menu to enter a next-level menu. Then, the user selects a "Mobile phone projection" option in the next-level menu, to trigger the mobile phone to search for a device in a same local area network as the mobile phone and display a device identifier of a found device. Next, the user selects one device identifier from device identifiers displayed on the mobile phone, to trigger the mobile phone to project the screen content to a device identified by the device identifier.

In the foregoing projection manner, projection needs to be triggered through a series of interface operations. Consequently, projection operations are complex, and projection efficiency and flexibility are low.

SUMMARY

This application provides a projection method and system, to resolve problems that projection operations are complex, and projection efficiency and flexibility are low in a related technology.

To achieve the foregoing objective, this application uses the following technical solutions.

According to a first aspect, a projection method is provided. The projection method is applied to a projection system, and the projection system includes a first device and a second device. The projection method includes the following steps.

The first device displays first content, and in a process of displaying the first content, the first device detects a first gesture operation, and recognizes the detected first gesture operation; the second device detects the first gesture operation, and recognizes the detected first gesture operation; if recognizing that the first gesture operation is a projecting gesture, the first device projects, to the second device, the first content displayed by the first device; and if recognizing that the first gesture operation is a projected gesture, the second device receives the first content projected by the first device, and displays the first content on the second device.

In this way, a user performs a projection gesture near the first device and the second device, to quickly trigger the first device to project screen content to the second device, thereby improving projection efficiency and flexibility, and increasing projection manners.

It should be noted that the first content is the screen content displayed by the first device. The first content may include a multimedia file playback interface, a video call interface, a voice call interface, a display interface of an application, a home screen of a device, or the like. This is not limited in embodiments of this application. A multimedia file may include a video, audio, an image, a text, or the like. This is also not limited in embodiments of this application.

When the first device displays the first content, if the user wants to project the first content of the first device to the second device to view the first content via the second device, the user may perform a specific first gesture operation near the first device and the second device, and use the specific first gesture operation to trigger the first device to perform projection.

The first gesture operation may be a static gesture or a dynamic gesture. The static gesture is a posture of a gesture. The dynamic gesture includes the posture and an action of the gesture, for example, a continuous and moving gesture. For example, the first gesture operation may be a gesture in which a palm faces the user and moves away from the user, a gesture in which a palm faces the user and moves closer to the user, a gesture in which a palm faces the ground and moves away from the user, a gesture in which a palm faces the ground and moves closer to the user, or the like.

The projecting gesture is a gesture obtained by collecting the specific first gesture operation from a perspective of the first device, and is used to trigger the first device to perform projection. The projected gesture indicates a gesture obtained by collecting the specific first gesture operation from a perspective of the second device, and is used to trigger the second device to accept projection performed by the first device. For example, the projected gesture is a gesture whose hand posture and/or action are/is opposite to that of the projecting gesture.

The projecting gesture and the projected gesture are preset specific gestures, and may be preset by the first device by default, or may be manually set by the user as required. A setting manner of the projecting gesture and the projected gesture is not limited in embodiments of this application. In addition, the projecting gesture and the projected gesture may be static gestures, or may be dynamic gestures.

In an example, the projecting gesture is a gesture in which a palm faces the first device and moves away from the first device, and the projected gesture is a gesture in which a back of a hand faces the second device and moves closer to the second device. Alternatively, the projecting gesture is a gesture in which a palm faces the ground and a thumb faces the first device, and they move away from the first device, and the projected gesture is a gesture in which the palm faces the ground and a little finger faces the first device, and they move away from the first device. Certainly, the projecting gesture may alternatively be set to another gesture. This is not limited in embodiments of this application.

The first device may be configured with a gesture collection module, and detect a gesture operation of the user by using the gesture collection module. Optionally, the gesture collection module may be a photographing assembly, a sound wave sensor, or the like. For example, the first device may capture, by using the photographing assembly, an image including the first gesture operation, and then perform image analysis on the image captured by using the photographing assembly, to obtain a gesture recognition result.

In addition, the second device may also be configured with a gesture collection module, and detect the gesture operation of the user by using the gesture collection module. Optionally, the gesture collection module may be a photographing assembly, a sound wave sensor, or the like. For example, the second device may capture, by using the photographing assembly, an image including the first gesture operation, and then perform image analysis on the captured image to obtain a gesture recognition result.

In a possible implementation, the first device or the second device may perform image analysis on the captured image by using an AI technology, to obtain a gesture recognition result. For example, recognition processing may be performed on the captured image by using a pre-trained gesture recognition model, to obtain a gesture recognition result. The gesture recognition model is used to recognize a projecting gesture or a projected gesture in an image. The gesture recognition model may be a machine learning model, for example, a neural network model.

The gesture recognition result obtained by the first device by recognizing the detected first gesture operation may include whether the first gesture operation is the projecting gesture. Optionally, if the detected first gesture operation is the projecting gesture, the gesture recognition result may further include one piece of the following information: a movement direction and a movement distance of the first gesture operation. The movement distance may be a track length of a moving track, or may be a straight-line distance of a moving track. This is not limited in embodiments of this application.

It should be noted that the movement distance of the first gesture operation in embodiments of this application may be a movement distance of the first gesture operation relative to a gesture start location, may be a movement distance of the first gesture operation relative to the first device, or may be a movement distance of the first gesture operation relative to the second device. This is not limited in embodiments of this application.

The gesture recognition result obtained by the second device by recognizing the detected first gesture operation may include whether the first gesture operation is the projected gesture. Optionally, if the detected first gesture operation is the projected gesture, the gesture recognition result may further include one piece of the following information: a movement direction and a movement distance of the first gesture operation.

If the first device recognizes that the first gesture operation is the projecting gesture, the first device may be triggered to perform projection on the first content displayed by the first device. If the second device recognizes that the first gesture operation is the projected gesture, the second device may be triggered to wait to receive first content projected by another device. For example, if the first content projected by the first device is received, the first content can be displayed.

In an example, that the first device projects, to the second device, the first content displayed by the first device may include the following several projection manners.

Projection manner 1: The first device performs screen recording on the first content displayed by the first device, and sends screen recording data to the second device.

Projection manner 2: The first device obtains streaming media data of the first content displayed by the first device, and sends the streaming media data to the second device. The streaming media data is streaming media data of a multimedia file displayed by the first device, and may be obtained by performing streaming media data conversion on the multimedia file displayed by the first device.

Projection manner 3: The first device obtains content-related information of the first content displayed by the first device, and sends the content-related information to the second device, so that the second device displays the first content indicated by the content-related information.

The content-related information of the first content is used to indicate the first content displayed by the first device. For example, if the first content displayed by the first device is the multimedia file playback interface, the content-related information includes at least a link address of the multimedia file. If the first content displayed by the first device is a video call interface, the content-related information indicates that call transfer information of a video call is included.

It should be noted that projection manner 3 is a new projection manner according to embodiments of this application. In this projection manner, neither screen recording nor streaming media data conversion is required. In addition, a data amount of the sent content-related information is far less than a data amount of the screen recording data and a data amount of the streaming media data. Therefore, in this projection manner, a calculation amount is small, and a transmitted data amount is also small, thereby improving projection efficiency, reducing a delay in a projection process, and improving projection experience.

In an example, the operation that the first device obtains content-related information of the first content displayed by the first device, and sends the content-related information to the second device may include the following several cases.

Case 1: If the first device is playing the multimedia file, the first device obtains file-related information of the multimedia file, and sends the file-related information of the multimedia file to the second device.

The multimedia file may include a video, audio, a text, an image, or the like. The file-related information of the multimedia file includes at least the link address of the multimedia file. Optionally, the file-related information of the multimedia file may further include playback progress information of the multimedia file. The playback progress information is used to indicate playback progress of the multimedia file, and may be current playback time of the multimedia file, or the like.

Case 2: If the first device is making the video call, the first device obtains the call transfer information of the video call, and sends the call transfer information to the second device.

The call transfer information of the video call is used to transfer the video call of the first device to the second device. The call transfer information of the video call may include a video call identifier. A video call identifier such as a video call ID is used to uniquely identify a current video call.

In an example, that the second device receives the first content projected by the first device, and displays the first content on the second device may include the following several implementations.

Implementation 1: The second device receives the screen recording data sent by the first device, and plays the screen recording data. The screen recording data is obtained by the first device by performing screen recording on a display screen of the first device.

Implementation 2: The second device receives the streaming media data of the first content sent by the first device, and plays the streaming media data.

Implementation 3: The second device receives the content-related information sent by the first device, and displays the first content based on the content-related information, where the content-related information is used to indicate the first content displayed by the first device.

In an example, the operation that the second device displays the first content based on the content-related information includes the following several cases.

Case 1: If the content-related information is the file-related information of the multimedia file being played by the first device, and the file-related information includes at least the link address of the multimedia file, the second device obtains the multimedia file based on the link address, and plays the obtained multimedia file.

In a possible implementation, if the file-related information of the multimedia file further includes the playback progress information of the multimedia file, after the second device obtains the multimedia file based on the link address, the second device may further start to play, based on the playback progress information, the multimedia file from playback progress indicated by the playback progress information.

Case 2: If the content-related information is the call transfer information of the video call being performed by the first device, the second device transfers the video call of the first device to the second device based on the call transfer information, and displays a video call interface obtained after call transfer.

The second device may transfer, to the second device based on the video call identifier in the call transfer information, a video call indicated by the video call identifier, so that the user can directly continue the current video call by using the second device.

In a possible implementation, before projecting the first content to the second device, the first device may further first establish a communication connection to the second device, to project the first content to the second device through the established communication connection.

It should be noted that establishment of a communication connection between the first device and the second device may be triggered by the user by performing an interface operation on the first device or the second device, or may be automatically performed by the first device or the second device. This is not limited in embodiments of this application. For example, the first device may automatically establish the communication connection to the second device after a gesture projection function is enabled, or the first device may automatically establish the communication connection to the second device after recognizing a projecting gesture.

In a possible implementation, before projecting the first content of the first device to the second device, the first device may further first send a handshake request to the second device. The handshake request is used to request to establish a communication connection to the second device. The second device receives the handshake connection sent by the first device, and sends a handshake confirmation message to the first device based on the handshake connection. The handshake confirmation message is used to indicate that the communication connection between the first device and the second device is successfully established. After receiving the handshake confirmation message sent by the second device, the first device may project the first content of the first device to the second device through the communication connection.

Optionally, the handshake request may carry projection indication information. The projection indication information is used to indicate that the first device detects a projecting gesture. After receiving the handshake request, the second device may first determine whether the projection indication information matches the gesture recognition result of the second device. If the projection indication information matches the gesture recognition result of the second device, handshake confirmation is performed, and the handshake confirmation message is sent to the first device.

After the projecting gesture is recognized, the first device automatically establishes a communication connection to the second device in a handshake confirmation manner, so that a manual connection operation of the user can be saved, a projection operation can be further simplified, projection efficiency is improved, and better projection experience is provided for the user.

In a possible implementation, after recognizing the detected first gesture operation, the first device may further send a recognition result of the first gesture operation to the second device, to synchronize the recognition result of the first gesture operation by the first device to the second device. The second device may receive the recognition result that is of the first gesture operation and that is sent by the first device. For example, the first device sends the recognition result of the first gesture operation to the second device through the established communication connection. The second device receives, through the established communication connection, the recognition result that is of the first gesture operation and that is sent by the first device.

In a possible implementation, the projecting, to the second device, the first content displayed by the first device includes: The first device gradually moves out the first content from a side of the display screen of the first device in a moving process of the first gesture operation. A moving-out proportion of the first content from the display screen of the first device is associated with a movement distance of the first gesture operation.

In an example, the side that is of the display screen of the first device and from which the first content is moved out may be set by default, for example, the side is set by default to an upper side, a lower side, a left side, or a right side of the display screen, or is set by default to a side that is of the display screen and that is close to the second device. In another example, the side that is of the display screen and from which the first content is moved out may alternatively be determined based on a movement direction of the first gesture operation. Certainly, the side may alternatively be determined in another manner. This is not limited in embodiments of this application.

In a possible implementation, the first content of the first device may be gradually moved out from the side of the display screen in a manner of gradually increasing the moving-out proportion. The moving-out proportion is a proportion of a part of the first content moved out of the display screen to an entire part of the first content.

In an example, the operation that the first device gradually moves out the first content from a side of a display screen of the first device in a moving process of the first gesture operation may include the following two implementations.

Implementation 1: The first device gradually moves out the first content from the side of the display screen based on a change of the movement distance of the first gesture operation.

The first device may determine the movement distance of the first gesture operation in the moving process of the first gesture operation, and determine, based on the movement distance of the first gesture operation and a prestored mapping relationship between a movement distance of the first gesture operation and a moving-out proportion of the first content from the display screen of the first device, the moving-out proportion of the first content from the display screen of the first device, to gradually move out the first content from the side of the display screen based on the determined moving-out proportion.

The moving-out proportion of the first content from the display screen of the first device is the proportion of the part of the first content moved out of the display screen of the first device to the entire part of the first content.

In addition, in the moving process of the first gesture operation, the movement distance of the first gesture operation may be determined in real time or periodically. This is not limited in embodiments of this application.

In embodiments of this application, the mapping relationship between a movement distance of the first gesture operation and a moving-out proportion of the first content from the display screen of the first device may be preset. The mapping relationship is used to indicate correspondences between different movement distances and different moving-out proportions, and a larger movement distance indicates a larger moving-out proportion. In addition, a maximum moving-out proportion may be 100%, indicating that the first content is completely moved out of the display screen.

It should be noted that a mapping relationship between a movement distance of the first gesture operation and a moving-out proportion may be implemented by using a correspondence, or may be implemented by using a formula. This is not limited in embodiments of this application. For example, a mapping relationship between a movement distance and a moving-out proportion may be a correspondence between a movement distance and a moving-out proportion, a correspondence between a movement distance range and a moving-out proportion, or a first mapping relationship formula. The first mapping relationship formula is used to indicate the mapping relationship between a movement distance and a moving-out proportion.

In a possible implementation, the first device may determine, based on the movement distance of the first gesture operation and a prestored correspondence between a movement distance range and a moving-out proportion, a moving-out proportion of the first content from a side of the display screen; and the first device moves out the first content from the side of the display screen based on the moving-out proportion.

In a possible implementation, the side that is of the display screen and from which the first content is moved out may further be determined based on the movement direction of the first operation gesture. For example, a mapping relationship between a movement direction and each side of the display screen may be preset, and the side that is of the display screen and from which the first content is moved out is determined based on the mapping relationship.

In an example, before the first content is gradually moved out from the side of the display screen, the movement direction of the first gesture operation is first determined, and then based on the movement direction of the first gesture operation and a prestored correspondence between a movement direction of the first gesture operation and each side of the display screen, the side that is of the display screen and from which the first content is moved out is determined. In this way, flexibility of the projection manner can be further improved, and better user experience can be provided for the user.

Implementation 2: The first device gradually moves out the first content from the side of the display screen based on a time change.

After it is detected that the first device starts projection, the first device may be triggered to gradually move out the first content from the side of the display screen based on the time change. Certainly, it may alternatively be triggered at another occasion that the first content is gradually moved out from the side of the display screen. This is not limited in embodiments of this application.

In a possible implementation, when a projecting gesture is recognized, or the first content is successfully sent to the second device, or a projection success response from the second device is received, it may be determined that the first device starts projection, to trigger that the first content is gradually moved out from the side of the display screen.

In an example, after the first device detects that the first device starts projection, the first device may determine duration between a current time point and a projection start time point, and gradually moves out the first content from the side of the display screen based on the duration.

In other words, after projection is started, the first device may gradually move out the first content from the side of the display screen with time. Alternatively, within preset duration after projection is started, the first content is gradually moved out from the side of the display screen with time.

In a possible implementation, the moving-out proportion of the first content from the display screen may be determined based on the duration and a mapping relationship between duration and a moving-out proportion of the first content from the display screen, so that the first content is moved out from the side of the display screen based on the determined moving-out proportion. The mapping relationship between duration and a moving-out proportion of the first content from the display screen may be implemented by using a correspondence, or may be implemented by using a formula. This is not limited in embodiments of this application.

In a possible implementation, after receiving the first content projected by the first device, the second device may gradually move in the first content projected by the first device to a display screen, and then perform projection display based on the first content completely moved into the display screen, to implement a visual effect of projecting the first content from the first device to the second device based on a projecting gesture, and provide better projection experience for the user.

In a possible implementation, the first content may be gradually moved in from a side of the display screen of the second device. In an example, the side that is of the display screen and from which the first content is moved in may be set by default, for example, the side is set by default to an upper side, a lower side, a left side, or a right side of the display screen, or is set by default to a side that is of the display screen and that is close to the first device. In another example, the side that is of the display screen and from which the first content is moved in may alternatively be determined based on a movement direction of the first gesture operation. Certainly, the side may alternatively be determined in another manner. This is not limited in embodiments of this application.

For example, before gradually moving in the first content from the side of the display screen of the second device, the second device may determine the movement direction of the first gesture operation, and then determine, based on the movement direction of the first gesture operation and a prestored mapping relationship between a movement direction of the first gesture operation and each side of the display screen of the second device, the side that is of the display screen of the second device and from which the first content is moved in.

In a possible implementation, the first content may be gradually moved in from the side of the display screen of the second device in a manner of gradually increasing a moving-in proportion. The moving-in proportion is a proportion of a part of the first content moved into the display screen to the entire part of the first content.

In an example, the operation that the second device gradually moves in the first content from a side of the display screen of the second device may include the following two implementations.

Implementation 1: The second device gradually moves in the first content from the side of the display screen based on a change of the movement distance of the first gesture operation.

In the moving process of the first gesture operation, the movement distance of the first gesture operation may be determined, so that the first content is gradually moved in from the side of the display screen based on the movement distance of the first gesture operation.

In an example, the moving-in proportion of the first content to the display screen of the second device is associated with the movement distance of the first gesture operation. The moving-in proportion of the first content to the display screen of the second device is a proportion of a part of the first content moved into the display screen of the second device to the entire part of the first content.

In other words, a mapping relationship between a movement distance of the first gesture operation and a moving-in proportion of the first content to the display screen of the second device may be preset. The mapping relationship is used to indicate correspondences between different movement distances and different moving-in proportions, and a larger movement distance indicates a larger moving-in proportion. In addition, a maximum moving-in proportion may be 100%, indicating that the first content is completely moved into the display screen.

It should be noted that a mapping relationship between a movement distance and a moving-in proportion may be implemented by using a correspondence, or may be implemented by using a formula. This is not limited in embodiments of this application. For example, the mapping relationship between a movement distance and a moving-in proportion may be a correspondence between a movement distance and a moving-in proportion, a correspondence between a movement distance range and a moving-in proportion, or a third mapping relationship formula. The third mapping relationship formula is used to indicate the mapping relationship between a movement distance and a moving-in proportion.

In the moving process of the first gesture operation, the second device may determine the movement distance of the first gesture operation relative to the second device. Based on the movement distance of the first gesture operation relative to the second device and a prestored mapping relationship between a movement distance of the first gesture operation relative to the second device and a moving-in proportion of the first content to the display screen of the second device, the moving-in proportion of the first content to the display screen of the second device is determined, so that the first content is subsequently moved in from the side of the display screen of the second device based on the determined moving-in proportion.

Optionally, before gradually moving in the first content from the side of the display screen of the second device, the second device may further first determine the movement direction of the first gesture operation, and determine, based on the movement direction of the first gesture operation and a prestored correspondence between a movement direction of the first gesture operation and each side of the display screen, the side that is of the display screen and from which the first content is moved in.

Implementation 2: The first content is gradually moved in from the side of the display screen based on a time change.

After the second device receives the first content projected by the first device, the second device may be triggered to gradually move in the first content from the side of the display screen based on a time change. For example, within preset duration after the first content projected by the first device is received, the first content may be gradually moved in from the side of the display screen with time.

In a possible implementation, after receiving the first content projected by the first device, the second device may determine duration between a current time point and a time point at which the first content is received. Then, the first content is gradually moved into the display screen from the side of the display screen based on the duration.

In an example, a mapping relationship between duration and a moving-in proportion may be preset. After the first content projected by the first device is received, the moving-in proportion of the first content is determined based on the duration and a stored mapping relationship between duration and a moving-in proportion, and then the first content is gradually moved in from the side of the display screen based on the moving-in proportion.

The mapping relationship between duration and a moving-in proportion may be implemented by using a correspondence, or may be implemented by using a formula. This is not limited in embodiments of this application. For example, the mapping relationship may be a correspondence between duration and a moving-in proportion, a correspondence between a duration range and a moving-in proportion, or a fourth mapping relationship formula. The fourth mapping relationship formula is used to indicate correspondences between different pieces of duration and different moving-in proportions.

In a possible implementation, the second device may determine the moving-in proportion of the first content based on the duration between the current time point and the time point at which the first content is received and the correspondence between a stored duration range and a moving-in proportion, and then gradually move in the first content from the side of the display screen to the display screen based on the moving-in proportion.

According to a second aspect, a projection apparatus is provided. The projection apparatus has a function of implementing behavior of the projection method performed by the first device in the first aspect. The projection apparatus includes at least one module. The at least one module is configured to implement the projection method perform by the first device in the first aspect.

According to a third aspect, a projection apparatus is provided. The projection apparatus has a function of implementing the projection method performed by the second device in the first aspect. The projection apparatus includes at least one module. The at least one module is configured to implement the projection method perform by the second device in the first aspect.

According to a fourth aspect, an electronic device is provided. A structure of the electronic device includes a processor and a memory. The memory is configured to store a program that supports a projection apparatus in performing the projection method performed by the first device in the first aspect, and store related data used to implement the projection method performed by the first device in the first aspect. The processor is configured to execute the program stored in the memory. The electronic device may further include a communication bus, and the communication bus is configured to establish a connection between the processor and the memory.

According to a fifth aspect, an electronic device is provided. A structure of the electronic device includes a processor and a memory. The memory is configured to store a program that supports a projection apparatus in performing the projection method performed by the second device, and store related data used to implement the projection method performed by the second device in the first aspect. The processor is configured to execute the program stored in the memory. The electronic device may further include a communication bus, and the communication bus is configured to establish a connection between the processor and the memory.

According to a sixth aspect, a computer-readable storage medium is provided. The computer-readable storage medium stores instructions. When the instructions are run on a computer, the computer is enabled to perform the projection method performed by the first device in the first aspect.

According to a seventh aspect, a computer-readable storage medium is provided. The computer-readable storage medium stores instructions. When the instructions are run on a computer, the computer is enabled to perform the projection method performed by the second device in the first aspect.

According to an eighth aspect, a computer program product including instructions is provided. When the computer program product runs on a computer, the computer is enabled to perform the projection method performed by the first device in the first aspect.

According to a ninth aspect, a computer program product including instructions is provided. When the computer program product runs on a computer, the computer is enabled to perform the projection method performed by the second device in the first aspect.

According to a tenth aspect, a chip is provided. The chip includes at least one processor. The at least one processor is coupled to a communication interface. The at least one processor is configured to run a computer program or an instruction stored in a memory, to implement the projection method performed by the first device in the first aspect. The communication interface is configured to perform communication with another module other than the chip.

According to an eleventh aspect, a chip is provided. The chip includes at least one processor. The at least one processor is coupled to a communication interface. The at least one processor is configured to run a computer program or an instruction stored in a memory, to implement the projection method performed by the second device in the first aspect. The communication interface is configured to perform communication with another module other than the chip.

According to a twelfth aspect, a projection system is provided, including a first device and a second device, where the first device is configured to implement the projection method performed by the first device in the first aspect, and the second device is configured to implement the projection method performed by the second device in the first aspect.

Technical effects obtained in the second aspect, the third aspect, the fourth aspect, the fifth aspect, the sixth aspect, the seventh aspect, the eighth aspect, the ninth aspect, the tenth aspect, the eleventh aspect, and the twelfth aspect are similar to technical effects obtained in corresponding technical means in the first aspect. Details are not described herein again.

DESCRIPTION OF EMBODIMENTS

The following describes technical solutions of this application with reference to accompanying drawings.

In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

Figure 1:
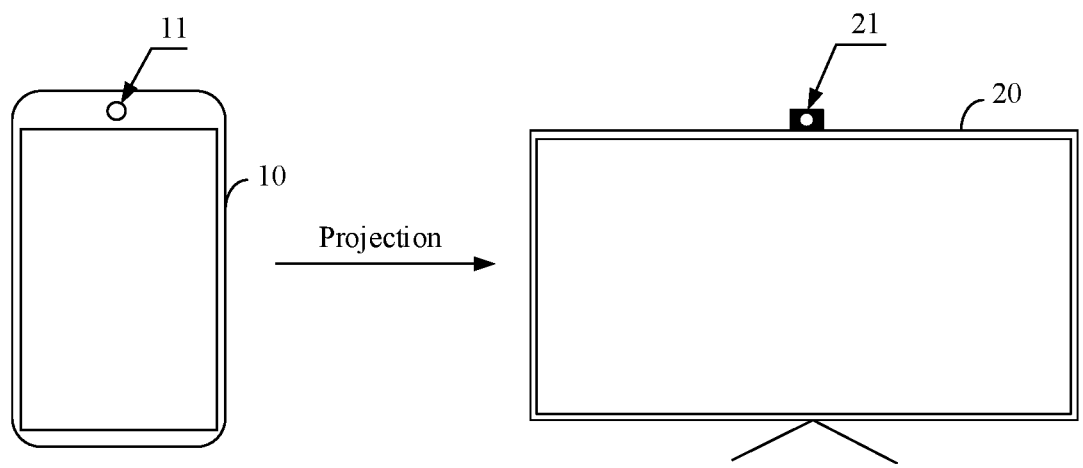
FIG. 1 is a schematic diagram of a projection system according to an embodiment of this application.

A projection method provided in embodiments of this application is applied to a projection system. FIG. 1 is a schematic diagram of a projection system according to an embodiment of this application. As shown in FIG. 1, the projection system includes a first device 10 and a second device 20. The first device 10 and the second device 20 may be connected through a wired network or a wired network.

The first device 10 is a projecting device, and the second device 20 is a projected device. The first device 10 may project screen content of the first device 10 to the second device 20, and the second device 20 displays the screen content. In addition, in this embodiment of this application, a user may trigger, by using a gesture operation, the first device 10 to project the screen content to the second device 20.

For example, both the first device 10 and the second device 20 are electronic devices. For example, the electronic device is an electronic device such as a terminal device that has a display module and on which a gesture collection module is installed. The terminal device may include a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), and the like.

Optionally, the gesture collection module may include a photographing assembly, a sound wave sensor, or the like. A specific type of the electronic device is not limited in this embodiment of this application. The photographing assembly may include one or more cameras such as a wide-angle camera, a primary camera, a macro camera, a long-focus camera, and a time of flight (time of flight, TOF) camera. A form of the camera and a quantity of cameras are not limited in this embodiment of this application.

As shown in FIG. 1, for example, the first device 10 is a mobile phone, and the second device 20 is a smart television. The mobile phone is installed with a photographing assembly 11, and the gesture operation of the user may be detected by using the photographing assembly 11. A photographing assembly 21 is installed on the smart television, and the gesture operation of the user may be detected by using the photographing assembly 21. If the mobile phone detects a projecting gesture, the mobile phone projects screen content of the mobile phone to the smart television. If the smart television detects a projected gesture, the smart television receives the screen content projected by the mobile phone, and displays the screen content projected by the mobile phone.

It should be understood that the photographing assembly 11 of the mobile phone may be a front-facing camera, or may be a rear-facing camera, or may include a front-facing camera and a rear-facing camera, and the gesture operation of the user is detected by using a combination of the front-facing camera and the rear-facing camera. The photographing assembly 21 of the smart television may be installed on an upper housing of the smart television, or may be installed at another position. This is not limited in this embodiment of this application.

In a possible implementation, the photographing assembly of the first device 10 or the second device 20 may include one or more cameras such as a first camera and a second camera. A field of view (field angle of view, FOV) of the first camera is greater than an FOV of the second camera. The first device 10 or the second device 20 may collect overall information of a to-be-detected object by using the first camera, and collect local information of the to-be-detected object by using the second camera.

It should be understood that one camera can cover a specific range of scenery, and the specific range is usually represented by an angle. The angle is referred to as a field of view FOV of a lens. In other words, the FOV refers to a range covered by the lens, and an object beyond the range is not captured in the lens. Therefore, a projection gesture performed by the user needs to be within an FOV of the photographing assembly of the first device 10 and within an FOV of the photographing assembly of the second device 20.

It should be noted that in FIG. 1, description is performed merely by using an example in which the first device 10 is the mobile phone and the second device 20 is the smart television. In another embodiment, the first device 10 and the second device 20 may alternatively be electronic devices of another type.

In a possible implementation, a screen size of the first device 10 is less than a screen size of the second device 20, so that screen content on a small screen is projected to a large screen, to improve user viewing experience. For example, the first device 10 is a mobile phone, and the second device 20 is a tablet computer, a smart television, a projector, or the like. Alternatively, the first device 10 is a smartwatch, and the second device 20 is a mobile phone, a tablet computer, a smart television, a projector, or the like. Certainly, the screen size of the first device 10 may alternatively be less than the screen size of the second device 20. This is not limited in this embodiment of this application. For example, the first device 10 is a smart television, and the second device 20 is a mobile phone, a smartwatch, or the like.

In addition, the first device 10 and the second device may be electronic devices of different types, or may be electronic devices of a same type. This is not limited in this embodiment of this application. For example, both are electronic devices such as mobile phones or tablet computers.

In an example, if the screen size of the first device 10 is less than the screen size of the second device 20, the first device 10 may be referred to as a small-screen device, and the second device 20 may be referred to as a large-screen device. Alternatively, a device whose screen size is less than or equal to a preset screen size is referred to as a small-screen device, and a device whose screen size is greater than the preset screen size is referred to as a large-screen device. The preset screen size may be preset. Alternatively, a first-type electronic device is referred to as a small-screen device, and a second-type electronic device is referred to as a large-screen device. For example, the first-type electronic device may include a smartwatch, a mobile phone, a tablet computer, or the like. The second-type electronic device includes a notebook computer, a desktop computer, a smart television, a projector, or the like.

This embodiment of this application may be applied to a scenario in which the small-screen device is triggered to perform projection to the large-screen device by using a gesture operation, or a scenario in which the large-screen device is triggered to perform projection to the small-screen device by using a gesture operation. Certainly, this embodiment of this application may alternatively be applied to a scenario in which the small-screen device is triggered to perform projection to the small-screen device by using a gesture operation, or a scenario in which the large-screen device is triggered to perform projection to the large-screen device by using a gesture operation. This is not limited in this embodiment of this application.

Figure 2:
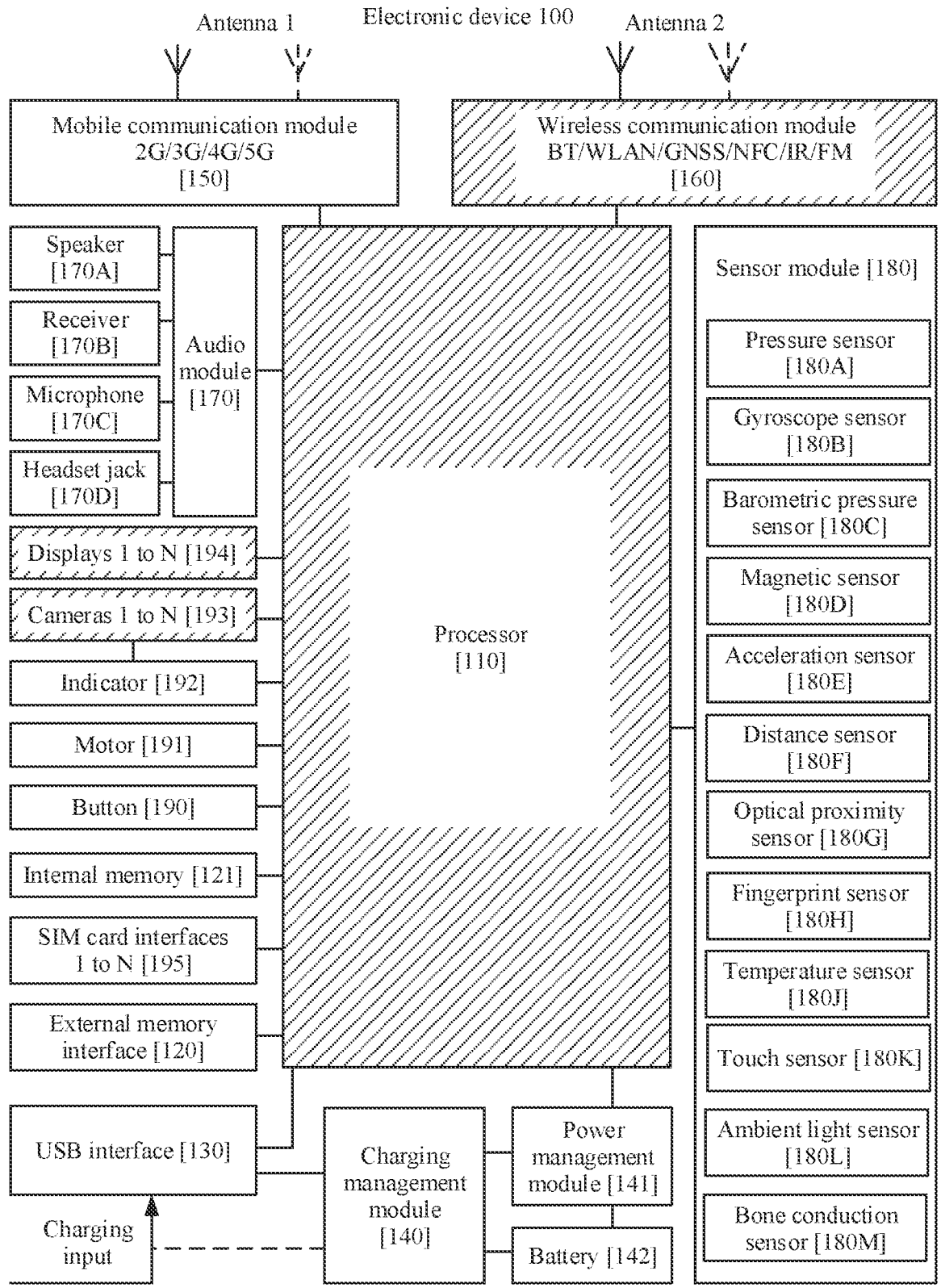
FIG. 2 is a schematic diagram of a structure of an electronic device according to an embodiment of this application.

The following describes a structure of an electronic device. FIG. 2 is a schematic diagram of a structure of an electronic device 100 according to an embodiment of this application. The electronic device 100 shown in FIG. 2 may be the first device 10 or the second device 20 in FIG. 1.

The electronic device 100 includes at least a processor 110, a display 194, a camera 193, and a wireless communication module 160. For example, if the electronic device 100 is the first device 10, the camera 193 may be the photographing assembly 11 in FIG. 1. Alternatively, if the electronic device 100 is the second device 20, the camera 193 may be the photographing assembly 21 in FIG. 1.

Optionally, the electronic device 100 may further include one or more pieces of the following content: an external memory interface 120, an internal memory 121, a universal serial bus (universal serial bus, USB) interface 130, a charging management module 140, a power management module 141, a battery 142, an antenna 1, an antenna 2, a mobile communication module 150 an audio module 170, a speaker 170A, a receiver 170B, a microphone 170C, a headset jack 170D, a sensor module 180, a button 190, a motor 191, an indicator 192, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may have more or fewer components than those shown in the figure, or have some components that are combined, or have some components that are split, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The electronic device 100 may perform gesture recognition on a captured image by using processing 100, to detect a projecting gesture or a projected gesture. For example, the electronic device 100 may perform gesture recognition on the captured image by using an artificial intelligence (artificial intelligence, AI) computing capability of the ISP.

The controller may be a neural center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. For example, the memory is configured to store instructions and data that can implement a projection method according to embodiments of this application. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through the PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset, to play audio through the headset. Alternatively, the interface may be configured to connect to another electronic device, for example, an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor a parameter such as a battery capacity, a battery cycle count, or a battery health status (electric leakage or impedance). In some other embodiments, the power management module 141 may be further disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in the same device with the mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more devices integrating at least one communication processing module. The wireless communication module 160 receives an electromagnetic wave by using the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2. The electronic device 100 may establish a communication connection to another device by using the wireless communication module 160, and perform data transmission with the another device through the established communication connection. For example, through the established communication connection, screen content is projected to the another device, or screen content projected by the another device is received.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. For example, display of a projection interface in a projection process, for example, moving in or moving out of screen content in the projection process, is implemented by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device 100 may include one or N displays 194, and N is a positive integer greater than 1.

The electronic device 100 can implement a photographing function by using the ISP, the camera 193, the video codec, the GPU, the display 194, the application processor, and the like. For example, an image including a gesture operation is captured by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal of a standard format such as RGB or YUV. In some embodiments, the electronic device 100 may include one or N cameras 193, where N is a positive integer greater than 1.

In some possible cases, the camera 193 may serve as a gesture collection module to collect a gesture operation of a user. The camera 193 may include a front-facing camera and/or a rear-facing camera.

The digital signal processor is configured to process a digital signal. In addition to the digital image signal, the digital signal processor may further process another digital signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, can be implemented through the NPU.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code, and the executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (for example, audio data or an address book) created during use of the electronic device 100, and the like. In addition, the internal memory 121 may include a high-speed random access memory, or may include a nonvolatile memory such as at least one disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like. The button 190 of the electronic device 100 may include a power button, a volume button, and the like. The button 190 may be a mechanical button, or may be a touch button. The motor 191 may generate a vibration prompt. The motor 191 may be configured to provide an incoming call vibration prompt or a touch vibration feedback. The indicator 192 may be an indicator light, may be configured to indicate a charging status and a power change, and may be configured to indicate a message, a missed call, a notification, and the like. The SIM card interface 195 is configured to connect to a SIM card.

In addition, the electronic device 100 further includes various different sensors. For example, the pressure sensor 180A is configured to sense a pressure signal, and may convert the pressure signal into an electrical signal. The gyroscope sensor 180B may be configured to determine a motion posture of the electronic device 100. The barometric pressure sensor 180C is configured to measure barometric pressure. The magnetic sensor 180D includes a Hall sensor. The acceleration sensor 180E may detect accelerations in various directions (usually on three axes) of the electronic device 100. The distance sensor 180F is configured to measure a distance. The electronic device 100 may measure a distance through infrared light or a laser. In some embodiments, in a photographing scenario, the electronic device 100 may measure a distance through the distance sensor 180F to implement quick focusing. The optical proximity sensor 180G may include a light-emitting diode (LED) and an optical detector, for example, a photodiode. The ambient light sensor 180L is configured to sense ambient light brightness. The electronic device 100 may adaptively adjust brightness of the display 194 based on the sensed ambient light brightness. The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of a touch event. The bone conduction sensor 180M may obtain a vibration signal. The temperature sensor 180J is configured to detect a temperature. For example, the temperature sensor 180J may be a non-contact infrared temperature sensor, and the non-contact infrared temperature sensor may measure the temperature of the object by using infrared rays.

A software system of the electronic device 100 may use a layered architecture, an event-driven architecture, a microkernel architecture, a microservice architecture, or a cloud architecture. In this embodiment of the present invention, an Android system of a layered architecture is used as an example to illustrate a software structure of the electronic device 100.

Figure 3:
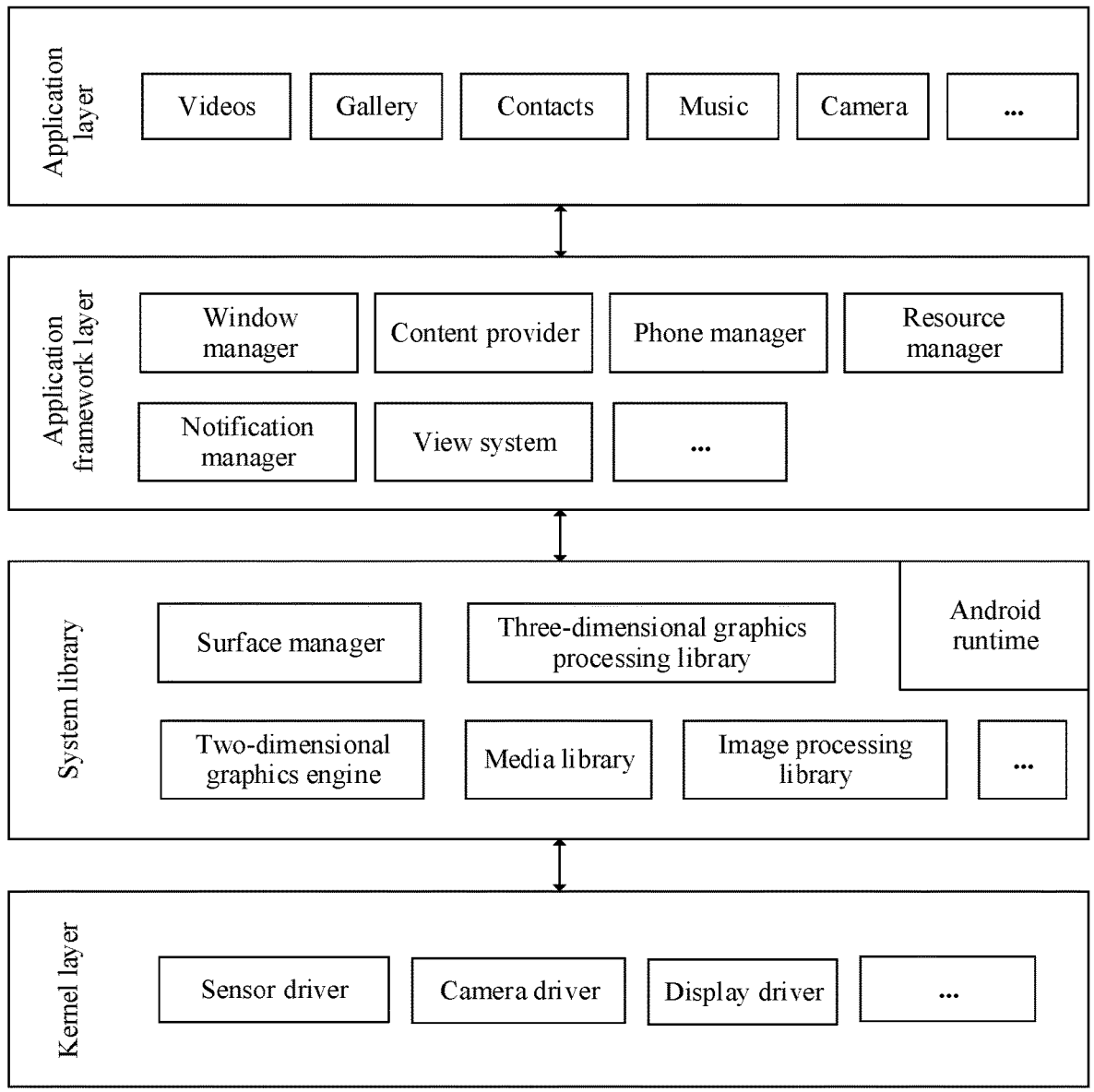
FIG. 3 is a block diagram of a software structure of an electronic device according to an embodiment of this application.

FIG. 3 is a block diagram of the software structure of the electronic device 100 according to an embodiment of this application. The block diagram of the software structure shown in FIG. 3 may be a block diagram of a software structure of the first device 10, or may be a block diagram of a software structure of the second device 20. For example, if the first device 10 is a mobile phone, FIG. 3 may be a block diagram of a software structure of the mobile phone according to an embodiment of this application.

In a layered architecture, software is divided into several layers, and each layer has a clear division of roles and tasks. Layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 3, the application packages may include applications such as "Videos", "Camera", "Gallery", "Calendar", "Phone", "Maps", "Navigation", "WLAN", "Bluetooth", "Music", and "Messages". For example, if the electronic device 100 is the first device 10 in FIG. 1, the first device 10 may play a video by using a video application, play music by using a music application, or make a video call by using a phone application. In a process in which the first device 10 displays a display interface of the foregoing application, the first device 10 may project currently displayed screen content to the second device 20 based on a detected projecting gesture.

The application framework layer provides an application programming interface (application programming interface, API) and a programming framework for applications at the application layer. The application framework layer includes some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, to determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view. The electronic device 100 may complete projection display in a projection process based on the view system.

The phone manager is configured to provide a communication function of the electronic device 100, for example, management of a call status (including answering, declining, or the like) and management of a voice call function and a video call function.

The resource manager provides various resources for an application, such as a localized character string, an icon, an image, a layout file, and a video file.

The notification manager enables an application to display notification information in a status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run in the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a two-dimensional graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, compositing, layer processing, and the like.

The two-dimensional graphics engine is a drawing engine for 2D drawing.

The kernel layer is a layer between hardware and software. The kernel layer includes at least a display driver, a camera driver, an audio driver, and a sensor driver. For example, the display driver may drive display of screen content. The camera driver may drive a camera to capture images. The audio driver is configured to drive an audio player to play audio.

Figure 4:
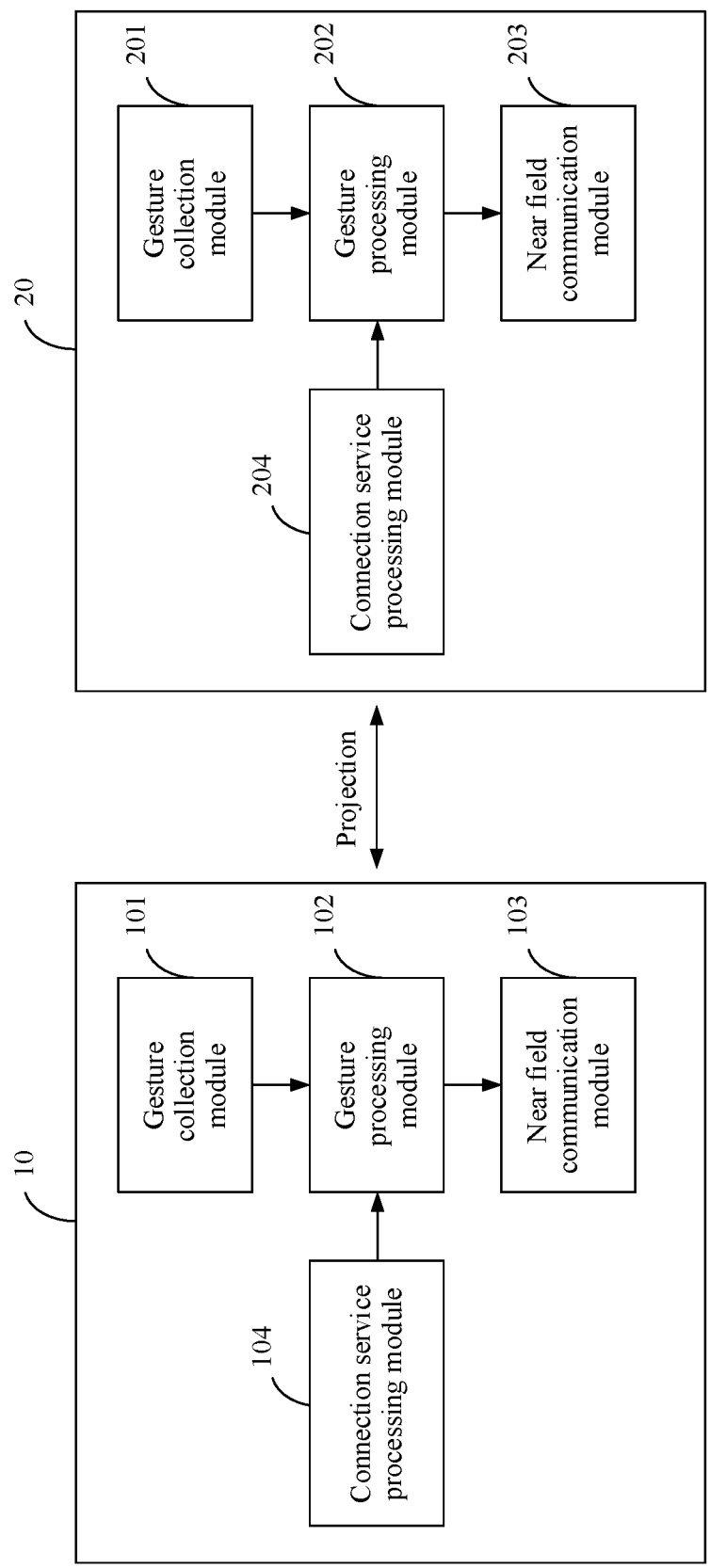
FIG. 4 is a schematic diagram of a logical structure of each device in a projection system according to an embodiment of this application.

The following describes logical structures of the first device 10 and the second device 20 in the projection system. FIG. 4 is a schematic diagram of a logical structure of each device in a projection system according to an embodiment of this application.

The first device 10 includes a gesture collection module 101, a gesture processing module 102, a near field communication module 103, and a connection service processing module 104.

The gesture collection module 101 is configured to detect a gesture operation. Optionally, the gesture collection module 101 may be a photographing assembly, a sound wave sensor, or the like. The photographing assembly may include one or more cameras such as a wide-angle camera, a primary camera, a macro camera, a long-focus camera, and a TOF camera. A form of the camera and a quantity of cameras are not limited in this embodiment of this application. For example, if the gesture collection module 101 is the photographing assembly, the photographing assembly may capture an image that includes a gesture operation. For example, the gesture collection module 101 may be the camera 193 in FIG. 2.

The gesture processing module 102 is configured to recognize a detected gesture operation, to obtain a gesture recognition result. The gesture recognition result may include one or more pieces of the following information: posture information, action information, movement information, or the like of a gesture. The movement information includes one or more pieces of the following information: a movement direction, a movement distance, a moving track, or the like. For example, the gesture processing module 102 may analyze an image captured by the gesture collection module 101, to obtain a gesture recognition result. Optionally, the gesture processing module 102 may perform gesture recognition on the captured image by using an artificial intelligence (artificial intelligence, AI) technology, to detect a projecting gesture.

For example, the gesture processing module 102 is the processor 110 in FIG. 2. In a possible implementation, the processor includes an ISP, and gesture recognition may be implemented by using an AI computing capability of the ISP. In another possible implementation, the processor 110 includes an NPU, and gesture recognition may be implemented by using the NPU.

The near field communication module 103 is configured to communicate with a near field communication module 203 in the second device 20, to send information such as a gesture recognition result or projection content to the second device 20. The near field communication module 103 may provide a wireless communication solution that is applied to the first device 10 and that includes a WLAN, Wi-Fi, BT, a GNSS, FM, NFC, IR, and the like. A wireless communication manner provided by the near field communication module 103 is not limited in this embodiment of this application. For example, the near field communication module 103 is the wireless communication module 160 in FIG. 2.

The connection service processing module 104 is configured to process a projection service, to synchronize screen content of the first device 10 to the second device 20, for example, control a screen status, a function status, or the like of the first device 10 to be synchronized to the second device 20 in a connection manner, for example, control a video playback status, a video call status, or the like of the first device 10 to be synchronized to the second device 20. For example, the connection service processing module 104 is the processor 110 in FIG. 2.

The second device 10 includes a gesture collection module 201, a gesture processing module 202, a near field communication module 203, and a connection service processing module 204.

The gesture collection module 201 is configured to detect a gesture operation. A function of the gesture collection module 201 is similar to that of the gesture collection module 101. For details, refer to the related description of the gesture collection module 101. Details are not described herein again. For example, the gesture collection module 201 is the camera 193 in FIG. 2.

The gesture processing module 202 is configured to recognize a captured gesture operation, to obtain a gesture recognition result. A function of the gesture processing module 202 is similar to that of the gesture processing module 102. For details, refer to the related description of the gesture processing module 102. Details are not described herein again. For example, the gesture processing module 202 is the processor 110 in FIG. 2.

The near field communication module 203 is configured to communicate with the near field communication module 103 in the first device 10, to receive information such as a gesture recognition result or projection content sent by the first device 10. A function of the near field communication module 203 is similar to that of the near field communication module 103. For details, refer to the related description of the near field communication module 103. Details are not described herein again. For example, the near field communication module 203 is the wireless communication module 160 in FIG. 2.

The connection service processing module 204 is configured to process a projection service, for example, receive screen content projected by the first device 10, and display the screen content. For example, the connection service processing module 104 is configured to synchronize a screen status or a function status of the first device 10, for example, synchronize a video playback status or a video call status of the first device 10. For example, the connection service processing module 204 is the processor 110 in FIG. 2.

In a possible implementation, the gesture collection module 101 in the first device 10 and the gesture collection module 201 in the second device 20 may form a gesture monitoring area. The gesture operation is detected in the gesture monitoring area, to implement gesture projection.

In a possible implementation, through service interaction between the connection service processing module 104 and the connection service processing module 204, projection can be implemented with an effect close to seamless connection. That is, screen content of the first device 10 can be projected to the second device 20 in an effect close to seamless connection, and be displayed by the second device 20, to provide better projection experience.

In a related technology, projection needs to be triggered through a series of interface operations. Consequently, projection operations are complex, projection efficiency and flexibility are low, and a fast projection requirement of people cannot be met. To resolve this problem, embodiments of this application provide a method for quickly triggering projection by using a gesture. In other words, a user may quickly trigger projection between devices by performing a specific projection gesture, without performing a series of interface operations, thereby increasing projection manners, and improving the projection efficiency and flexibility. For example, the user may perform a projection gesture near the first device 10 and the second device 20, to trigger the first device 10 to perform projection to the second device 20, or trigger the second device 20 to perform projection to the first device 10.

The following describes a projection gesture in a projection method according to embodiments of this application. The projection gesture described in embodiments of this application may be set by a device by default, or may be customized by a user. This is not limited in embodiments of this application. In addition, the projection gesture may be a static gesture, or may be a dynamic gesture. This is not limited in embodiments of this application. The static gesture is a posture of a gesture. The dynamic gesture includes a hand posture and action.

Figure 5:
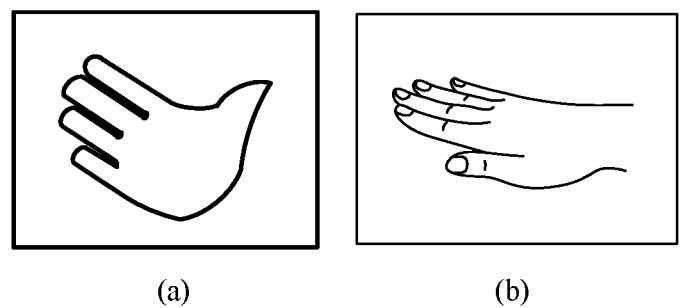
FIG. 5 is a schematic diagram of a static projection gesture according to an embodiment of this application.

That the projection gesture is the static gesture is used as an example. The projection gesture may include a specific hand posture. FIG. 5 is a schematic diagram of a static projection gesture according to an embodiment of this application. As shown in (a) in FIG. 5, the projection gesture may be a gesture in which a palm is opened and the palm faces a user. Alternatively, as shown in (b) in FIG. 5, the projection gesture may be a gesture in which a palm is open and the palm faces downward. It should be understood that the projection gesture may alternatively be set to another gesture. This is not limited in this embodiment of this application.

Figure 6:
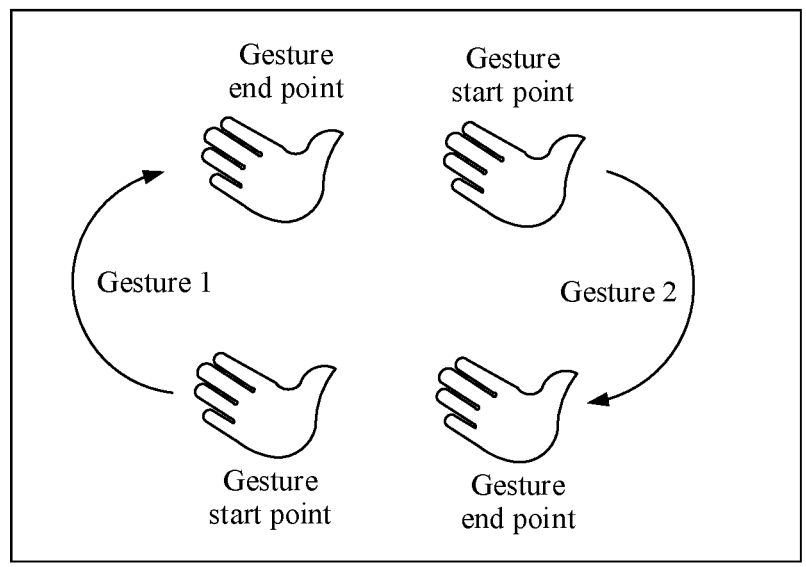
FIG. 6 is a schematic diagram of a dynamic projection gesture according to an embodiment of this application.
Figure 7:
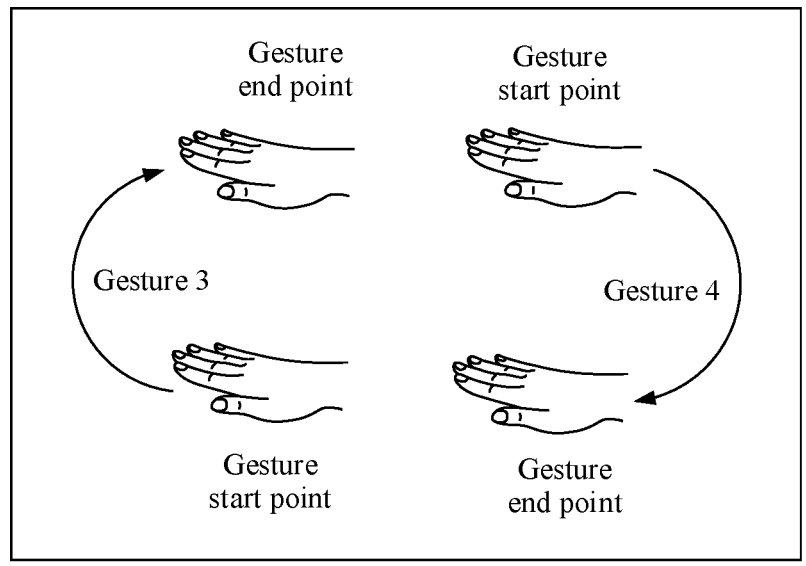
FIG. 7 is a schematic diagram of another dynamic projection gesture according to an embodiment of this application.

That the projection gesture is the dynamic gesture is used as an example, and the projection gesture may be a specific action performed under a specific hand posture, or an action formed by different hand postures. FIG. 6 is a schematic diagram of a dynamic projection gesture according to an embodiment of this application. As shown in FIG. 6, the projection gesture may be a gesture 1 that moves away from a user in a hand posture that a palm faces the user, or a gesture 2 that moves closer to a user in a hand posture that a palm faces the user. FIG. 7 is a schematic diagram of another dynamic projection gesture according to an embodiment of this application. As shown in FIG. 7, the projection gesture may be a gesture 3 that moves away from a user in a hand posture that a palm faces the ground, or a gesture 4 that moves closer to a user in a hand posture that a palm faces the ground.

In a possible implementation, the projection gesture may further include different types of projection gestures. In an example, the projection gesture may include a first projection gesture for performing projection from a small-screen device to a large-screen device, and a second projection gesture for performing projection from a large-screen device to a small-screen device. The first projection gesture is different from the second projection gesture. For example, the first projection gesture and the second projection gesture may be gestures with opposite actions.

In an example, as shown in FIG. 6, the gesture 1 and the gesture 2 may be the first projection gesture and the second projection gesture, respectively. If the user performs the gesture 1, the small-screen device may be triggered to perform projection to the large-screen device, for example, a mobile phone is triggered to perform projection to a smart television. If the user performs the gesture 2, the large-screen device may be triggered to perform projection to the small-screen device, for example, the smart television is triggered to perform projection to the mobile phone.

Alternatively, as shown in FIG. 7, the gesture 3 and the gesture 4 may be the first projection gesture and the second projection gesture, respectively. If the user performs the gesture 3, the small-screen device is triggered to perform projection to the large-screen device. If the user performs the gesture 4, the large-screen device is triggered to perform projection to the small-screen device.

It should be noted that, to ensure that both the first device 10 and the second device 20 can detect the projection gesture of the user, an area in which the user performs the projection gesture needs to be within a detection range of the first device 10 and a detection range of the second device 20. For example, the area in which the user performs the projection gesture needs to be within a field of view of the camera of the first device 10 and within a field of view of the camera of the second device 20, to ensure that both the camera of the first device 10 and the camera of the second device 20 can capture the projection gesture of the user.

In addition, because locations of the first device 10 and the second device 20 are different, when the user performs the projection gesture near the first device 10 and the second device 20, a gesture captured by the first device 10 may be different from a gesture captured by the second device 20. For example, the gestures respectively captured by the first device 10 and the second device 20 may be gestures with opposite hand postures and/or actions.

For ease of description, when the first device 10 is a projecting device and the second device 20 is a projected device, if the user performs the projection gesture near the first device 10 and the second device 20, the gesture captured by the first device 10 is referred to as a projecting gesture, and the gesture captured by the second device 20 is referred to as a projected gesture. The projecting gesture corresponds to the projected gesture. For example, the projecting gesture and the projected gesture may be gestures with opposite hand postures and/or actions.

Figure 8:
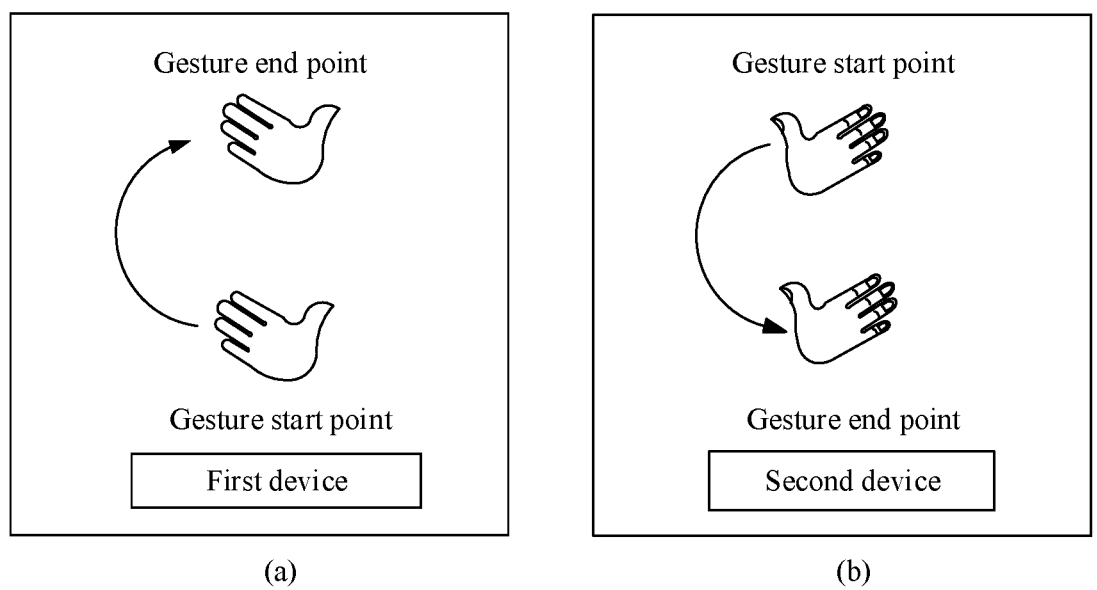
FIG. 8 is a schematic diagram of a projecting gesture and a projected gesture according to an embodiment of this application.

FIG. 8 is a schematic diagram of a projecting gesture and a projected gesture according to an embodiment of this application. Assuming that a projection gesture performed by a user is the gesture 1 shown in FIG. 6, the projecting gesture detected by the first device 10 may be a gesture in which a palm faces the first device 10 and moves away from the first device 10, as shown in (a) in FIG. 8. The projected gesture detected by the second device 20 may be a gesture in which a back of a hand faces the second device 10 and moves closes to the second device 20, as shown in (b) in FIG. 8.

For ease of understanding, in the following embodiments of this application, that the first device is a mobile phone, the second device is a smart television, and the mobile phone performs projection to the smart television is used as an example to describe in detail the projection method according to embodiments of this application with reference to the accompanying drawings and application scenarios.

Before gesture projection, a user may first enable a gesture projection function of the mobile phone and a gesture projection function of the smart television. The gesture projection function is a function of triggering projection by using a gesture or triggering to receive projection by using a gesture. For example, after the gesture projection function of the mobile phone is enabled, the mobile phone may detect a gesture operation of the user, and trigger projection based on a detected projecting gesture. After the gesture projection of the smart television is enabled, the smart television may detect a projected gesture operation of the user, and based on the detected projected gesture, the smart television is triggered to receive screen content projected by the mobile phone, and display the projected screen content; and vice versa.

In a possible implementation, the user may enable the gesture projection function of the mobile phone by using a setting menu.

Figure 9B:
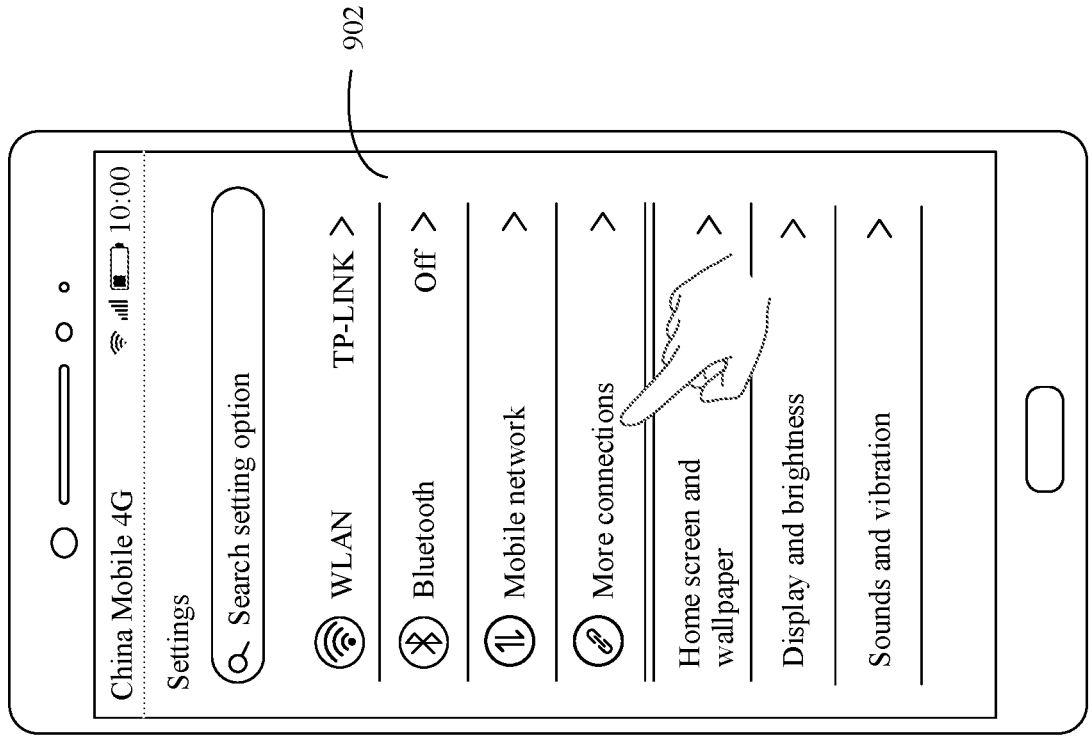
FIG. 9(a), FIG. 9(b), FIG. 9(c), and FIG. 9(d) are a schematic diagram of graphical user interfaces for enabling a gesture projection function of a mobile phone according to an embodiment of this application.
Figure 9A:
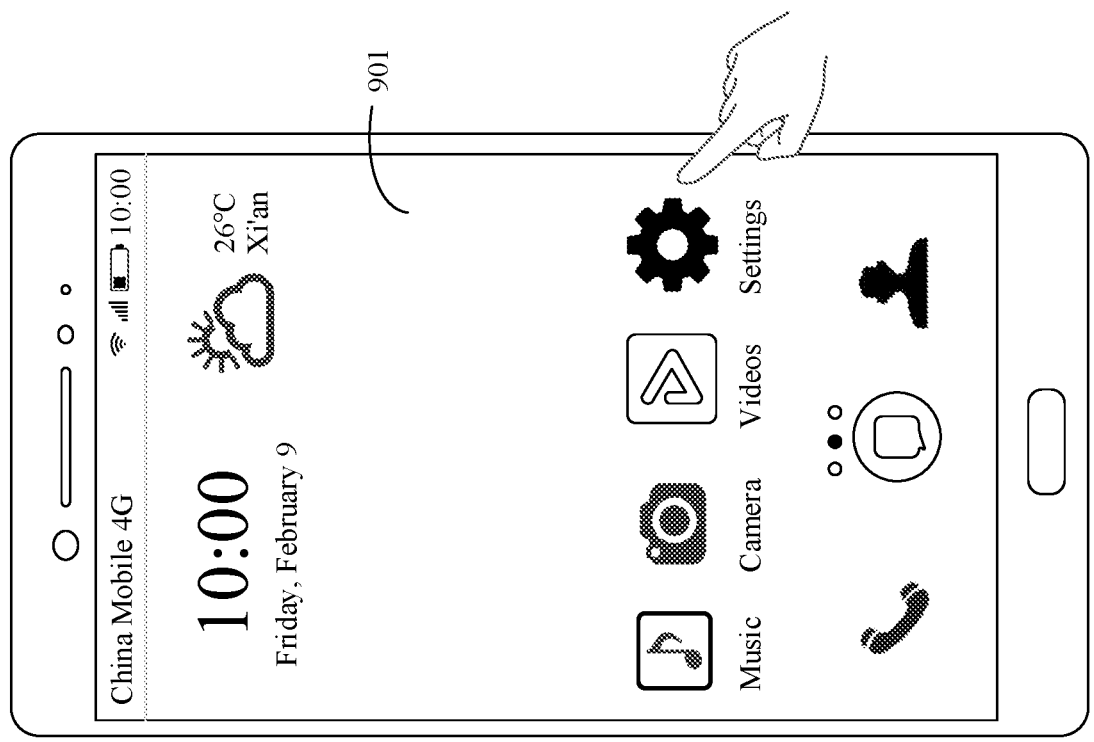

FIG. 9(a), FIG. 9(b), FIG. 9(c), and FIG. 9(d) are a schematic diagram of graphical user interfaces (graphical user interfaces, GUIs) for enabling a gesture projection function of a mobile phone according to an embodiment of this application. FIG. 9(a) shows interface content 901 currently output by the mobile phone in an unlock mode. The interface content 901 includes a plurality of applications (applications, Apps) such as Music, Camera, Settings, and Videos. It should be understood that, the interface content 901 may further include more other applications. This is not limited in this embodiment of this application. As shown in FIG. 9(a), a user taps an icon of a setting application, and in response to the tap operation of the user, the mobile phone displays a setting menu. The user may search for a gesture projection option by using the setting menu to enable the gesture projection function. The gesture projection option may be located in a main menu of the setting menu, or may be located in a next-level menu of the setting menu. A location of the gesture projection option in the setting menu is not limited in this embodiment of this application.

FIG. 9(b) shows a main menu interface 902 of the setting menu, and the main menu interface 902 includes setting entries of a plurality of functions, such as WLAN, Bluetooth, Mobile network, More connections, Home screen and wallpaper, Display and brightness, Sounds and vibration, Notifications, and the like. It should be understood that, the main menu interface 902 may further include setting entries of more other applications. This is not limited in this embodiment of this application. As shown in FIG. 9(b), the user taps the setting entry of More connections in the main menu interface 902, and in response to the tap operation of the user, the mobile phone displays a setting interface of More connections.

Figure 9D:
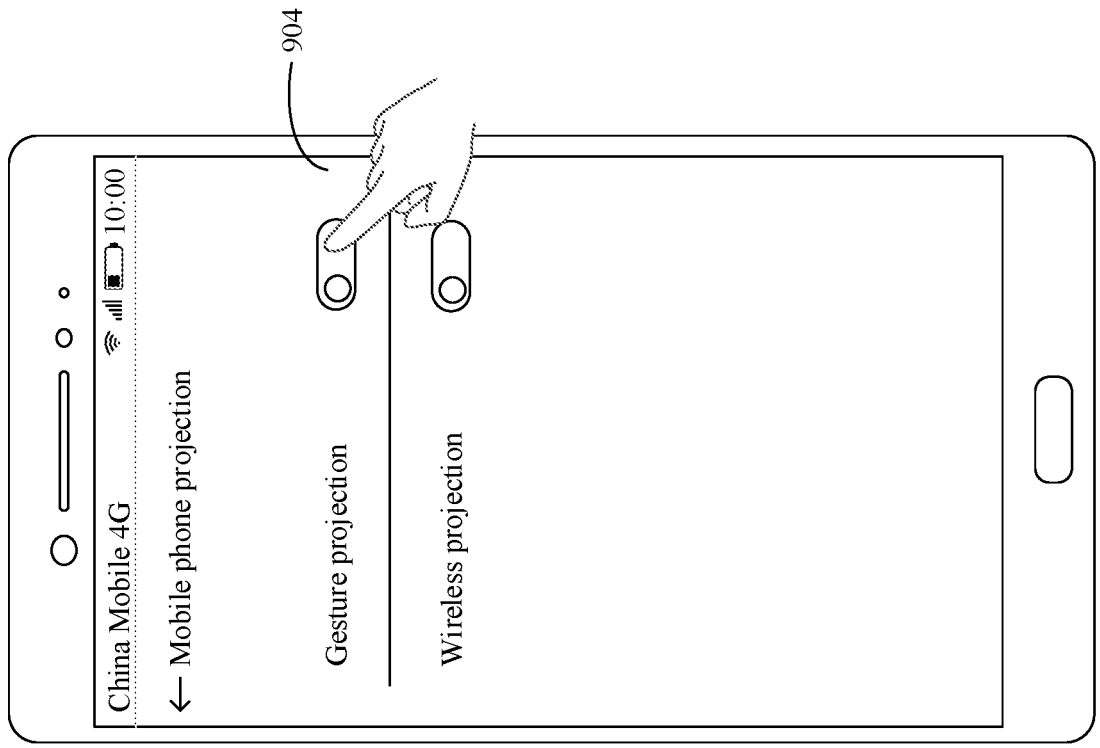
Figure 9C:
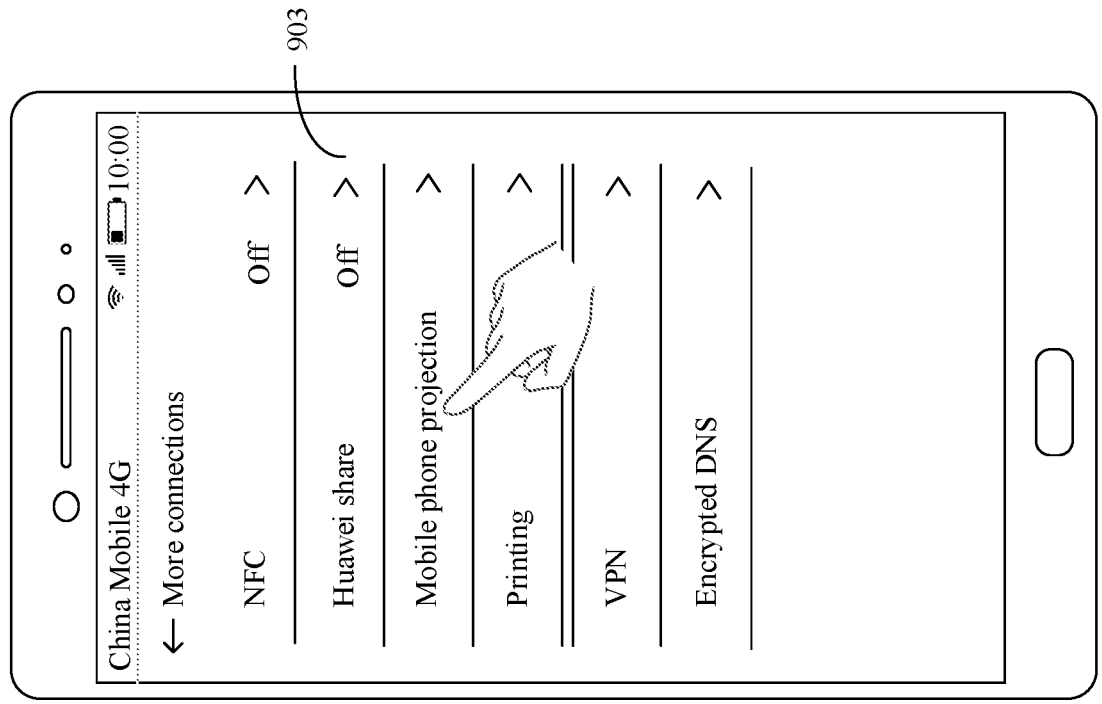

As shown in FIG. 9(c), the setting interface 903 of More connections includes setting entries of functions such as NFC, Huawei share, Mobile phone projection, and Printing. Mobile phone projection is used to set projection between this device and another device, or may be referred to as a name such as multi-screen interaction. This is not limited in this embodiment of this application. The user taps the setting entry of Mobile phone projection, and in response to the tap operation of the user, the mobile phone displays a setting interface of Mobile phone projection. As shown in FIG. 9(d), a setting interface 904 of Mobile phone projection includes a gesture projection option, a wireless projection option, and the like. It should be understood that, the setting interface 904 of Mobile phone projection may further include more other options. This is not limited in this embodiment of this application. The user taps the gesture projection option, and in response to the tap operation of the user, the mobile phone may enable the gesture projection function.

In a possible implementation, the user may enable the gesture projection function of the mobile phone by using a shortcut menu in a notification bar.

Figure 10:
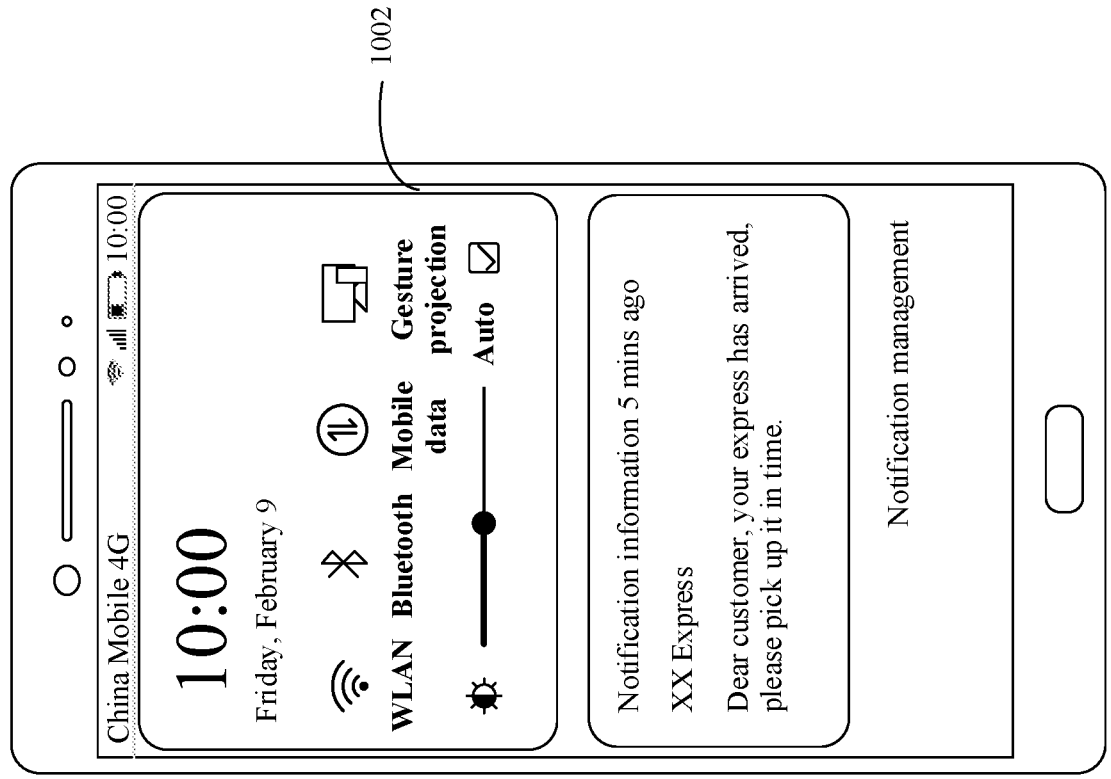
FIG. 10 is a schematic diagram of another graphical user interfaces for enabling a gesture projection function of a mobile phone according to an embodiment of this application.
Figure 10:
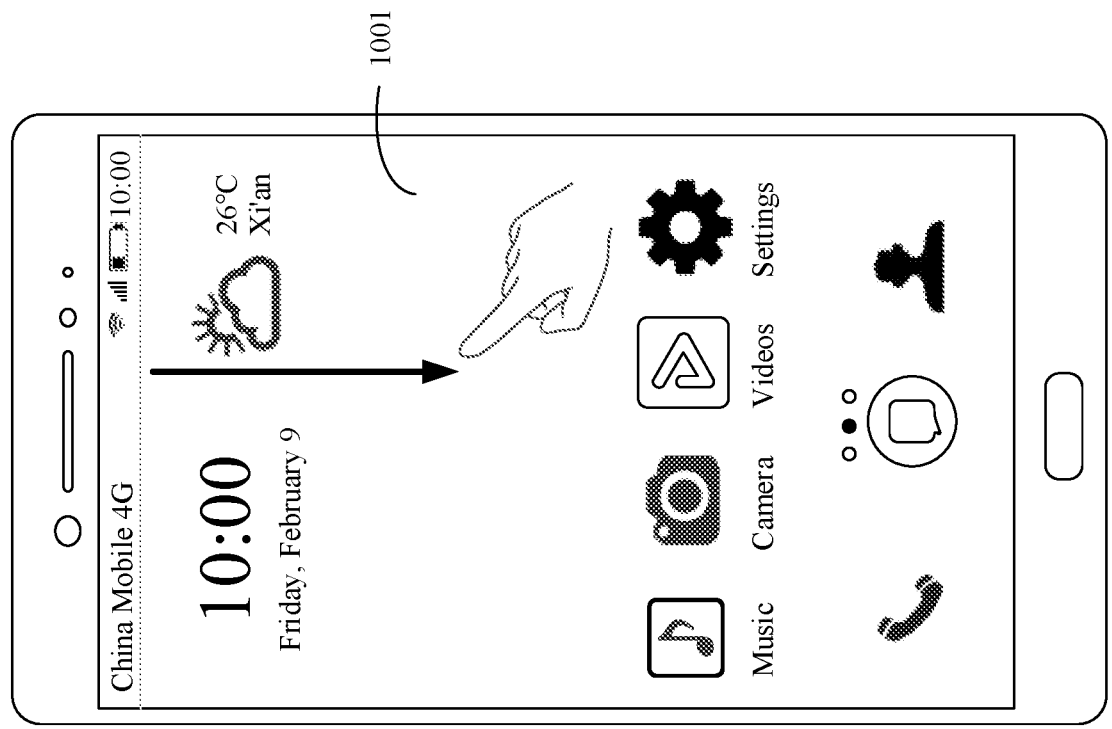

FIG. 10 is a schematic diagram of another graphical user interfaces for enabling a gesture projection function of a mobile phone according to an embodiment of this application. (a) in FIG. 10 shows interface content 1001 currently output by the mobile phone in an unlock mode. The interface content 1001 includes a plurality of applications such as Music, Camera, Settings, and Videos. It should be understood that, the interface content 1001 may further include more other applications. This is not limited in this embodiment of this application. As shown in (a) in FIG. 10, a user performs a slide-down operation on the interface content 1001, and in response to the slide-down operation of the user, the mobile phone displays a slide-down notification interface. The slide-down notification interface includes a shortcut menu, and the shortcut menu includes a plurality of shortcut icons. The user can tap a shortcut icon of Gesture projection in the shortcut menu to enable the gesture projection function.

As shown in (b) in FIG. 10, a notification interface 1002 includes the shortcut menu, and the shortcut menu includes shortcut icons of functions such as WLAN, Bluetooth, Mobile data, Gesture projection, Airplane mode, Location, Auto-rotate, and Hotspot. It should be understood that, the shortcut menu may further include more other shortcut icons. This is not limited in this embodiment of this application. The shortcut icon of Gesture projection may alternatively be provided in another icon form. This is not limited in this embodiment of this application. As shown in (b) in FIG. 10, the user taps the shortcut icon of Gesture projection, and in response to the tap operation of the user, the mobile phone may enable the gesture projection function.

In another embodiment, the shortcut menu may further include a shortcut icon of Mobile phone projection, and the user may quickly enable the gesture projection function by using the shortcut icon of Mobile phone projection. For example, the user may touch and hold the shortcut icon of Mobile phone projection to enter a setting interface of Mobile phone projection. The setting interface of Mobile phone projection may include a gesture projection option, and the user may tap the gesture projection option in the setting menu of Mobile phone projection to enable the gesture projection function.

In addition, when the shortcut menu does not include the shortcut icon of Gesture projection or Mobile phone projection, the user may alternatively add the shortcut icon of Gesture projection or Mobile phone projection to the shortcut menu by using a related setting operation of the shortcut menu. In this way, the user can quickly enable the gesture projection function of the mobile phone by using the shortcut menu.

It should be understood that in this embodiment of this application, in addition to enabling the gesture projection function of the mobile phone by using the setting menu and the slid-down notification interface, the gesture projection function may be enabled in another manner, for example, the gesture projection function is enabled by using another interface operation or a voice operation. This is not limited in this embodiment of this application. In addition, the gesture projection function may alternatively be enabled by default, and does not need to be manually enabled by the user. This is not limited in this embodiment of this application.

In a possible implementation, to guide the user to perform gesture projection, the mobile phone may further display operation guide information about gesture projection, to notify, by using the operation guide information, the user how to perform gesture projection, the user of related precautions for gesture projection, and the like. The operation guide information may be displayed in a manner of text, an image, a video, or the like. A display manner of the operation guide information about gesture projection is not limited in this embodiment of this application. For example, the operation guide information may include one or more pieces of the following information: a schematic diagram of a gesture projection operation, a video of a gesture projection operation, a schematic diagram of a projection gesture, and precautions. For example, the precautions may include: When gesture projection is performed, an operation area of a projection gesture needs to be within an image capturing range of a camera of a projecting device and an image capturing range of a camera of a projected device, to ensure that both the projecting device and the projected device can capture the projection gesture.

In a possible implementation, the user may tap the gesture projection option in the setting interface of Mobile phone projection, to enter a setting interface of Gesture projection, and then view the operation guide information about gesture projection on the setting interface of Gesture projection. Certainly, the user may alternatively view the setting interface of Gesture projection and the operation guide information about gesture projection in another manner. This is not limited in this embodiment of this application.

Figure 11:
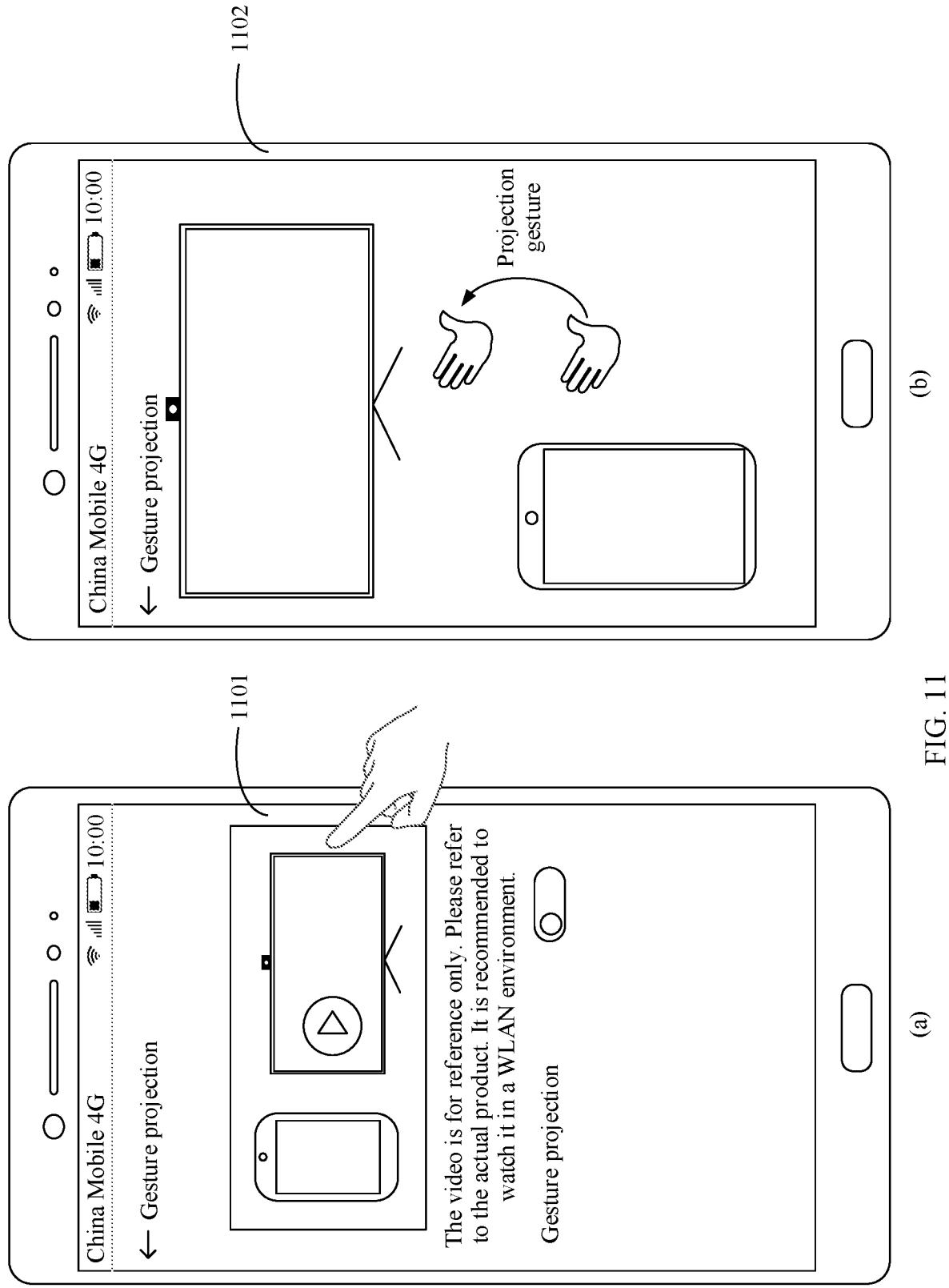
FIG. 11 shows graphical user interfaces of a gesture projection setting process according to an embodiment of this application.
Figure 12B:
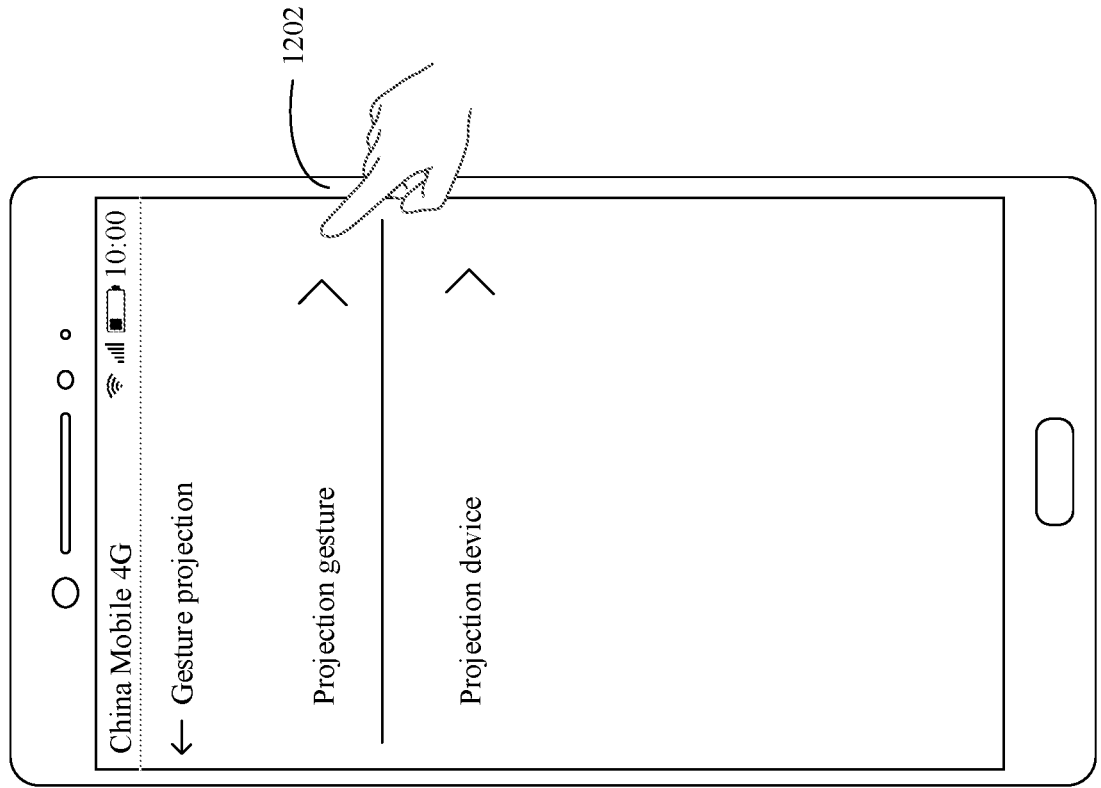
FIG. 12(a), FIG. 12(b), FIG. 12(c), and FIG. 12(d) are a schematic diagram of graphical user interfaces of another gesture projection setting process according to an embodiment of this application.
Figure 12A:
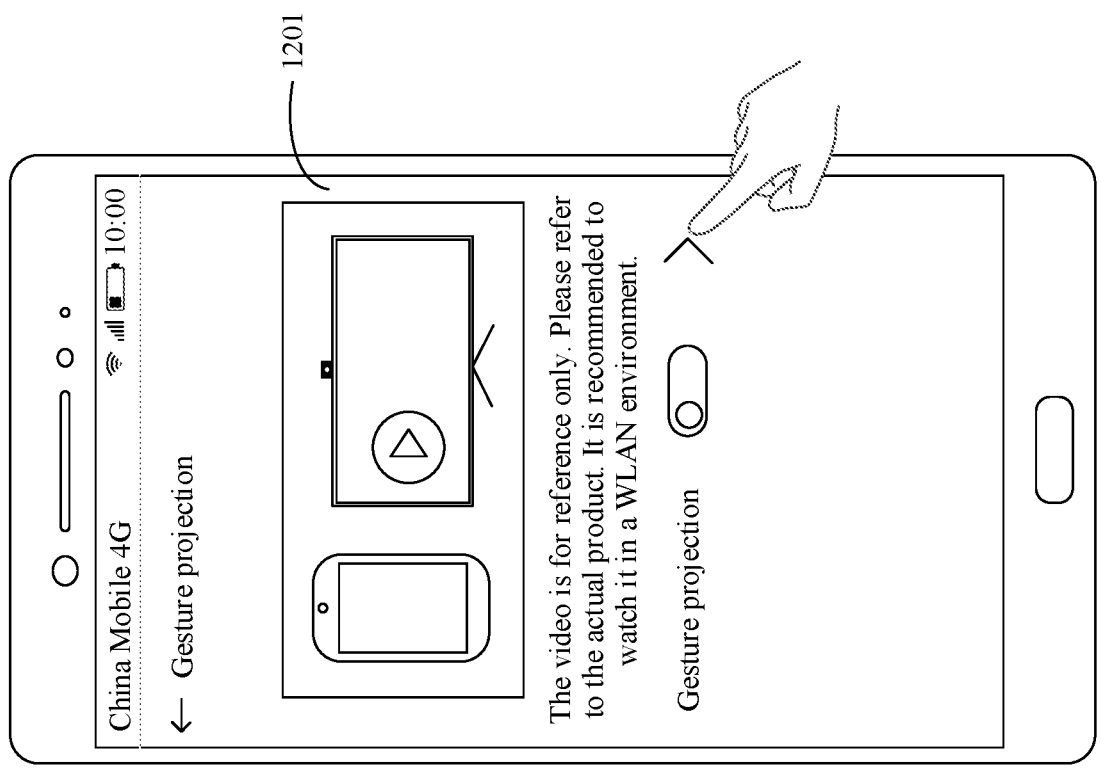
Figure 12C:
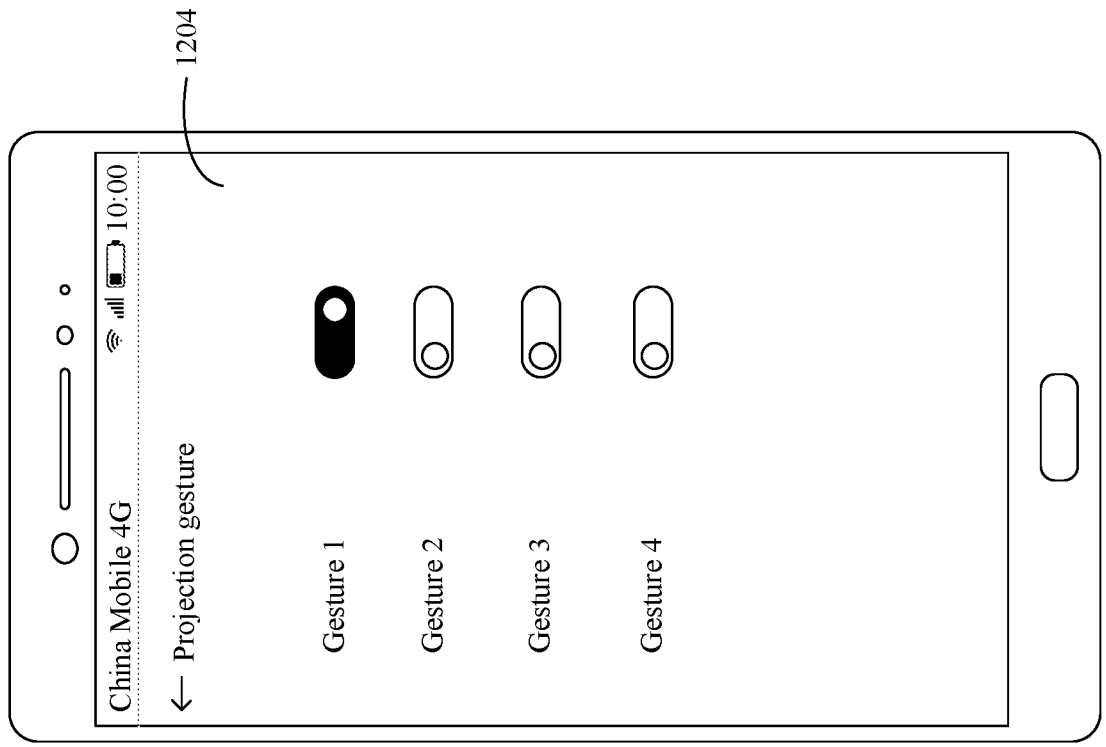
Figure 12D:
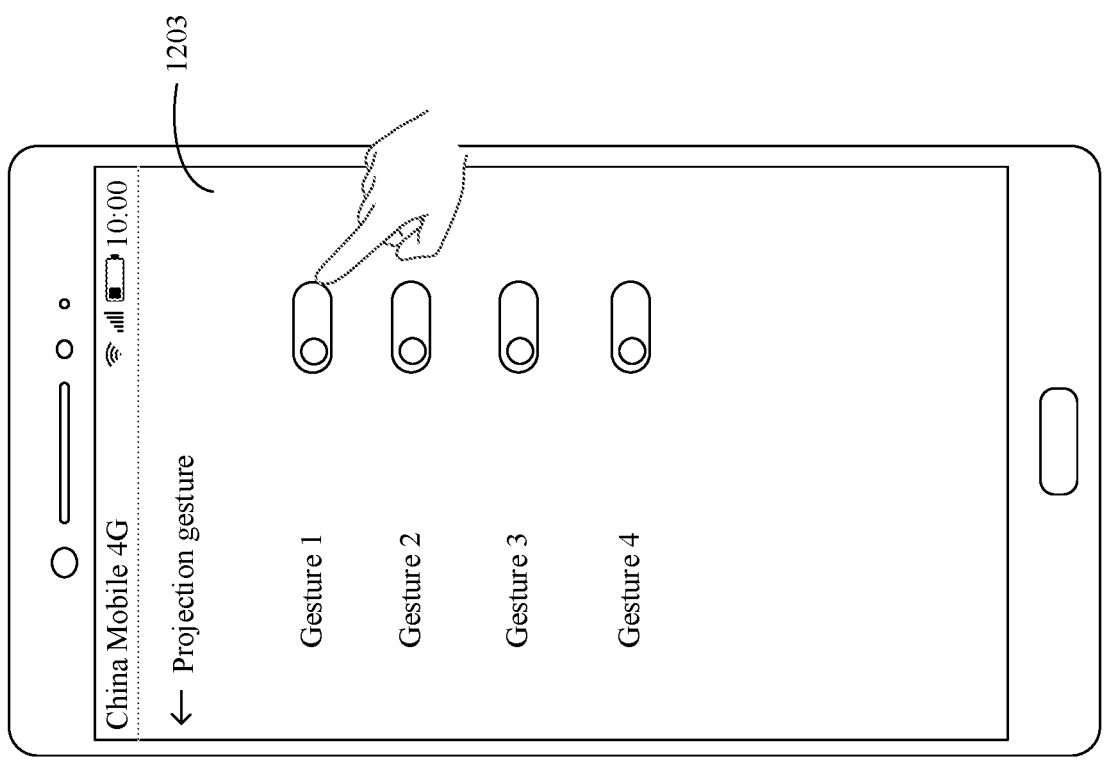

FIG. 11 shows graphical user interfaces of a gesture projection setting process according to an embodiment of this application. (a) in FIG. 11 shows a setting interface 1101 of Gesture projection. The setting interface 1101 includes a gesture projection option and an operation guide video about gesture projection. The operation guide video is used to notify, in a form of a video, a user how to perform gesture projection. The user may tap the operation guide video, and in response to the tap operation of the user, a mobile phone may start to play the operation guide video. (b) in FIG. 11 shows a playing interface 1102 of the operation guide video.

In addition, the user may further view more operation guide information by using the setting interface 1101 of Gesture projection, for example, view a schematic diagram of a projection gesture. In an example, the user may swipe right on the setting interface shown in (a) in FIG. 11, to view more operation guide interfaces, and in response to the swipe operation of the user, the mobile phone may display another operation guide interface. For example, the displayed operation guide interface includes the schematic diagram of the projection gesture, and the schematic diagram of the projection gesture is used to introduce the projection gesture to the user in detail. In an example, the schematic diagram of the projection gesture includes a gesture for performing projection from a small screen to a large screen, and a gesture for performing projection from a large screen to a small screen. For example, the schematic diagram of the projection gesture may include the projection gesture shown in FIG. 5, FIG. 6, or FIG. 7.

In a possible implementation, before performing gesture projection, the user may further set a function parameter related to the gesture projection function, for example, set a projection gesture, select a device to be projected, or establish a communication connection between the mobile phone and a device to be projected. The mobile phone may provide a setting entry for setting the function parameter of the gesture projection function for the user. A location of the setting entry and a manner of entering the setting entry may be set based on a specific requirement. This is not limited in this embodiment of this application.

In an example, the user may tap the gesture projection option in the setting interface of Mobile phone projection to enter the setting interface of Gesture projection, and then set the function parameter related to the gesture projection function on the setting interface of Gesture projection. Certainly, the user may alternatively view the setting interface of Gesture projection and set the function parameter related to the gesture projection function in another manner. This is not limited in this embodiment of this application.

FIG. 12(*a*), FIG. 12(*b*), FIG. 12(*c*), and FIG. 12(*d*) are a schematic diagram of graphical user interfaces of another gesture projection setting process according to an embodiment of this application. FIG. 12(*a*) shows a setting interface 1201 of Gesture projection. The setting interface 1201 includes a gesture projection option and a setting entry. As shown in FIG. 12(*a*), a user taps the setting entry, and in response to the tap operation of the user, a mobile phone displays a next-level setting interface of Gesture projection.

FIG. 12(*b*) shows a next-level setting interface 1202 of Gesture projection. The next-level setting interface 1202 includes a setting entry of Projection gesture and a setting entry of Projection device. It should be understood that, the next-level setting interface 1202 may further include a setting entry of another function parameter of a gesture projection function. This is not limited in this embodiment of this application. As shown in FIG. 12(*b*), the user taps the setting entry of Projection gesture, and in response to the tap operation of the user, the mobile phone displays a setting interface of Projection gesture. FIG. 12(*c*) shows a setting interface 1203 of Projection gesture. The setting interface 1203 includes a plurality of gesture options, and the user may select one or more gestures from the plurality of gesture options as the projection gesture. For example, as shown in FIG. 12(*c*), the user taps Gesture 1, and in response to the tap operation of the user, Gesture 1 is selected as the projection gesture on the mobile phone. FIG. 12(*d*) shows a projection gesture setting completion interface 1204.

In another implementation, the setting interface of Projection gesture may be further configured to set different types of projection gestures. For example, from a plurality of gesture options, a gesture is selected as a gesture for performing projection from a small screen to a large screen, and another gesture is selected as a gesture for performing projection from a large screen to a small screen. Alternatively, the projection gesture may be customized. This is not limited in this embodiment of this application.

In a possible implementation, after the mobile phone enables the gesture projection function, the mobile phone may further automatically search for a device that is in a same local area network as the mobile phone, and display a found device identifier. The user may select one or more device identifiers from an available device list, and use a device identified by the selected device identifier as a device to be projected. After the user selects the device identifier, the mobile phone may automatically establish a communication connection to the device identified by the selected device identifier, to subsequently perform projection with the device identified by the selected device identifier through the communication connection.

Figure 13:
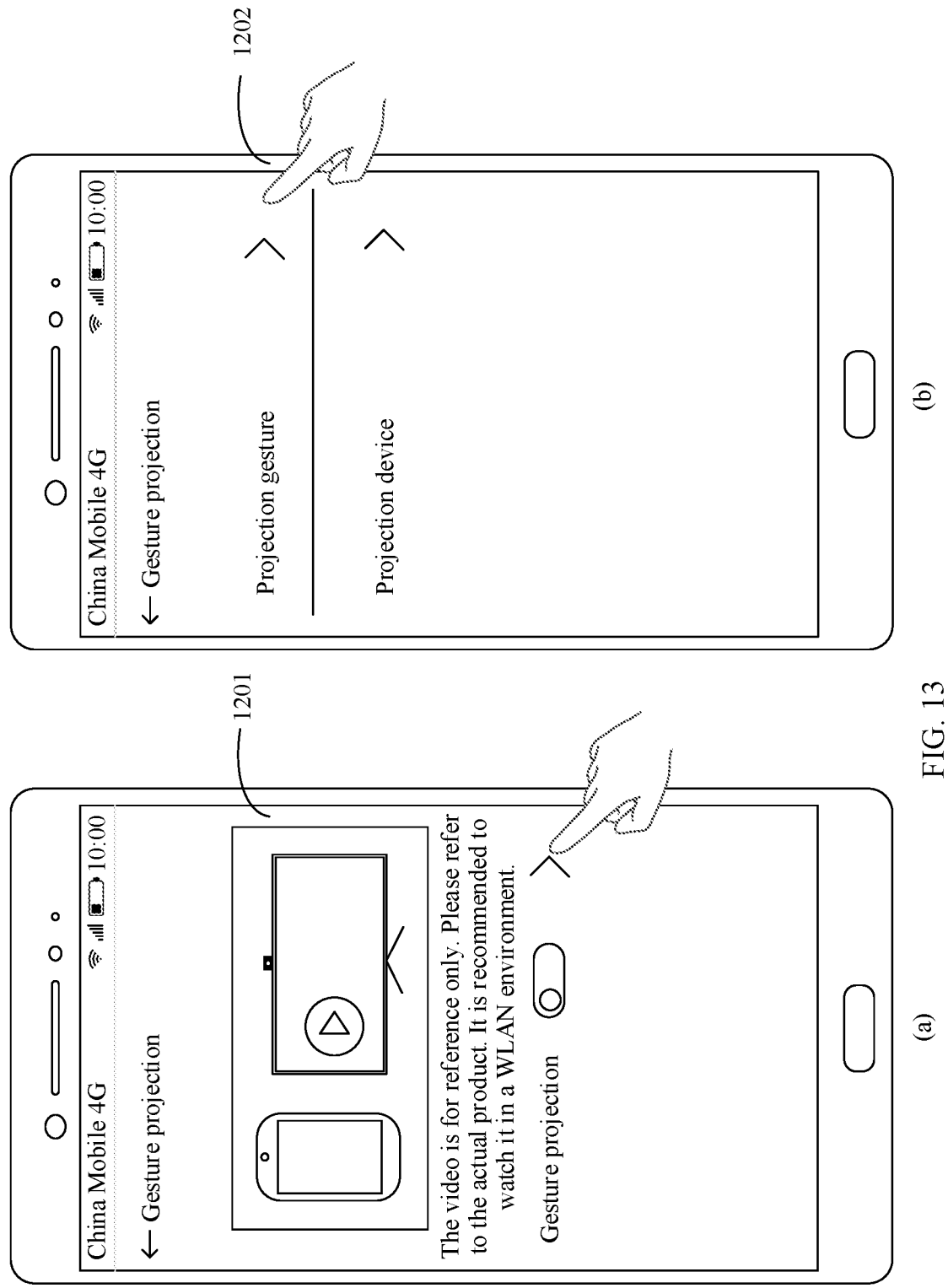
FIG. 13 is a schematic diagram of graphical user interfaces of still another gesture projection setting process according to an embodiment of this application.

FIG. 13 is a schematic diagram of graphical user interfaces of still another gesture projection setting process according to an embodiment of this application. (a) in FIG. 13 shows a setting interface 1301 of Gesture projection. The setting interface 1301 includes a gesture projection option. As shown in (a) in FIG. 13, a user taps the gesture projection option, and in response to the tap operation of the user, a mobile phone may enable a gesture projection function. In addition, after the gesture projection function is enabled, the mobile phone may further automatically search for a device that is in a same local area network as the mobile phone, and display a found device identifier. As shown in (b) in FIG. 13, an available device list is displayed on an interface 1302 after the gesture projection function is enabled, and the available device list includes a smart television 1 that is found by the mobile phone and that is in the same local area network as the mobile phone. After the smart television 1 is found, the mobile phone may automatically establish a communication connection to the smart television 1, or based on a selection operation performed by the user on the smart television 1, the mobile phone may establish a communication connection to the smart television 1 or may not perform an operation of establishing a communication connection to the smart television 1. This is not limited in this embodiment of this application.

In another possible implementation, after the mobile phone automatically searches for the device that is in the same local area network as the mobile phone, the mobile phone may alternatively automatically establish a communication connection to the found device, without the need of the user to perform selection. In still another possible implementation, after the mobile phone enables the gesture projection function, the mobile phone may not automatically search for the device in the same local area network as the mobile phone, or even if the mobile phone automatically searches for the device in the same local area network as the mobile phone, after the device in the same local area network as the mobile phone is found, the mobile phone may not perform a communication connection to the found device, but automatically establishes a communication connection to the projection device in a subsequent gesture projection process, for example, establishes a communication connection to a projected device in a handshake confirmation manner. A manner of establishing a communication connection to the projected device is not limited in this embodiment of this application.

In other words, in this embodiment of this application, the mobile phone may establish a communication connection to a to-be-projected device based on an operation of the user before gesture projection, or may automatically establish a communication connection to a to-be-projected device in a gesture projection process. This is not limited in this embodiment of this application. For example, the mobile phone may automatically establish a communication connection to a smart television in the gesture projection process.

For the smart television, the user may enable a gesture projection function of the smart television by using a setting menu of the smart television, or may enable a gesture projection function of the smart television in another manner, for example, enable the gesture projection function of the smart television by using a voice operation or another interface operation. A location at which the gesture projection function of the smart television may be located in the setting menu may be preset based on a user requirement. This is not limited in this embodiment of this application.

Figure 14:
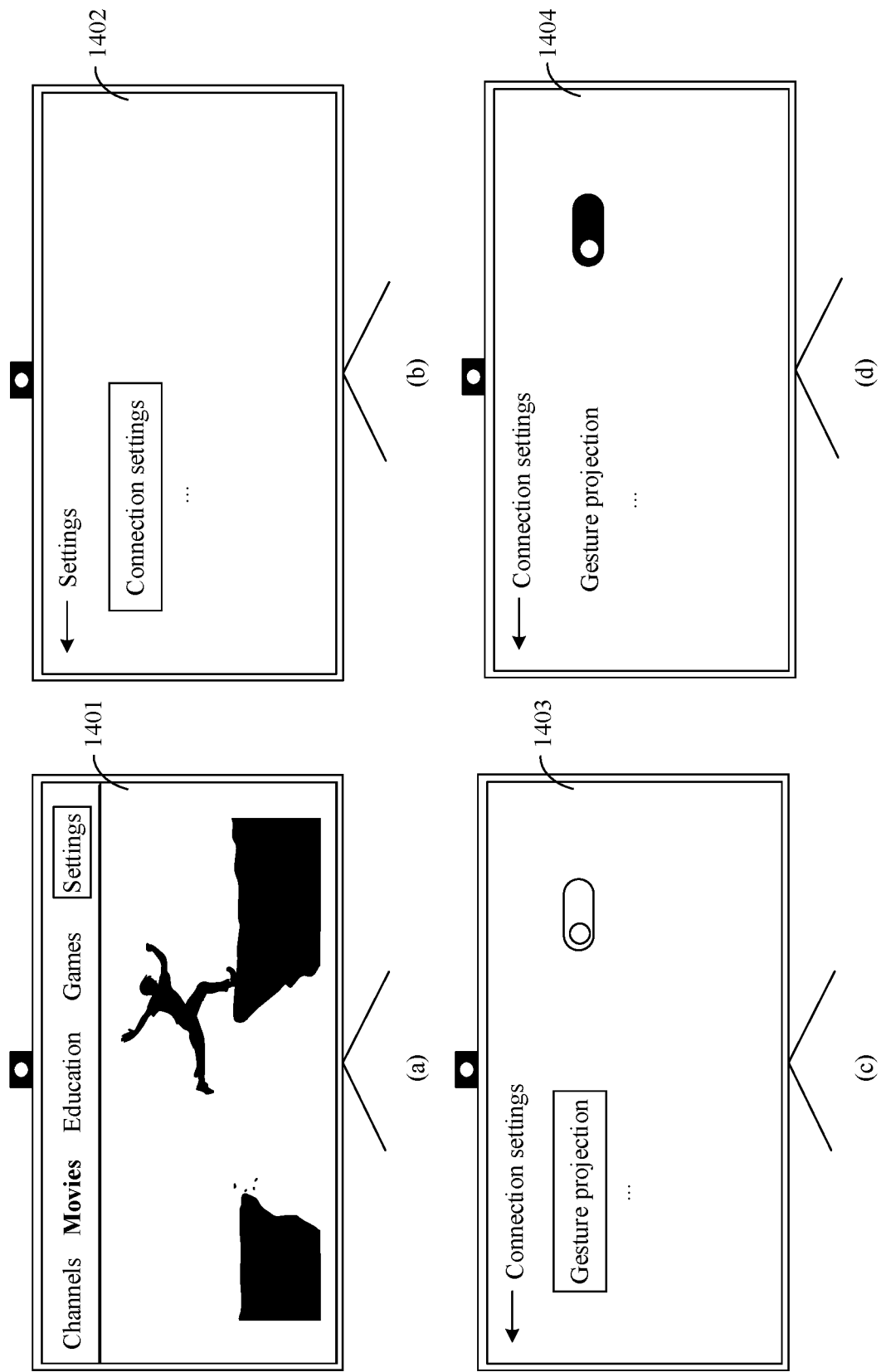
FIG. 14 is a schematic diagram of graphical user interfaces for enabling a gesture projection function of a smart television according to an embodiment of this application.

FIG. 14 is a schematic diagram of graphical user interfaces for enabling a gesture projection function of a smart television according to an embodiment of this application. (a) in FIG. 14 shows interface content 1401 output by the smart television in a power-on state. The interface content 1401 displays menu options such as Channels, Movies, Games, Education, and Settings. It should be understood that, the interface content 1401 may further include more other menu options. This is not limited in this embodiment of this application. As shown in (a) in FIG. 14, a user selects a setting menu option via a remote control, a voice, or the like, and in response to the selection operation of the user, the smart television displays a setting interface. As shown in (b) in FIG. 14, the setting interface 1402 displays a connection setting option. The user selects the connection setting option via the remote control, a voice, or the like, and in response to the selection operation of the user, the smart television displays a connection setting interface. As shown in (c) in FIG. 14, a connection setting interface 1403 includes a gesture projection option. The user selects and sets the gesture projection option via the remote control, a voice, or the like, and in response to the selection operation of the user, the smart television enables the gesture projection function.

The user taps the gesture projection option, and in response to the tap operation of the user, the smart television may enable the gesture projection function. Refer to (d) in FIG. 14. (d) in FIG. 14 provides an interface 1404 after the gesture projection function is enabled. As shown in the interface 1404, after the gesture projection function is enabled, the gesture projection option is lit up.

It should be understood that a graphical user interface for enabling the gesture projection function of the smart television may alternatively be another interface. This is not limited in this embodiment of this application.

In addition, the smart television may also display operation guide information about gesture projection, to notify, by using the operation guide information, the user how to perform gesture projection, the user of related precautions for gesture projection, and the like. For a manner of displaying the operation guide information on the smart television, refer to the foregoing manner of displaying the operation guide information on the mobile phone. Details are not described herein again in this embodiment of this application. In addition, the smart television may also provide a setting entry for the user to set a function parameter of gesture projection. For a manner of providing the setting entry by the smart television, refer to the foregoing manner of providing the setting entry by the mobile phone. Details are not described herein again in this embodiment of this application.

When both the gesture projection function of the mobile phone and the smart television are enabled, the user may project screen content of the mobile phone to the smart television by using a gesture operation.

Figure 15:
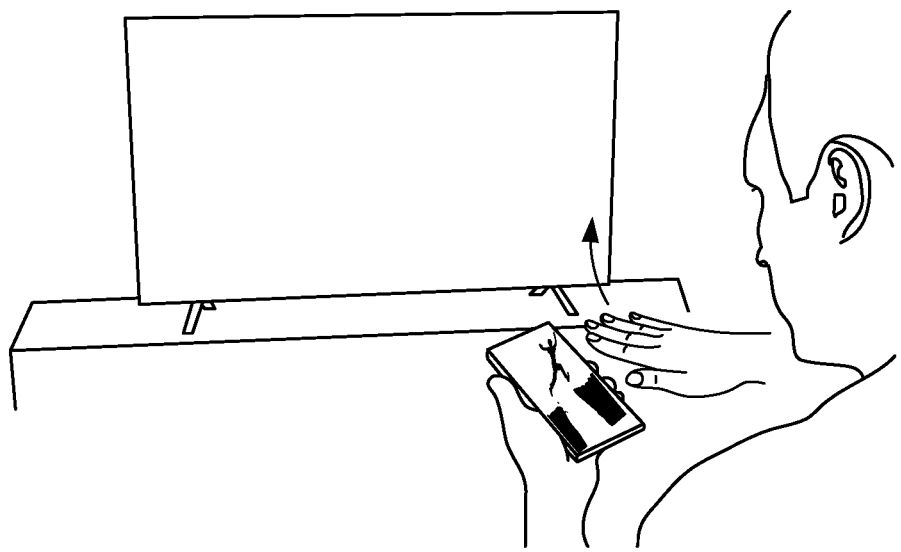
FIG. 15 is a schematic diagram of a gesture projection scenario according to an embodiment of this application.

FIG. 15 is a schematic diagram of a gesture projection scenario according to an embodiment of this application. As shown in FIG. 15, when a user sits on a sofa in a living room to watch a video played by a mobile phone, if the user feels that it is inconvenient for watching the video on the mobile phone, the user may hold the mobile phone with one hand, and perform a projection gesture near the mobile phone and a smart television with the other hand, to trigger, by using the projection gesture, the mobile phone to perform projection to the smart television in front of the user, so that the user can watch the video played by the mobile phone on a large screen of the smart television. As shown in FIG. 15, the projection gesture may be a gesture in which a palm faces downward and moves from the mobile phone to a direction close to the smart television, namely, a gesture in which the palm pushes forward from the mobile phone to the smart television, such as the gesture 3 in FIG. 7. Certainly, the projection gesture may alternatively be the gesture 1 in FIG. 6 or another gesture. This is not limited in this embodiment of this application.

Figure 16:
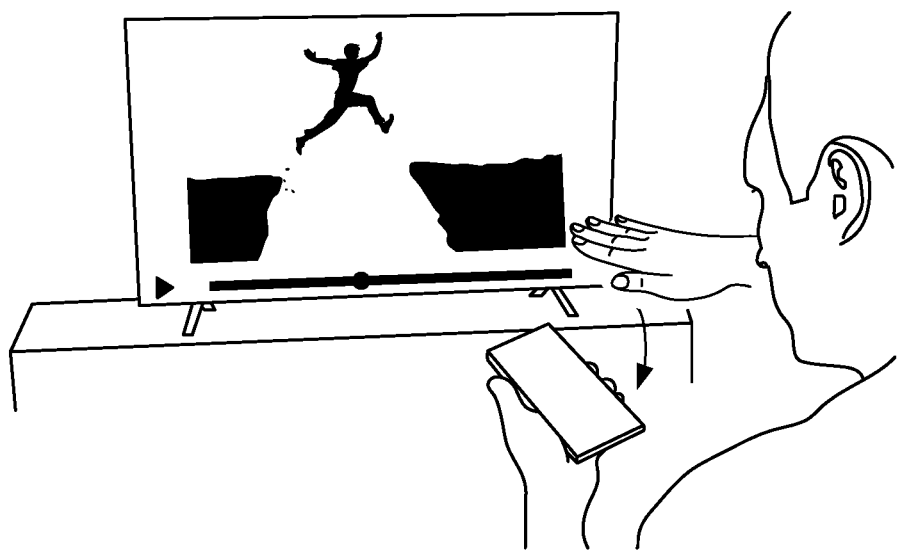
FIG. 16 is a schematic diagram of another gesture projection scenario according to an embodiment of this application.

FIG. 16 is a schematic diagram of another gesture projection scenario according to an embodiment of this application. As shown in FIG. 16, in a process of playing a video by a smart television, if a user wants to watch, on a mobile phone, the video played by the smart television, the user may hold the mobile phone with one hand, and perform a projection gesture near the smart television and the mobile phone with the other hand, to trigger, by using the projection gesture, the smart television to project screen content to the mobile phone. As shown in FIG. 16, the projection gesture may be a gesture in which a palm faces downward and moves from the smart television to a direction close to the mobile phone, namely, a gesture in which the palm pulls back from the smart television to the mobile phone, such as the gesture 4 in FIG. 7. Certainly, the projection gesture may alternatively be the gesture 2 in FIG. 6 or another gesture. This is not limited in this embodiment of this application.

It should be understood that the projection gesture may alternatively be set as another gesture, and a gesture projection scenario may alternatively be applied to another scenario. Projected screen content may be a video, or may be other content, such as an image or a video call. This is not limited in this embodiment of this application.

In a possible implementation, in a process in which the mobile phone performs projection to the smart television, the mobile phone and the smart television may further perform visual display of the projection process, to achieve a seamless projection connection effect by changing display interfaces, and then improve projection experience of the user. For example, in the process in which the mobile phone performs projection to the smart television, screen content of the mobile phone may be gradually moved out of a display screen of the mobile phone, and gradually moved into a display screen of the smart television, to achieve a projection effect that the screen content is gradually moved from the mobile phone to the smart television. For another example, in a process in which the smart television performs projection to the mobile phone, screen content of the smart television may be gradually moved out of a display screen of the smart television, and gradually moved into a display screen of the mobile phone, to achieve a projection effect that the screen content is gradually moved from the smart television to the mobile phone.

In a possible implementation, to improve flexibility, the user may further control a moving-in proportion and a moving-out proportion of the screen content by controlling a movement distance of a projection gesture. The moving-in proportion is a proportion of a part of the screen content moved into the display screen to an entire part of the screen content, and the moving-out proportion is a proportion of a part of the screen content moved out of the display screen to the entire part of the screen content. That the projection gesture is a gesture in which a palm faces a user and moves away from a mobile phone is used as an example. In a process in which the user performs the projection gesture, as a distance that the palm of the user moves away from the mobile phone gradually increases, the moving-out proportion of the screen content moved out of the display screen of the mobile phone and the moving-in proportion of the screen content moved into the screen of the smart television accordingly increase.

Figure 17:
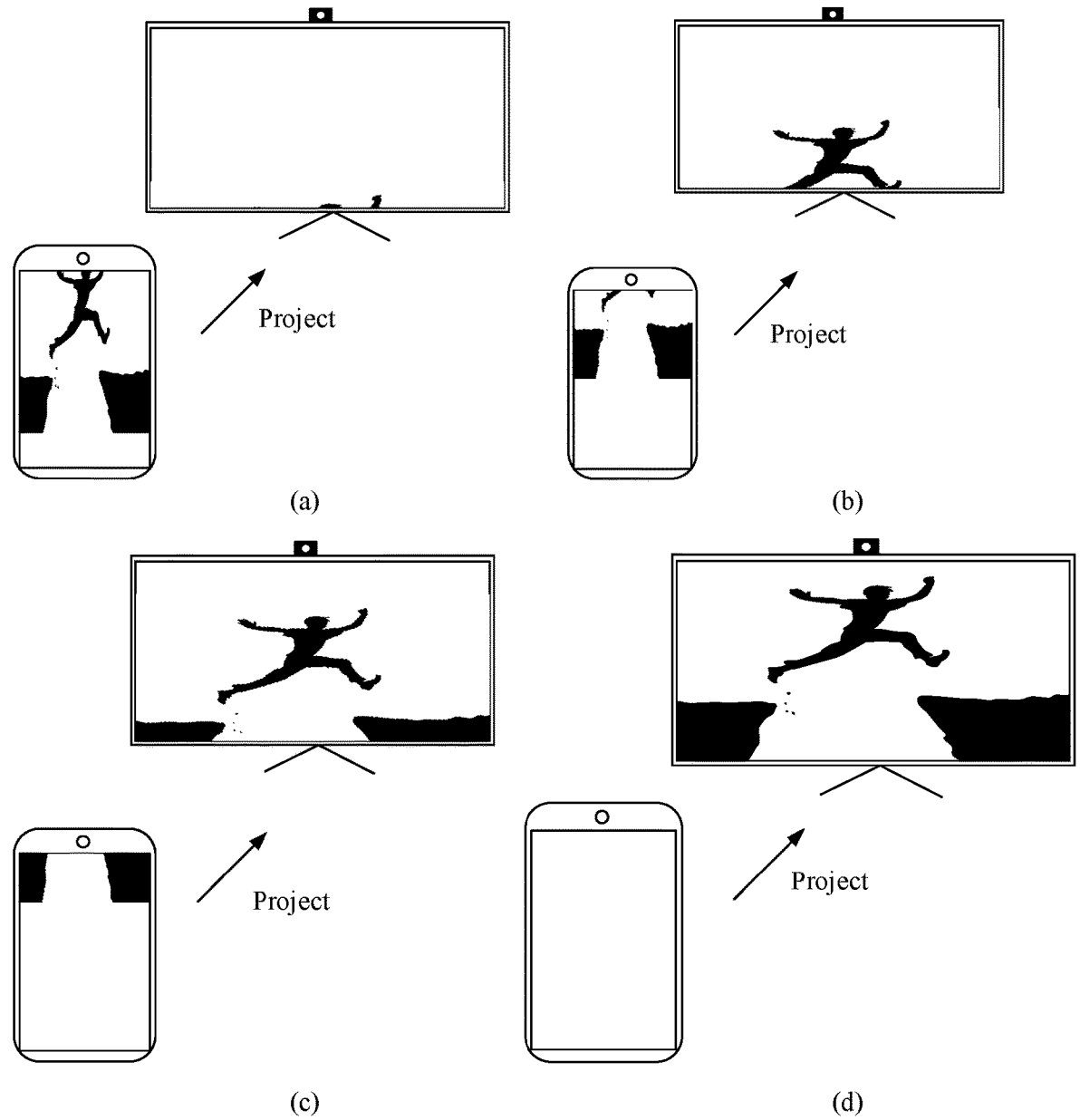
FIG. 17 is a schematic diagram of a connection effect of gesture projection according to an embodiment of this application.

In an example, each time the palm of the user moves 2 cm away from the user, the moving-in proportion and the moving-out proportion of the screen content increase by 10%. FIG. 17 is a schematic diagram of a connection effect of gesture projection according to an embodiment of this application. As shown in (a) in FIG. 17 to (c) in FIG. 17, in a process in which a mobile phone performs projection to a smart television, screen content of the mobile phone may be gradually moved out from an upper side of a display screen of the mobile phone, and gradually moved in from a lower side of the smart television. As shown in (a) in FIG. 17, if a palm of a user moves 4 cm away from the mobile phone, 20% of the screen content is moved out of the display screen of the mobile phone, and 20% of the screen content is moved into a display screen of the smart television. As shown in (b) in FIG. 17, if the palm of the user moves 10 cm away from the mobile phone, 50% of the screen content is moved out of the display screen of the mobile phone, and 50% of the screen content is moved into the display screen of the smart television. As shown in (c) in FIG. 17, if the palm of the user moves 16 cm away from the mobile phone, 80% of the screen content is moved out of the display screen of the mobile phone, and 80% of the screen content is moved into the display screen of the smart television. As shown in (d) in FIG. 17, if the palm of the user moves 20 cm away from the mobile phone, 100% of the screen content is moved out of the display screen of the mobile phone, and 100% of the screen content is moved into the display screen of the smart television, that is, the screen content is completely moved into the display screen of the smart television.

In addition, in a process in which the user controls the moving-in proportion and the moving-out proportion of the screen content by controlling the movement distance of the projection gesture, after the moving-in proportion and the moving-out proportion of the screen content increase with the movement distance of the projection gesture, if the movement distance of the projection gesture decreases again, the moving-in proportion and moving-out proportion of the screen content can also be reduced again. In this way, equivalently, the screen content that has been moved into the smart television may further return to the display screen of the mobile phone again based on a decrease in the movement distance of the projection gesture. This further improves projection experience of the user.

For example, refer to (b) in FIG. 17, if the palm of the user moves 10 cm from 0 in a direction away from the mobile phone, 50% of the screen content is moved out of the display screen of the mobile phone, and 50% of the screen content is moved into the smart television. If the palm of the user moves 10 cm away from the mobile phone, and then moves in a direction close to the mobile phone, the screen content is returned from the display screen of the smart television to the display screen of the mobile phone. For example, as shown in (a) in FIG. 17, the screen content is returned to a state in which 10% of the screen content is moved out of the display screen of the mobile phone and 10% of the screen content is moved into the smart television. In addition, if the palm of the user moves to an original location in the direction close to the mobile phone, the screen content is completely returned from the display screen of the smart television to the display screen of the mobile phone, that is, the screen content is returned to a state in which 0% of the screen content is moved out of the display screen of the mobile phone and 0% of the screen content is moved into the smart television.

In an example, after the mobile phone recognizes the projection gesture and gradually moves out the screen content of the mobile phone from the display screen, if projection fails within preset duration, the mobile phone may further move the screen content that has been moved out back to the display screen of the mobile phone. For example, within the preset duration after the mobile phone recognizes the projection gesture, triggers projection of the screen content of the mobile phone to the smart television, and gradually moves out the screen content of the mobile phone from the display screen of the mobile phone, if the smart television does not detect the projection gesture because a camera is faulty, the projection gesture is outside a field of view of the camera of the smart television, or the like to cause a fact that projection fails within the preset duration, the mobile phone can move the moved-out screen content back to the display screen of the mobile phone. The preset duration may be preset, for example, may be set to 3 seconds, 5 seconds, or 8 seconds.

It should be understood that the foregoing gesture projection process is merely described by using an example in which the first device is the mobile phone and the second device is the smart television. In another embodiment, the first device and the second device may alternatively be devices of another type. If the first device and the second device are the devices of another type, the graphical user interface displayed by the first device or the second device, the setting manner of the gesture projection function, and the projection gesture may alternatively be adaptively adjusted based on specific devices. This is not limited in embodiments of this application.

Figure 18:
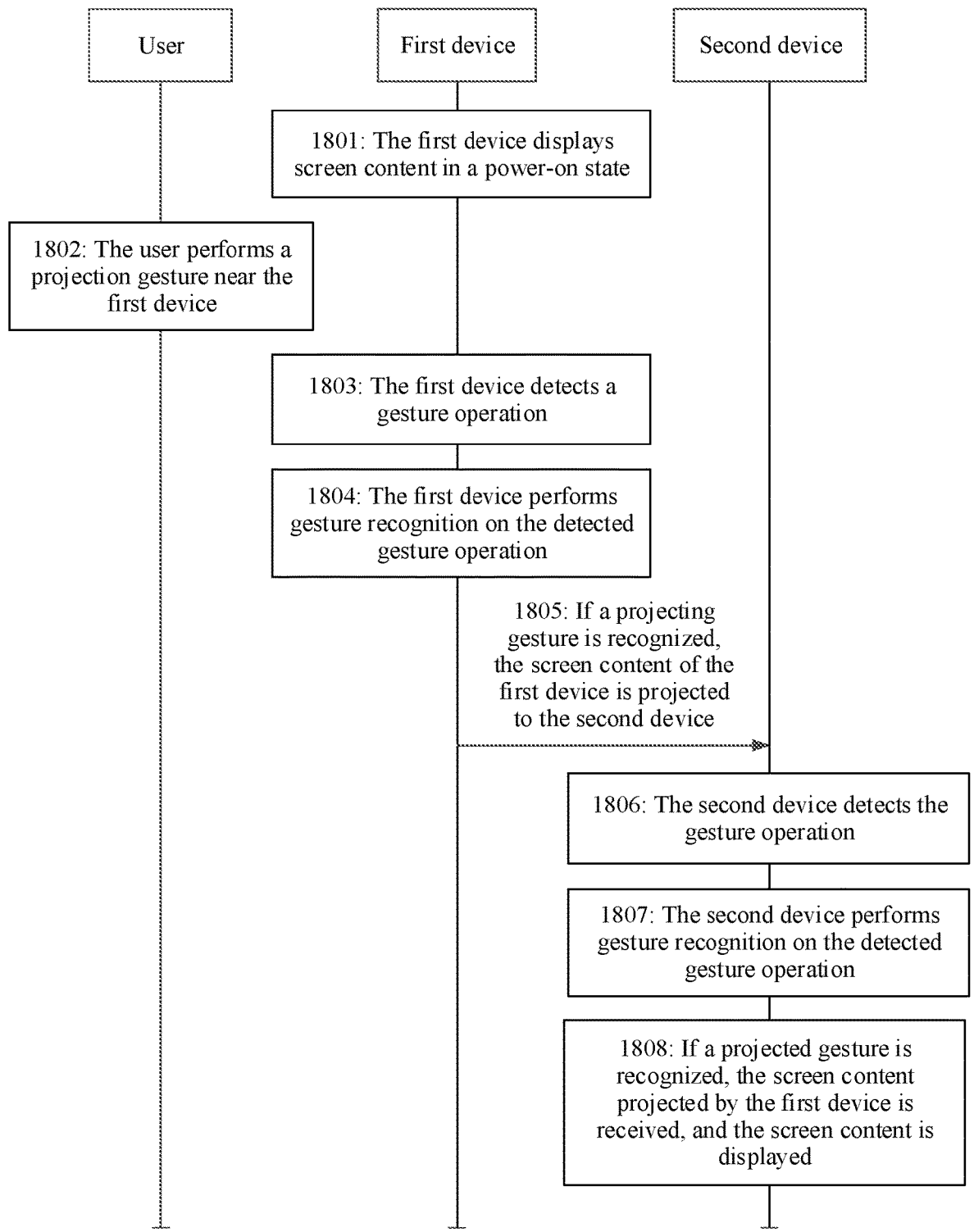
FIG. 18 is a schematic diagram of a projection method according to an embodiment of this application.

The following describes the projection method according to embodiments of this application in detail. FIG. 18 is a schematic diagram of a projection method according to an embodiment of this application. Interaction bodies in the method are a first device and a second device. As shown in FIG. 18, the method includes the following steps.

Step 1801: The first device displays screen content in a power-on state.

It should be noted that the screen content displayed by the first device may include a multimedia file playback interface, a video call interface, a voice call interface, an application display interface, a home screen of the device, or the like. This is not limited in this embodiment of this application. A multimedia file may include a video, audio, an image, a text, or the like. This is also not limited in this embodiment of this application.

In addition, the first device may display the screen content after being powered on, or display the screen content after being powered on and unlocked.

For example, the first device is in a screen-locked state after being powered on. A user first unlocks a display screen of the first device, then opens a video playback application by using a display interface obtained after unlocking, and selects to play a video in the video playback application. In this way, the first device displays a video playback interface.

For another example, in a screen-unlocked state, a user may use the first device to make a video call with another user. In this way, the first device displays the video call interface. In an example, the user may make a video call with another user by using a video call application installed on the first device, for example, make a video call by using an installed instant messaging application. In another example, the user may alternatively make a video call with another user by using a built-in video call function of a system of the first device, for example, make a video call by using a MeeTime function provided by the system. This is not limited in this embodiment of this application.

It should be noted that the second device may further exist near the first device, and the second device is in a power-on state. For example, the first device is a mobile phone, and the second device is a smart television located near the mobile phone and in a power-on state.

Step 1802: The user performs a projection gesture near the first device.

When the first device displays the screen content, if the user wants to project the screen content of the first device to the second device, to view the screen content of the first device by using the second device, the user may perform the projection gesture near the first device, to trigger the first device to perform projection by using the projection gesture.

It should be noted that the projection gesture is a preset specific gesture. The projection gesture may be preset by the first device by default, or may be manually set by the user as required. A setting manner of the projection gesture is not limited in this embodiment of this application. In addition, the projection gesture may be a static gesture, or may be a dynamic gesture. This is not limited in this embodiment of this application.

In an example, the projection gesture may be a gesture in which a palm faces the first device and moves away from the first device. Alternatively, the projection gesture is a gesture in which a back of a hand faces the first device and moves away from the first device. Alternatively, the projection gesture is a gesture in which a palm faces the ground, a thumb faces the first device, and they move away from the first device. Alternatively, the projection gesture is a gesture in which a palm faces the ground, a little finger faces the first device, and they move away from the first device. Certainly, the projection gesture may alternatively be set to another gesture. This is not limited in this embodiment of this application.

Step 1803: The first device detects a gesture operation.

It should be noted that the first device may be configured with a gesture collection module, and detect the gesture operation of the user by using the gesture collection module. Optionally, the gesture collection module may be a photographing assembly, a sound wave sensor, or the like.

For example, the gesture collection module is the photographing assembly. The first device may capture, by using the photographing assembly, an image including the gesture operation, to detect the gesture operation of the user by using the captured image.

Step 1804: The first device performs gesture recognition on the detected gesture operation.

After performing gesture recognition on the detected gesture operation, the first device may obtain a gesture recognition result. The gesture recognition result may indicate whether the detected gesture operation is a projecting gesture.

Optionally, if the detected gesture operation is the projecting gesture, the gesture recognition result may further include one or more pieces of the following information: a movement direction and a movement distance of the projecting gesture. The movement distance may be a track length of a moving track of the projecting gesture, or may be a distance between a current location and a start location of the projection gesture. This is not limited in this embodiment of this application.

In an example, if the gesture collection module of the first device is the photographing assembly, the first device may perform image analysis on the image captured by the photographing assembly, to obtain the gesture recognition result.

In a possible implementation, the first device may perform image analysis on the captured image by using an AI technology, to obtain a gesture recognition result. For example, recognition processing may be performed on the captured image by using a pre-trained first gesture recognition model, to obtain a gesture recognition result. The first gesture recognition model is configured to recognize a projecting gesture in an image. The first gesture recognition model may be a machine learning model, for example, a neural network model.

Step 1805: If recognizing the projecting gesture, the first device projects the screen content of the first device to the second device.

In other words, after the first device recognizes the projecting gesture, a projecting action may be triggered, and the screen content of the first device is projected to the second device.

In an example, the screen content of the first device may be projected to the second device in the following several projecting manners:

Projection manner 1 is a screen mirroring mode.

The screen mirroring mode means that the display screen of the first device is synchronized with a display screen of the second device. Content displayed on the display screen of the first device is also displayed on the display screen of the second device. Generally speaking, in the screen mirroring mode, the display screen of the second device is equivalent to another display screen of the first device, and displays same screen content as the display screen of the first device.

In an example, in the screen mirroring mode, the operation that the first device projects the screen content of the first device to the second device may include: performing screen recording on the display screen of the first device, and sending screen recording data to the second device.

Projection manner 2 is a streaming media push mode.

The streaming media push mode means that a multimedia file in the first device is displayed on the second device in a streaming media push manner. In the streaming media push mode, only the multimedia file can be projected.

The multimedia file may include audio, a video, an image, a text, or the like. This is not limited in this embodiment of this application. In addition, the multimedia file may be a locally stored multimedia file, or may be a multimedia file on a network. This is not limited in this embodiment of this application.

In an example, in the streaming media push mode, the operation that the first device projects the screen content of the first device to the second device may include: obtaining streaming media data of the screen content of the first device, and sending the streaming media data to the second device. The streaming media data is streaming media data of a multimedia file displayed by the first device, and may be obtained by performing streaming media data conversion on the multimedia file displayed by the first device.

In projection manner 3, content-related information of the screen content of the first device is obtained, the content-related information is sent to the second device, and the second device displays the screen content indicated by the content-related information.

The content-related information of the screen content of the first device is used to indicate the screen content of the first device. For example, if the screen content of the first device is a playback interface of a multimedia file, the content-related information includes at least a link address of the multimedia file. If the screen content of the first device is a video call interface, the content-related information includes at least call transfer information of a video call.

It should be noted that projection manner 3 is a new projection manner according to this embodiment of this application. In this projection manner, neither screen recording nor streaming media data conversion is required. In addition, a data amount of the sent content-related information is far less than a data amount of the screen recording data and a data amount of the streaming media data. Therefore, in this projection manner, a calculation amount is small, and a transmitted data amount is also small, so that projection efficiency is improved, a delay in a projection process is reduced, and projection experience is improved.

In an example, the operations of obtaining the content-related information of the screen content of the first device and sending the content-related information to the second device may include the following several cases.

Case 1: If the first device is playing the multimedia file, the first device obtains file-related information of the multimedia file, and sends the file-related information of the multimedia file to the second device.

The multimedia file may include a video, audio, a text, an image, or the like. The file-related information of the multimedia file includes at least the link address of the multimedia file, for example, a uniform resource locator (uniform resource locator, URL) of the multimedia file. Optionally, the file-related information of the multimedia file may further include playback progress information of the multimedia file. The playback progress information is used to indicate playback progress of the multimedia file on the first device, and may be a time point at which the multimedia file is currently played, or the like.

Figure 19:
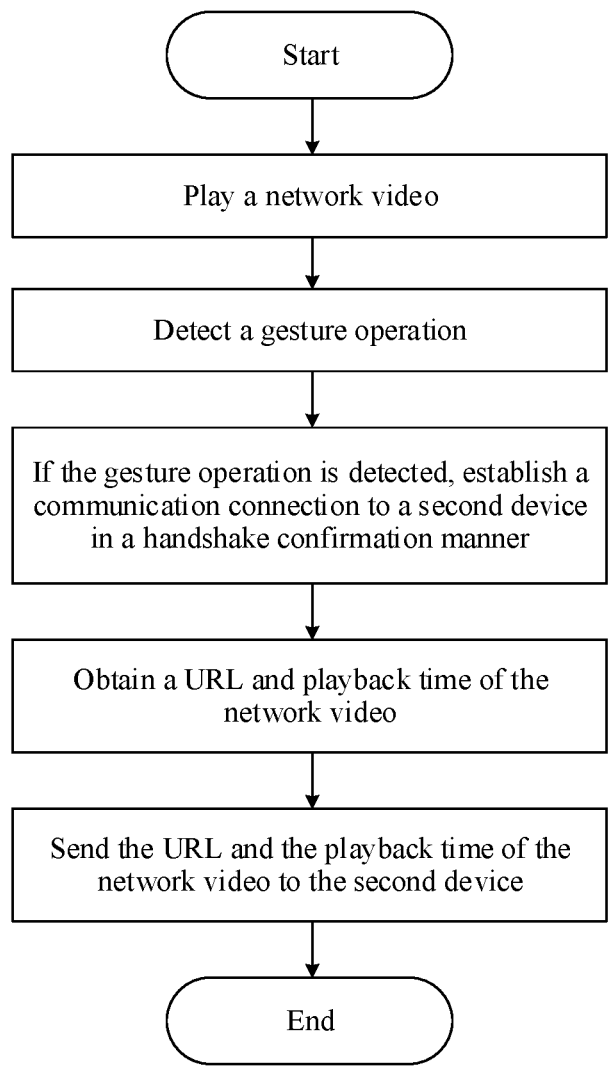
FIG. 19 is a flowchart of projecting a played network video according to an embodiment of this application.

FIG. 19 is a flowchart of projecting a played network video according to an embodiment of this application. As shown in FIG. 19, in a process of playing a network video, a first device may detect a gesture operation of a user. If a projecting gesture is recognized, a communication connection to a second device is established in a handshake confirmation manner, and then a URL and playback progress information of the network video are obtained. The URL and the playback progress information of the network video are sent to the second device.

Case 2: If the first device is making the video call, the first device obtains the call transfer information of the video call, and sends the call transfer information to the second device.

The call transfer information of the video call is used to transfer the video call of the first device to the second device. The call transfer information of the video call may include a video call identifier. A video call identifier such as an identity document (identity document, ID) of a video call is used to uniquely identify a current video call.

Optionally, the video call identifier may further include a device identifier of the first device, a user identifier of a logged-in user of the first device, or the like. The device identifier may be a device name, a device ID, or the like, and the user identifier may be a user name, a user account, a user ID, or the like.

Step 1806: The second device detects the gesture operation.

It should be noted that the second device may be configured with a gesture collection module, and detect the gesture operation of the user by using the gesture collection module. Optionally, the gesture collection module may be a photographing assembly, a sound wave sensor, or the like.

For example, the gesture collection module is the photographing assembly. The second device may capture, by using the photographing assembly, an image including the gesture operation, to detect the gesture operation of the user by using the captured image.

Step 1807: The second device performs gesture recognition on the detected gesture operation.

After performing gesture recognition on the detected gesture operation, the second device may obtain a gesture recognition result. The gesture recognition result may indicate whether the detected gesture operation is a projected gesture.

The projected gesture is a gesture obtained by collecting the projection gesture from a perspective of the second device. For example, the projected gesture is a gesture whose hand posture and/or action are/is opposite to that of the projecting gesture.

For example, if the projecting gesture is a gesture in which a palm faces the first device and moves away from the first device, the projected gesture is a gesture in which a back of a hand faces the second device and moves closer to the second device. For another example, if the projecting gesture is a gesture in which a palm faces the ground and a thumb faces the first device, and they move away from the first device, the projected gesture is a gesture in which the palm faces the ground and a little finger faces the second device, and they move closer to the second device.

Optionally, if the detected gesture operation is the projected gesture, the gesture recognition result may further include one or more pieces of the following information: a movement direction and a movement distance of the projected gesture. The movement distance may be a track length of a moving track of the projected gesture, or may be a distance between a current location and a start location of the projected gesture. This is not limited in this embodiment of this application.

In an example, the movement distance of the projected gesture is the same as the movement distance of the projecting gesture. Optionally, the movement distance of the projected gesture may be determined based on the gesture recognition result of the first device. For example, after the first device recognizes the projecting gesture, the first device may send the gesture recognition result of the first device to the second device. The second device may determine, based on the gesture recognition result of the first device and the gesture recognition result of the second device, the movement distance of the projected gesture.

In an example, if the gesture collection module of the second device is the photographing assembly, the second device may perform image analysis on the image captured by the photographing assembly, to obtain the gesture recognition result.

In a possible implementation, the second device may perform image analysis on the captured image by using an AI technology, to obtain a gesture recognition result. For example, recognition processing may be performed on the captured image by using a pre-trained second gesture recognition model, to obtain a gesture recognition result. The second gesture recognition model is used to recognize a projected gesture in an image. The second gesture recognition model may be a machine learning model, for example, a neural network model.

Step 1808: If the second device recognizes the projected gesture, the second device receives the screen content projected by the first device, and displays the screen content.

If the second device recognizes the projected gesture, the second device may trigger to wait to receive screen content projected by another device. If the screen content projected by the first device is received, the screen content may be displayed.

In an example, that the screen content projected by the first device is received, and the screen content is displayed may include the following several implementations.

Implementation 1: Screen recording data sent by the first device is received, and the screen recording data is received. The screen recording data is obtained by the first device by performing screen recording on the display screen of the first device.

Implementation 2: Streaming media data of the screen content sent by the first device is received, and the streaming media data is played.

Implementation 3: Content-related information sent by the first device is received, and the screen content of the first device is displayed based on the content-related information, where the content-related information is used to indicate the screen content of the first device.

In an example, the operation of displaying the screen content of the first device based on the content-related information includes the following several cases.

Case 1: If the content-related information is file-related information of a multimedia file being played by the first device, and the file-related information includes at least a link address of the multimedia file, the multimedia file may be obtained based on the link address, and the obtained multimedia file is played.

It should be noted that a multimedia playback application used by the second device to play the multimedia file may be the same as or different from a multimedia playback application used by the first device to play the multimedia file.

In an example, before playing the obtained multimedia file, the second device may first open a specified multimedia playback application, and then play the obtained multimedia file by using the specified multimedia playback application. The specified multimedia playback application may be a multimedia playback application that is set by default by the second device, or may be a same multimedia playback application as the multimedia playback application that is in the first device and that plays the multimedia file. In an example, if the multimedia file is a video, the specified multimedia playback application may be Huawei video playback software.

In a possible implementation, if the file-related information of the multimedia file further includes playback progress information of the multimedia file, after the multimedia file is obtained based on the link address, the multimedia file may starts to be played, based on the playback progress information, from playback progress indicated by the playback progress information.

Case 2: If the content-related information is call transfer information of a video call being performed by the first device, the video call of the first device is transferred to the second device based on the call transfer information, and a video call interface obtained after call transfer is displayed.

The second device may transfer, to the second device based on a video call identifier in the call transfer information, a video call indicated by the video call identifier, so that the user can directly use the second device to continue the video call previously performed on the first device.

In a possible implementation, before projecting the screen content to the second device, the first device may further first establish a communication connection to the second device, to project the screen content to the second device through the established communication connection.

It should be noted that establishment of the communication connection between the first device and the second device may be triggered by an operation of the user on an interface of the first device or the second device, or may be automatically performed by the first device or the second device. This is not limited in this embodiment of this application. For example, the first device may automatically establish the communication connection to the second device after a gesture projection function is enabled, or automatically establish the communication connection to the second device after a projecting gesture is recognized.

In an example, after the gesture projection function is enabled, the first device may trigger to search for a device that is in a same local area network as a mobile phone, and then establish a communication connection to the found device.

In another example, after recognizing the projecting gesture, the first device may initiate a handshake to the second device, and establish a communication connection to the second device in a handshake confirmation manner.

It should be further noted that the first device may perform projection by using a projection protocol, or may perform projection by using a communication connection established in a handshake confirmation manner. This is not limited in this embodiment of this application. The projection protocol includes a digital living network alliance (digital living network alliance, DLNA) protocol, a lelink (lelink) protocol, an airplay protocol (which is a projection protocol provided by the iOS system), or the like.

In a possible implementation, after the second device receives the screen content projected by the first device, and displays the projected screen content, that is, after the projection is successful, the second device may further send a projection success response to the first device. The projection success response is used to indicate that projection performed by the first device succeeds. For example, after playing the multimedia file projected by the first device, the second device may send a playback success response to the first device. Alternatively, after performing call transfer on the video call projected by the first device, the second device may send a call transfer success response to the first device.

In a possible implementation, after the first device receives the projection success response sent by the second device, the first device may further stop displaying current screen content, for example, stop playing a current multimedia file or stop making a current video call.

It should be understood that, in this embodiment of this application, an example in which the first device first performs gesture detection and recognition, and then the second device performs gesture detection and recognition is used for description. However, during actual application, execution sequences of the two operations may be opposite, or the two operations may be simultaneously performed. The execution sequences are not limited in this embodiment of this application.

In addition, in this embodiment of this application, an example in which the first device performs projection to the second device is merely used for description. In another embodiment, the second device may alternatively perform projection to the first device, and a projection method that the second device performs projection to the first device is similar to a projection method that the first device performs projection to the second device. Details are not described herein again in this embodiment of this application.

In this embodiment of this application, the first device may detect the gesture operation of the user, perform gesture recognition on the detected gesture operation, and trigger the first device to project the screen content to the second device when the projecting gesture is recognized. In this way, the user performs the projection gesture near the first device, to quickly trigger the first device to perform projection, thereby improving projection efficiency and flexibility, and increasing projection manners.

Figure 20A:
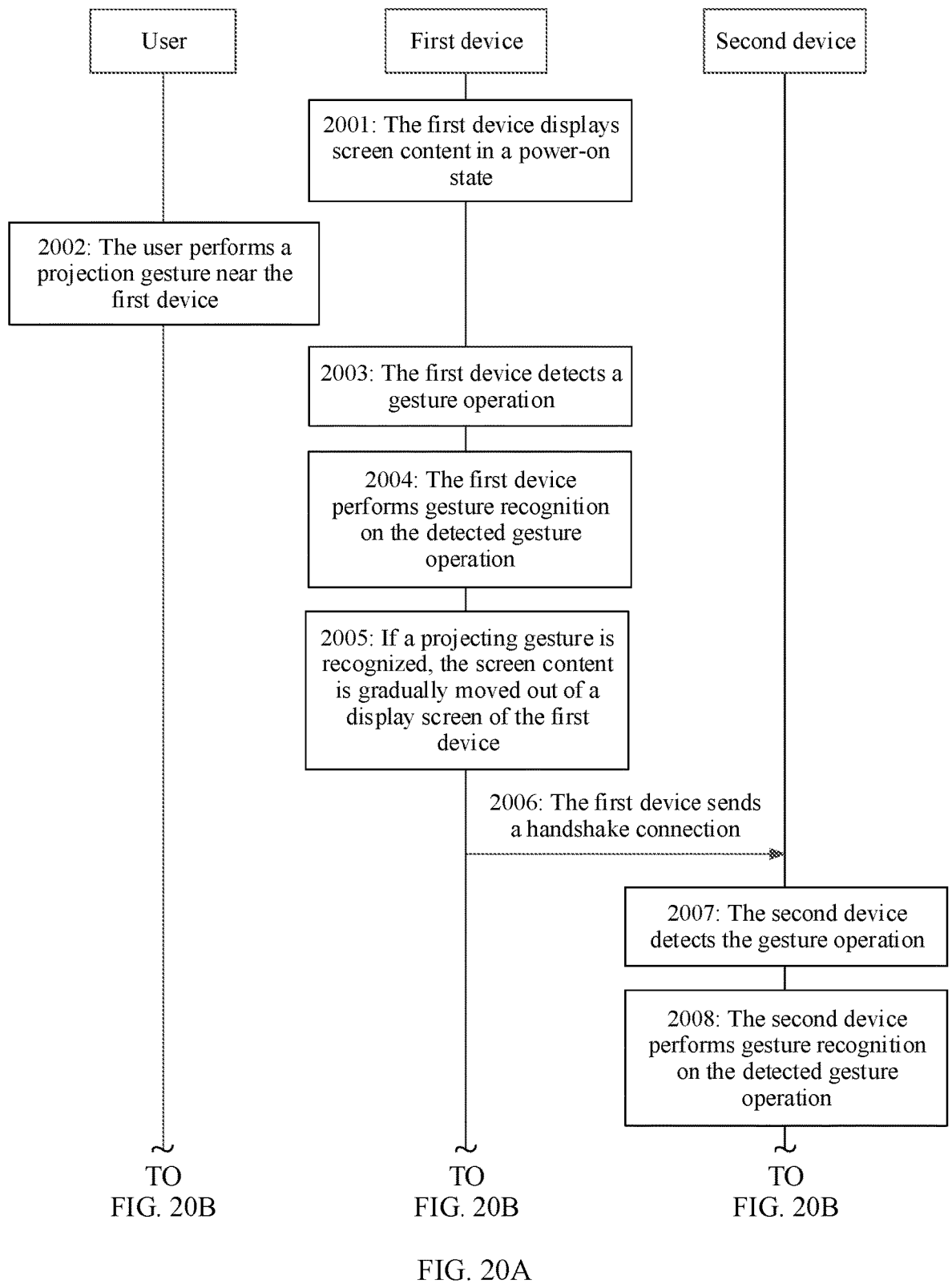
FIG. 20A and FIG. 20B are a schematic diagram of another projection method according to an embodiment of this application.
Figure 20B:
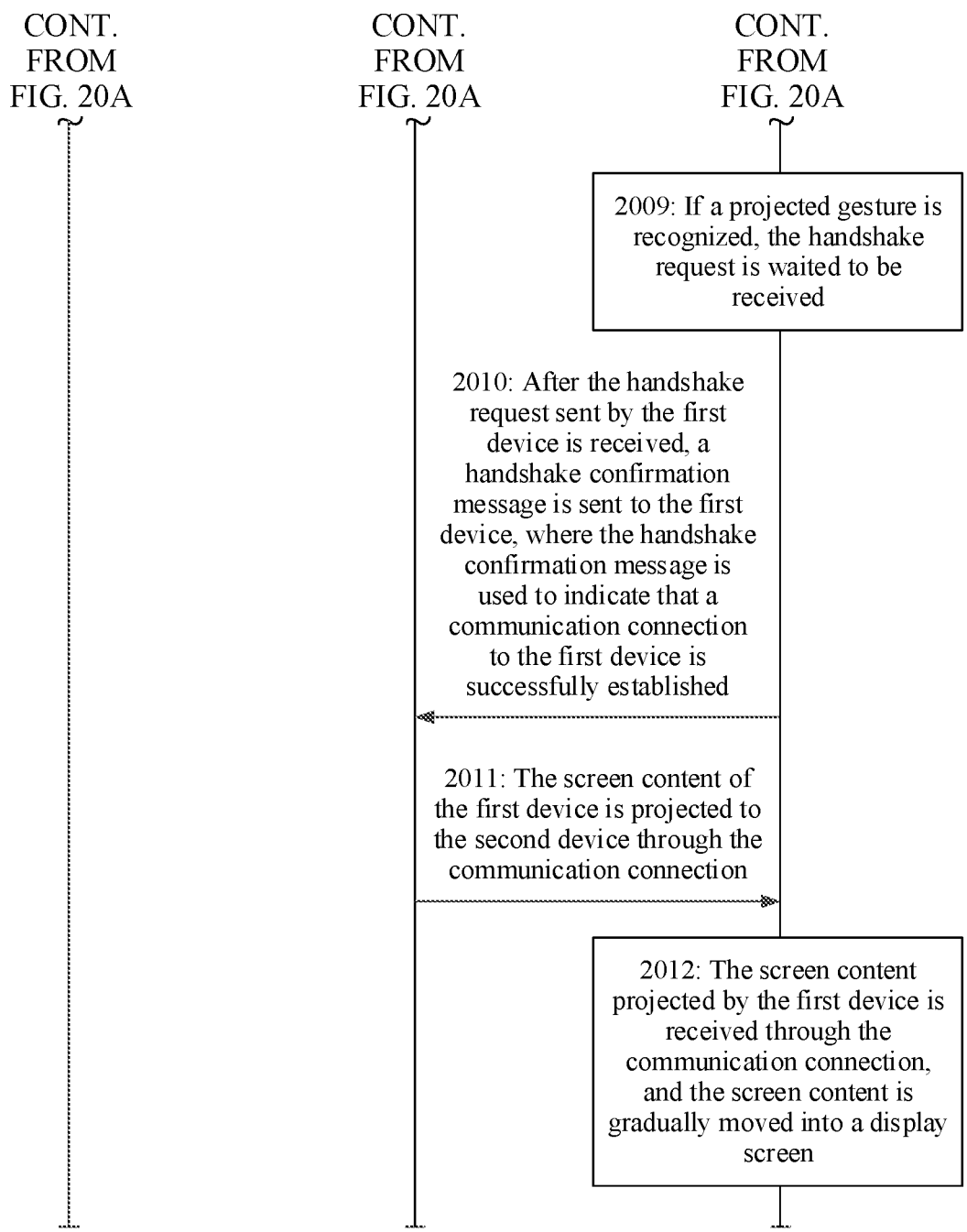

FIG. 20A and FIG. 20B are a schematic diagram of another projection method according to an embodiment of this application. Interaction bodies in the method are a first device and a second device. The first device is a projecting device, and the second device is a projected device. As shown in FIG. 20A and FIG. 20B, the method includes the following steps.

Step 2001: The first device displays screen content in a power-on state.

Step 2002: A user performs a projection gesture near the first device.

Step 2003: The first device detects a gesture operation.

Step 2004: The first device performs gesture recognition on the detected gesture operation.

It should be noted that step 2001 to step 2004 are similar to step 1801 to step 1804. For a specific implementation process, refer to related descriptions of step 1801 to step 1804. Details are not described herein again in this embodiment of this application.

Step 2005: If recognizing a projecting gesture, the first device gradually moves out the screen content of the first device from a display screen of the first device.

In this embodiment of this application, after the projecting gesture is recognized, the screen content of the first device may be gradually moved out from a side of the display screen, to implement a visual effect of gradually projecting the screen content, and improve projection experience of the user.

In a possible implementation, the first device may gradually move out the screen content of the first device from the side of the display screen of the first device. In an example, the side that is of the display screen and from which the screen content is moved out may be set by default, for example, the side is set by default to an upper side, a lower side, a left side, or a right side of the display screen, or is set by default to a side that is of the display screen and that is close to the second device. In another example, the side that is of the display screen and from which the screen content is moved out may alternatively be determined based on a movement direction of the projecting gesture. Certainly, the side may alternatively be determined in another manner. This is not limited in this embodiment of this application.

It should be noted that the screen content gradually moved out of the display screen may be constantly changing display pictures displayed by the first device. In this case, the moved-out screen content is a plurality of frames of pictures that are dynamically played. Alternatively, the screen content gradually moved out of the display screen may be a frame of display picture that is being displayed when the first device recognizes the projecting gesture. In this case, the moved-out screen content is a frame of picture that is statically displayed.

In a possible implementation, the screen content of the first device may be gradually moved out from the side of the display screen in a manner of gradually increasing a moving-out proportion. The moving-out proportion is a proportion of a part of the screen content moved out of the display screen to an entire part of the screen content.

In an example, the operation that the first device gradually moves out the screen content from a side of the display screen of the first device may include the following two implementations.

Implementation 1: The screen content is gradually moved out from the side of the display screen based on a change of a movement distance of the projecting gesture.

In a moving process of the projecting gesture, the movement distance of the projecting gesture may be determined, and based on the movement distance of the projecting gesture, the screen content is gradually moved out from the side of the display screen. In addition, in the moving process of the projecting gesture, the movement distance of the projecting gesture may be determined in real time, or the movement distance of the projecting gesture may be determined periodically. This is not limited in this embodiment of this application.

In an example, after the movement distance of the projecting gesture is determined, the moving-out proportion of the screen content may be determined based on the movement distance of the projecting gesture and a mapping relationship between a movement distance and a moving-out proportion, and then the screen content is moved out from the side of the display screen based on the moving-out proportion.

In this embodiment of this application, the mapping relationship between a movement distance and a moving-out proportion may be preset. The mapping relationship is used to indicate correspondences between different movement distances and different moving-out proportions, and a larger movement distance indicates a larger moving-out proportion. In addition, a maximum moving-out proportion may be 100%, indicating that the screen content is completely moved out of the display screen.

It should be noted that the mapping relationship between a movement distance and a moving-in proportion may be implemented by using a correspondence, or may be implemented by using a formula. This is not limited in this embodiment of this application. For example, the mapping relationship between a movement distance and a moving-out proportion may include the following forms.

(1) A correspondence between a movement distance and a moving-out proportion includes correspondences between different movement distances and different moving-out proportions.

Refer to Table 1. Table 1 is an example table of the correspondence between a movement distance and a moving-out proportion.

TABLE 1

| Movement distance/cm | 2 | 4 | 6 | 8 | 10 | 12 | 14 | 16 | 18 | 20 |
|---|---|---|---|---|---|---|---|---|---|---|
| Moving-out proportion | 10% | 20% | 30% | 40% | 50% | 60% | 70% | 80% | 90% | 100% |

As shown in Table 1, different movement distances correspond to different moving-out proportions. Each time the movement distance of the projecting gesture increases by 2 cm, the moving-out proportion of the screen content increases by 10% until the screen content is completely moved out. It should be understood that Table 1 is merely an example of the mapping relationship between a movement distance and a moving-out proportion, and does not limit the mapping relationship between a movement distance and a moving-out proportion.

In an example, each time after the movement distance of the projecting gesture is determined, a moving-out proportion corresponding to the current movement distance may be searched for from the mapping relationship between a movement distance and a moving-out proportion. If the moving-out proportion corresponding to the current movement distance is found, the screen content is moved out from the side of the display screen based on the found moving-out proportion. If the moving-out proportion corresponding to the current movement distance is not found, the step of determining the movement distance of the projecting gesture is returned, to continue to determine the movement distance of the projecting gesture.

(2) A correspondence between a movement distance range and a moving-out proportion includes correspondences between different movement distance ranges and different moving-out proportions.

Movement distances are divided into different movement distance ranges, and moving-out proportions respectively corresponding to different movement distance ranges are set, so that a calculation amount of the first device can be reduced, and projection efficiency can be improved.

Refer to Table 2. Table 2 is an example table of the correspondence between a movement distance range and a moving-out proportion.

TABLE 2

| Movement distance/cm | 2 to 4 | 4 to 6 | 6 to 8 | 8 to 10 | 10 to 17 | 17 to 14 | 14 to 16 | 16 to 18 | 18 to 20 | 20 to ∞ |
|---|---|---|---|---|---|---|---|---|---|---|
| Moving-out proportion | 10% | 20% | 30% | 40% | 50% | 60% | 70% | 80% | 90% | 100% |

As shown in Table 2, different movement distance ranges correspond to different moving-out proportions. When the movement distance of the projecting gesture is greater than or equal to 20 cm, the screen content is completely moved out of the display screen. It should be understood that Table 2 is merely an example of the mapping relationship between a movement distance range and a moving-out proportion, and does not limit the mapping relationship between a movement distance range and a moving-out proportion.

In an example, the operation of gradually moving out the screen content from the side of the display screen based on the movement distance of the projecting gesture may include: determining the moving-out proportion of the screen content based on the movement distance of the projecting gesture and a stored correspondence between a movement distance range and a moving-out proportion. The screen content is moved out from the side of the display screen based on the moving-out proportion.

In addition, after the moving-out proportion of the screen content is determined, the determined moving-out proportion may be further compared with a current moving-out proportion of the screen content. If the determined moving-out proportion is the same as the current moving-out proportion, the current moving-out proportion is maintained. If the determined moving-out proportion is different from the current moving-out proportion, the screen content is moved out from the side of the display screen based on the determined moving-out proportion.

(3) A first mapping relationship formula is used to indicate the mapping relationship between a movement distance and a moving-out proportion. In an example, the first mapping relationship formula may be the following formula (1):

$$y = \frac{x}{20} * 100\% \tag{1}$$

x indicates the movement distance of the projecting gesture, and is in cm. y indicates the moving-out proportion of the screen content. It should be understood that the foregoing formula (1) is merely an example of the first mapping relationship formula, and does not limit the first mapping relationship formula.

In an example, the operation of gradually moving out the screen content from the side of the display screen based on the movement distance of the projecting gesture may include: determining the moving-out proportion of the screen content based on the movement distance of the projecting gesture and the first mapping relationship formula. The screen content is moved out from the side of the display screen based on the moving-out proportion.

In a possible implementation, the side that is of the display screen and from which the screen content is moved out may alternatively be determined based on a movement direction of the projecting gesture. For example, a correspondence between a movement direction and each side of the display screen may be preset, and based on the correspondence, the side that is of the display screen and from which the screen content is moved out is determined.

In an example, before the screen content is gradually moved out from the side of the display screen, the movement direction of the projecting gesture is first determined, and then based on the movement direction of the projecting gesture and a stored correspondence between a movement direction and each side of the display screen, the side that is of the display screen and from which the screen content is moved out is determined.

Refer to Table 3. Table 3 is a table of the correspondence between a movement direction and each side of the display screen.

TABLE 3

|  | Movement direction | | | |
| --- | --- | --- | --- | --- |
|  | Forward | Backward | Leftward | Rightward |
| Side of the display screen | Upper side | Lower side | Left side | Right side |

As shown in Table 3, different movement directions correspond to different sides of the display screen, and the side that is of the display screen and from which the screen content is moved out may be determined from Table 3 based on the movement direction of the projecting gesture. It should be understood that Table 3 is merely an example of the correspondence between a movement direction and each side of the display screen, and does not limit the correspondence between a movement direction and each side of the display screen.

Implementation 2: The screen content is gradually moved out from the side of the display screen based on a time change.

the display screen with time. For example, within first preset duration after projection is started, for example, within 2 seconds after projection is started, the screen content is gradually moved out from the side of the display screen with time.

In a possible implementation, the moving-out proportion of the first screen content may be determined based on the duration and a mapping relationship between duration and a moving-out proportion, and then the screen content is gradually moved out from the side of the display screen based on the moving-out proportion. The mapping relationship between duration and a moving-out proportion may be implemented by using a correspondence, or may be implemented by using a formula. This is not limited in this embodiment of this application.

For example, the mapping relationship may be a correspondence between duration and a moving-out proportion, and the correspondence includes correspondences between different pieces of duration and different moving-out proportions. Refer to Table 4. Table 4 is an example table of the correspondence between duration and a moving-out proportion.

TABLE 4

| Duration/s | 0.2 | 0.4 | 0.6 | 0.8 | 1.0 | 1.2 | 1.4 | 1.6 | 1.8 | 2.0 |
| --- | --- | --- | --- | --- | --- | --- | --- | --- | --- | --- |
| Moving-out proportion | 10% | 20% | 30% | 40% | 50% | 60% | 70% | 80% | 90% | 100% |

Alternatively, the mapping relationship may be a correspondence between a duration range and a moving-out proportion, and the correspondence includes correspondences between different duration ranges and moving-out proportions. Refer to Table 5. Table 5 is an example table of the correspondence between a duration range and a moving-out proportion.

TABLE 5

| Duration/s | 0.2 to 0.4 | 0.4 to 0.6 | 0.6 to 0.8 | 0.8 to 1.0 | 1.0 to 1.2 | 1.2 to 1.4 | 1.4 to 1.6 | 1.6 to 1.8 | 1.8 to 2.0 | 2.0 to ∞ |
| --- | --- | --- | --- | --- | --- | --- | --- | --- | --- | --- |
| Moving-out proportion | 10% | 20% | 30% | 40% | 50% | 60% | 70% | 80% | 90% | 100% |

After it is detected that the first device starts projection, the first device may be triggered to gradually move out the screen content from the side of the display screen based on the time change. Certainly, it may alternatively be triggered at another occasion that the screen content is gradually moved out from the side of the display screen. This is not limited in embodiments of this application.

In a possible implementation, when a projecting gesture is recognized, or the screen content is successfully sent to the second device, or a projection success response from the second device is received, it may be determined that the first device starts projection, to trigger that the screen content is gradually moved out from the side of the display screen.

In an example, after the first device detects that the first device starts projection, the first device may determine duration between a current time point and a projection start time point, and gradually moves out the screen content from the side of the display screen based on the duration.

In other words, after projection is started, the first device may gradually move out the screen content from the side of Alternatively, the mapping relationship may be a second mapping relationship formula, and the second mapping relationship formula is used to indicate correspondences between different pieces of duration and different moving-out proportions. For example, the second mapping formula may be the following formula (2):

$$z = \frac{t}{2} * 100$$

t indicates the duration between a current time point and a projection start time point, and is in seconds. z indicates the moving-out proportion of the screen content.

Step 2006: The first device sends a handshake request.

The handshake request is used to request to establish a communication connection to a device that receives the handshake request. In an example, the handshake request carries projection indication information, and the projection indication information is used to indicate that the first device detects the projecting gesture.

In addition, to ensure reliability, after the handshake request is sent, if no handshake confirmation message is received within second preset duration, the first device may further repeatedly send the handshake request.

The second preset duration may be preset, for example, may be set to 3 s or 5 s. A quantity of times of repeatedly sending the handshake request may be a preconfigured quantity of times, for example, may be three times or five times, or the handshake request may be repeatedly sent until the handshake confirmation message is received.

Step 2007: The second device detects the gesture operation.

Step 2008: The second device performs gesture recognition on the detected gesture operation.

It should be noted that step 2007 and step 2008 are similar to step 1806 and step 1807 in the embodiment in FIG. 18. For a specific implementation process, refer to related descriptions of step 1806 and step 1807. Details are not described herein again in this embodiment of this application.

Step 2009: If the second device recognizes a projected gesture, the second device waits to receive the handshake request.

In an example, the operation of waiting to receive the handshake request may include: starting a specified monitoring process, where the specified monitoring process is used to monitor a handshake request sent by another device.

Step 2010: After receiving the handshake request sent by the first device, the second device sends the handshake confirmation message to the first device, where the handshake confirmation message is used to indicate that the communication connection to the first device is successfully established.

In an example, after the second device receives the handshake request sent by the first device, if the handshake request carries the projection indication information, the second device may further first determine whether the projection indication information matches a gesture recognition result of the second device. If the projection indication information matches the gesture recognition result of the second device, the handshake confirmation message is sent to the first device. If the projection indication information does not match the gesture recognition result of the second device, the operation is not performed.

If the gesture recognition result of the second device indicates that a projected gesture is detected, the projection indication information matches the gesture recognition result of the second device. If the gesture recognition result of the second device indicates that no projected gesture is detected, the projection indication information does not match the gesture recognition result of the second device.

It should be noted that, in this embodiment of this application, an example in which the first device for projecting sends the handshake request to the second device for being projected, and the second device performs handshake confirmation is merely used for description. However, in another embodiment, the second device for being projected may alternatively send the handshake request to the first device for projecting, and the first device performs handshake confirmation. This is not limited in this embodiment of this application.

For example, if the second device recognizes the projected gesture, the second device sends the handshake request. If the first device recognizes the projecting gesture, the first device waits to receive the handshake request; and if the first device receives the handshake request sent by the second device, the first device sends the handshake confirmation message to the second device, and successfully establishes the communication connection to the second device.

In an example, a device that sends the handshake request and that is in the first device and the second device may be a small-screen device, and a device that waits to receive the handshake request may be a large-screen device. For example, in a scenario in which a mobile phone performs projection to a smart television, the mobile phone may send a handshake request, and the smart television waits to receive the handshake request to perform handshake confirmation. In a scenario in which a smart television performs projection to a mobile phone, the mobile phone may also send a handshake request, and the smart television waits to receive the handshake request to perform handshake confirmation. A handshake waiting process needs to consume a specific amount of electricity. Therefore, the smart television connected to a power supply waits for a handshake, and the mobile phone initiates the handshake. This can save electricity of the mobile phone and improve user experience.

Step 2011: The first device projects the screen content of the first device to the second device through the communication connection.

For example, the first device may send the screen recording data of the first device, the streaming media data of the screen content, or the content-related information of the screen content to the second device through the communication connection.

It should be noted that the operation of projecting the screen content of the first device to the second device in step 2011 is similar to that in step 1805 in the embodiment in FIG. 18. For a specific implementation process, refer to related descriptions of step 1805. Details are not described herein again in this embodiment of this application.

Step 2012: The second device receives, through the communication connection, the screen content projected by the first device, and gradually moves the screen content into a display screen.

In this embodiment of this application, after the screen content projected by the first device is received, the screen content projected by the first device may be gradually moved into the display screen, and then projection display is performed based on the screen content completely moved into the display screen, to implement a visual effect of gradually projecting the screen content from the first device to the second device based on a projecting gesture, and provide better projection experience for the user.

In a possible implementation, the screen content may be gradually moved in from a side of the display screen of the second device. In an example, the side that is of the display screen and from which the screen content is moved in may be set by default, for example, the side is set by default to an upper side, a lower side, a left side, or a right side of the display screen, or is set by default to a side that is of the display screen and that is close to the first device. In another example, the side that is of the display screen and from which the screen content is moved in may alternatively be determined based on a movement direction of the projecting gesture. Certainly, the side may alternatively be determined in another manner. This is not limited in this embodiment of this application.

It should be noted that the screen content gradually moved into the display screen may be constantly changing display pictures displayed by the first device. In this case, the moved-in screen content is a plurality of frames of pictures that are dynamically played. Alternatively, the screen content gradually moved into the display screen may be a frame of display picture that is being displayed when the first device recognizes the projecting gesture. In this case, the moved-in screen content is a frame of picture that is statically displayed.

In a possible implementation, the screen content may be gradually moved in from the side of the display screen of the second device in a manner of gradually increasing a moving-in proportion. The moving-in proportion is a proportion of a part of the screen content moved into the display screen to the entire part of the screen content.

In an example, the operation of gradually moving in the screen content from a side of the display screen of the second device may include the following two implementations.

Implementation 1: The screen content is gradually moved into the display screen from the side of the display screen based on a change of a movement distance of a projected gesture.

In a moving process of the projected gesture, the movement distance of the projected gesture may be determined, so that the screen content is gradually moved in from the side of the display screen based on the movement distance of the projected gesture.

In the moving process of the projected gesture, the movement distance of the projected gesture may be determined in real time, or the movement distance of the projected gesture may be determined periodically. This is not limited in this embodiment of this application.

In addition, the movement distance of the projected gesture may alternatively be determined based on the movement distance of the projecting gesture. For example, in the moving process of the projected gesture, a gesture recognition result sent by the first device is received, and based on the gesture recognition result, the movement distance of the projected gesture is determined. The gesture recognition result includes the movement distance of the projecting gesture.

In an example, after the movement distance of the projected gesture is determined, the moving-in proportion of the screen content may be determined based on the movement distance of the projected gesture and a correspondence between a movement distance and a moving-in proportion, and then the screen content is gradually moved in from the side of the display screen based on the moving-in proportion.

In this embodiment of this application, a mapping relationship between a movement distance and a moving-in proportion may be preset. The mapping relationship is used to indicate correspondences between different movement distances and different moving-in proportions, and a larger movement distance indicates a larger moving-in proportion. In addition, a maximum moving-in proportion may be 100%, indicating that the screen content is completely moved into the display screen.

It should be noted that the mapping relationship between a movement distance and a moving-in proportion may be implemented by using a correspondence, or may be implemented by using a formula. This is not limited in this embodiment of this application. For example, the mapping relationship between a movement distance and a moving-in proportion may include the following forms.

(1) A correspondence between a movement distance and a moving-in proportion includes correspondences between different movement distances and different moving-in proportions.

Refer to Table 6. Table 6 is an example table of the correspondence between a movement distance and a moving-out proportion.

TABLE 6

| Movement distance/cm | 2 | 4 | 6 | 8 | 10 | 12 | 14 | 16 | 18 | 20 |
|---|---|---|---|---|---|---|---|---|---|---|
| Moving-in proportion | 10% | 20% | 30% | 40% | 50% | 60% | 70% | 80% | 90% | 100% |

As shown in Table 6, different movement distances correspond to different moving-in proportions. Each time the movement distance of the projected gesture increases by 2 cm, the moving-in proportion of the screen content increases by 10% until the screen content is completely moved into the display screen. It should be understood that Table 6 is merely an example of the mapping relationship between a movement distance and a moving-in proportion, and does not limit the mapping relationship between a movement distance and a moving-in proportion.

In an example, each time after the movement distance of the projected gesture is determined, a moving-in proportion corresponding to the current movement distance may be searched for from the mapping relationship between a movement distance and a moving-in proportion. If the moving-in proportion corresponding to the current movement distance is found, the screen content is moved in from the side of the display screen based on the found moving-in proportion. If the moving-in proportion corresponding to the current movement distance is not found, the step of determining the movement distance of the projected gesture is returned, to continue to determine the movement distance of the projected gesture.

(2) A correspondence between a movement distance range and a moving-in proportion includes correspondences between different movement distance ranges and different moving-in proportions.

Movement distances are divided into different movement distance ranges, and moving-in proportions corresponding to different movement distance ranges are set, so that a calculation amount of the second device can be reduced, and projection efficiency can be improved.

Refer to Table 7. Table 7 is an example table of the correspondence between a movement distance range and a moving-in proportion.

TABLE 7

| Movement distance/cm | 2 to 4 | 4 to 6 | 6 to 8 | 8 to 10 | 10 to 12 | 12 to 14 | 14 to 16 | 16 to 18 | 18 to 20 | 20 to ∞ |
|---|---|---|---|---|---|---|---|---|---|---|
| Moving-in proportion | 10% | 20% | 30% | 40% | 50% | 60% | 70% | 80% | 90% | 100% |

As shown in Table 7, different movement distance ranges correspond to different moving-in proportions. When the movement distance of the projected gesture is greater than or equal to 20 cm, the screen content is completely moved into the display screen. It should be understood that Table 7 is merely an example of the mapping relationship between a movement distance range and a moving-in proportion, and does not limit the mapping relationship between a movement distance range and a moving-in proportion.

In an example, the operation of gradually moving in the screen content from the side of the display screen based on the movement distance of the projecting gesture may include: determining the moving-in proportion of the screen content based on the movement distance of the projecting gesture and a stored correspondence between a movement distance range and a moving-in proportion. The screen content is moved in from the side of the display screen based on the moving-in proportion.

In addition, after the moving-in proportion of the screen content is determined, the determined moving-in proportion may be further compared with a current moving-in proportion of the screen content. If the determined moving-in proportion is the same as the current moving-in proportion, the current moving-in proportion is maintained. If the determined moving-in proportion is different from the current moving-in proportion, the screen content is moved in from the side of the display screen based on the determined moving-in proportion.

(3) A third mapping relationship formula is used to indicate the mapping relationship between a movement distance and a moving-in proportion.

For example, the third mapping relationship formula may be shown in the foregoing formula (1). A difference is that, x indicates the movement distance of the projected gesture, and is in cm. y indicates the moving-in proportion of the screen content.

In an example, the operation of gradually moving in the screen content from the side of the display screen based on the movement distance of the projected gesture may include: determining the moving-in proportion of the screen content based on the movement distance of the projected gesture and the third mapping relationship formula. The screen content is moved in from the side of the display screen based on the moving-in proportion.

Implementation 2: The screen content is gradually moved in from the side of the display screen based on a time change.

After the second device receives the screen content projected by the first device, the second device may be triggered to gradually move in the screen content from the side of the display screen based on a time change. For example, within preset duration after the screen content projected by the first device is received, the screen content may be gradually moved in from the side of the display screen with time.

In a possible implementation, after receiving the screen content projected by the first device, the second device may determine duration between a current time point and a time point at which the screen content is received. Then, the screen content is gradually moved into the display screen from the side of the display screen based on the duration.

In an example, a mapping relationship between duration and a moving-in proportion may be preset. After the screen content projected by the first device is received, the moving-in proportion of the first screen content is determined based on the duration and a stored mapping relationship between duration and a moving-in proportion, and then the screen content is gradually moved in from the side of the display screen based on the moving-in proportion.

The mapping relationship between duration and a moving-in proportion may be implemented by using a correspondence, or may be implemented by using a formula. This is not limited in embodiments of this application.

For example, the mapping relationship may be a correspondence between duration and a moving-in proportion, and the correspondence includes correspondences between different pieces of duration and different moving-in proportions. Refer to Table 8. Table 8 is an example table of the correspondence between duration and a moving-in proportion.

TABLE 8

| Duration/s | 0.2 | 0.4 | 0.6 | 0.8 | 1.0 | 1.2 | 1.4 | 1.6 | 1.8 | 2.0 |
|---|---|---|---|---|---|---|---|---|---|---|
| Moving-in proportion | 10% | 20% | 30% | 40% | 50% | 60% | 70% | 80% | 90% | 100% |

Alternatively, the mapping relationship is a correspondence between a duration range and a moving-in proportion, and the correspondence includes correspondences between different duration ranges and moving-in proportions. Refer to Table 9. Table 9 is an example table of the correspondence between a duration range and a moving-in proportion.

TABLE 9

| Duration/s | 0.2 to 0.4 | 0.4 to 0.6 | 0.6 to 0.8 | 0.8 to 1.0 | 1.0 to 1.2 | 1.2 to 1.4 | 1.4 to 1.6 | 1.6 to 1.8 | 1.8 to 2.0 | 2.0 to ∞ |
|---|---|---|---|---|---|---|---|---|---|---|
| Moving-in proportion | 10% | 20% | 30% | 40% | 50% | 60% | 70% | 80% | 90% | 100% |

Alternatively, the mapping relationship may be a fourth mapping relationship formula, and the fourth mapping relationship formula is used to indicate correspondences between different pieces of duration and different moving-in proportions. For example, the fourth mapping formula may be the foregoing formula (2). A difference is that, t indicates the duration between a current time point and a time point at which the screen content is received, and is in seconds. z indicates the moving-in proportion of the screen content.

In a possible implementation, the side that is of the display screen and from which the screen content is moved in may alternatively be determined based on a movement direction of the projected gesture. For example, a correspondence between a movement direction and each side of the display screen may be preset. Before the screen content is gradually moved in from the side of the display screen, the movement direction of the projecting gesture is first determined, and then based on the movement direction of the projecting gesture and a stored correspondence between a movement direction and each side of the display screen, the side that is of the display screen and from which the screen content is moved in is determined.

Refer to Table 10. Table 10 is a table of the correspondence between a movement direction and each side of the display screen.

TABLE 10

|  | Movement direction | | | |
| --- | --- | --- | --- | --- |
|  | Upward/<br>Frontward | Downward/<br>Backward | Leftward | Rightward |
| Side of the<br>display screen | Lower side | Upper side | Right side | Left side |

As shown in Table 10, different movement directions correspond to different sides of the display screen, and the side from which the screen content is moved in may be determined from Table 10 based on the movement direction of the projected gesture. It should be understood that Table 10 is merely an example of the correspondence between a movement direction and each side of the display screen, and does not limit the correspondence between a movement direction and each side of the display screen.

It should be noted that the movement distance of the projecting gesture and the movement distance of the projected gesture in this embodiment of this application each are a movement distance of a gesture operation performed by the user. The movement distance of the gesture operation may be a movement distance of the gesture operation relative to a gesture start location, may be a movement distance of the gesture operation relative to the first device, or may be a movement distance of the gesture operation relative to the second device. This is not limited in this embodiment of this application.

It should be noted that, in this embodiment of this application, an example in which the first device automatically establishes a communication connection to the second device in a handshake confirmation manner after recognizing the projecting gesture, and then performs projection to the second device through the communication connection is merely used for description. However, in another embodiment, a communication connection may alternatively be established in advance before the projecting gesture is recognized. For example, after a gesture projection function is enabled, the first device may be triggered to search for the second device that is in a same local area network as the first device, and then establish a communication connection to the found second device. In other words, step 2006 and step 2010 are optional steps, and may or may not be performed.

It should be further noted that in this embodiment of this application, an example in which the first device is triggered to project the screen content to the second device after the first device is triggered to gradually move out the screen content from the display screen of the first device is merely used for description. However, in another embodiment, the first device may alternatively be triggered to project the screen content to the second device when the first device is triggered to gradually move out the screen content from the display screen of the first device, or the first device may be triggered to project the screen content to the second device before the first device is triggered to gradually move out the screen content from the display screen of the first device. Execution sequences of the two operations are not limited in this embodiment of this application.

In this embodiment of this application, the first device may detect the gesture operation of the user, perform gesture recognition on the detected gesture operation, and trigger the first device to project the screen content to the second device when the projecting gesture is recognized. In this way, the user performs the projection gesture near the first device, to quickly trigger the first device to perform projection, thereby improving projection efficiency and flexibility, and increasing projection manners.

For ease of understanding, the following describes the projection method according to embodiments of this application with reference to the accompanying drawings and an application scenario by using an example in which the first device is a mobile phone and the second device is a smart television.

Figure 21A:
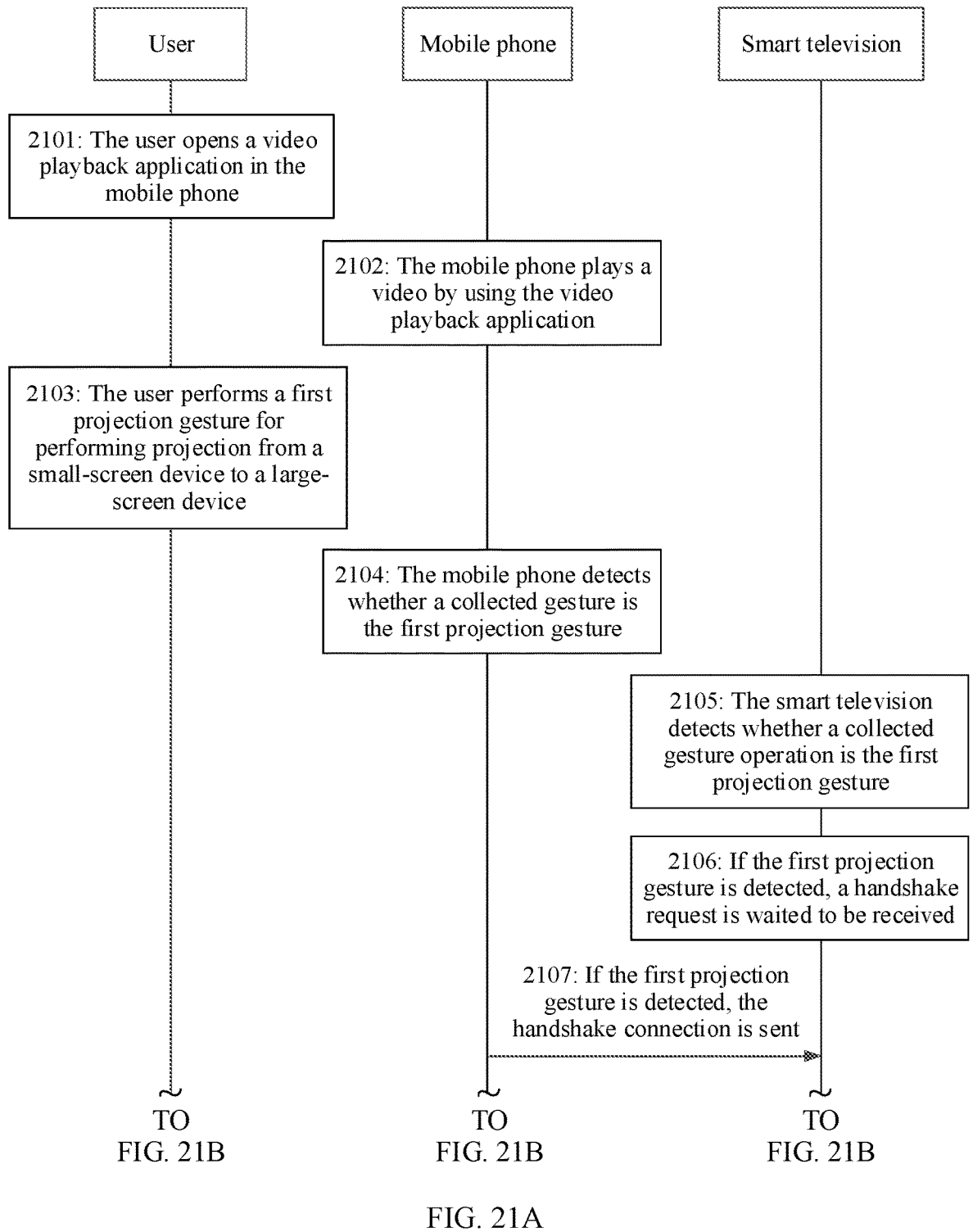
FIG. 21A and FIG. 21B are a schematic flowchart of projecting a video playback interface to a smart television by a mobile phone according to an embodiment of this application.
Figure 21B:
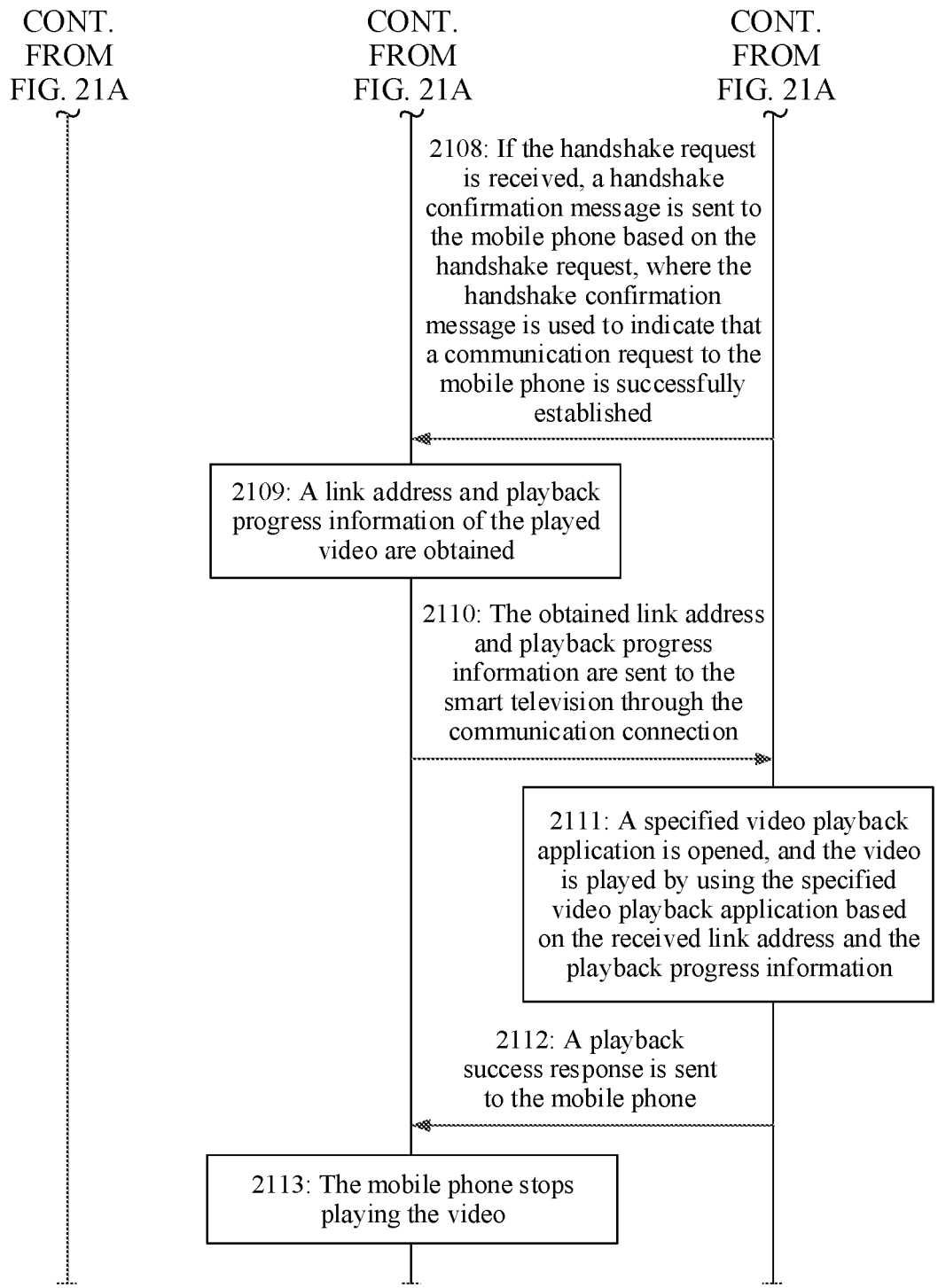

FIG. 21A and FIG. 21B are a schematic flowchart of projecting a video playback interface to a smart television by a mobile phone according to an embodiment of this application. As shown in FIG. 21A and FIG. 21B, a process in which the mobile phone projects the video playback interface to the smart television may include the following steps.

Step 2101: A user opens a video playback application in the mobile phone.

The video playback application may be any video playback application, or may be a specified playback application, such as a Huawei video application.

Step 2102: The mobile phone plays a video by using the video playback application.

Step 2103: The user performs a first projection gesture for performing projection from a small-screen device to a large-screen device.

Step 2104: The mobile phone detects whether a collected gesture is the first projection gesture.

Step 2105: The smart television detects whether a collected gesture operation is the first projection gesture.

Step 2106: If detecting the first projection gesture, the smart television waits to receive a handshake request.

Step 2107: If detecting the first projection gesture, the mobile phone sends the handshake request.

Step 2108: If receiving the handshake request, the smart television sends a handshake confirmation message to the mobile phone, where the handshake confirmation message is used to indicate that a communication request between the smart television and the mobile phone is successfully established.

Step 2109: The mobile phone obtains a link address and playback progress information of the played video.

Step 2110: The mobile phone sends the obtained link address and playback progress information to the smart television through the communication connection.

Step 2111: After receiving the link address and the playback progress information of the video, the smart television opens a specified video playback application, and plays the video by using the specified video playback application based on the received link address and the playback progress information.

Step 2112: The smart television sends a playback success response to the mobile phone.

Step 2113: The mobile phone stops playing the video.

Figure 22A:
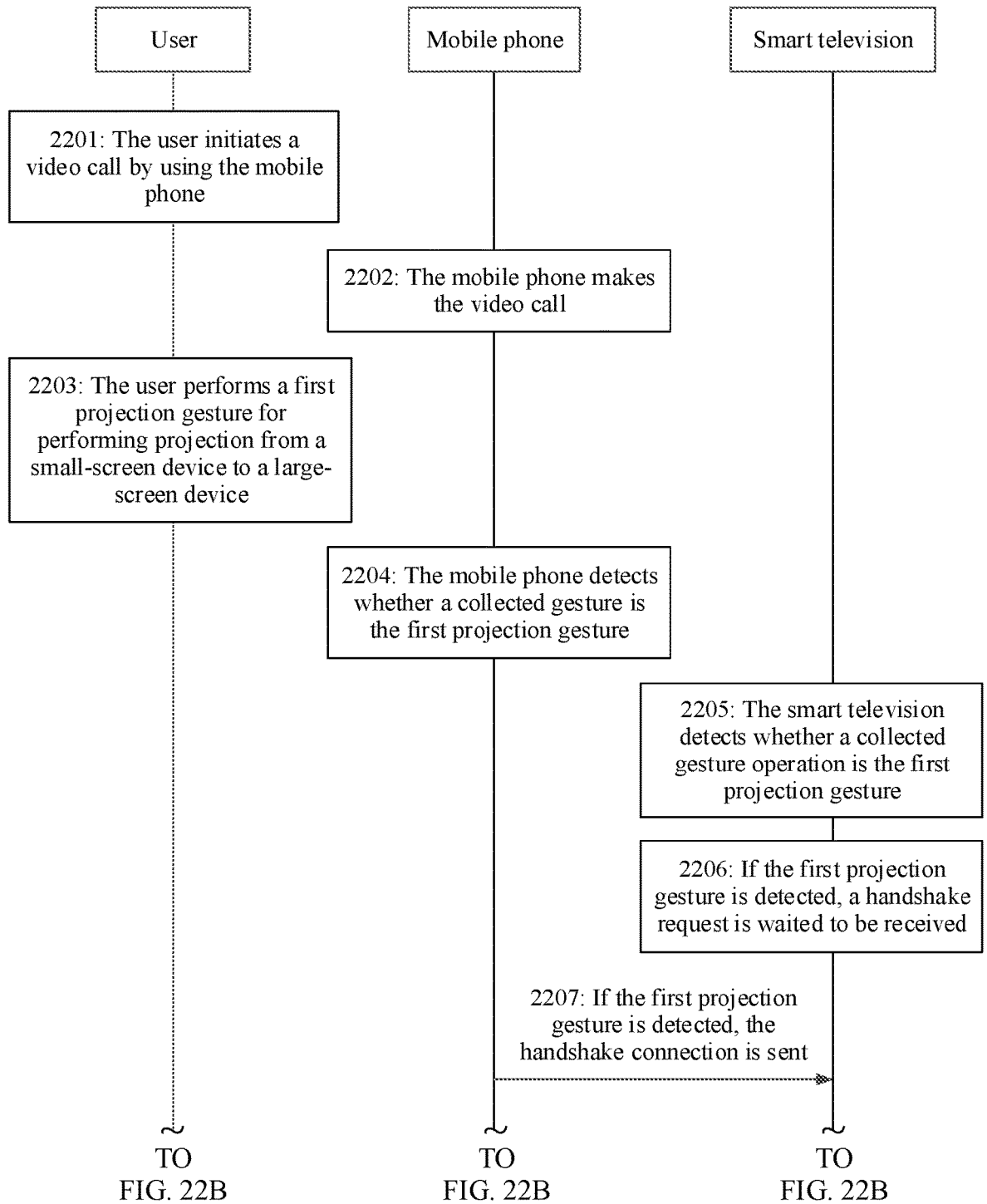
FIG. 22A and FIG. 22B are a schematic flowchart of projecting a video call interface to a smart television by a mobile phone according to an embodiment of this application.
Figure 22B:
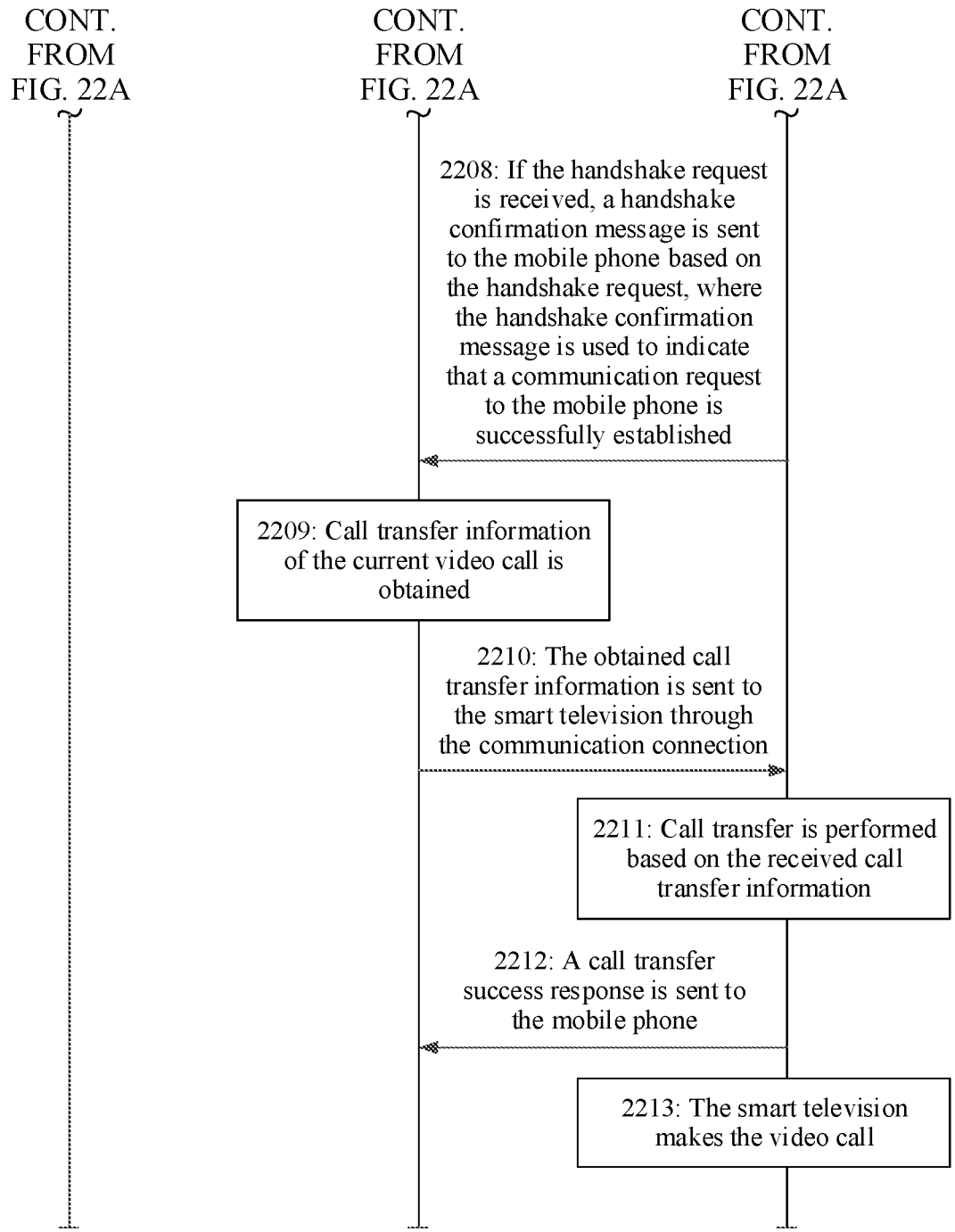

FIG. 22A and FIG. 22B are a schematic flowchart of projecting a video call interface to a smart television by a mobile phone according to an embodiment of this application. As shown in FIG. 22A and FIG. 22B, a process in which the mobile phone projects the video call interface to the smart television may include the following steps.

Step 2201: A user initiates a video call by using the mobile phone.

The user may initiate the video call based on a video call application installed on the mobile phone, or may initiate the video call based on a video call function provided by a system of the mobile phone. This is not limited in this embodiment of this application.

Step 2202: The mobile phone makes the video call with another device.

Step 2203: The user performs a first projection gesture for performing projection from a small-screen device to a large-screen device.

Step 2204: The mobile phone detects whether a collected gesture is the first projection gesture.

Step 2205: The smart television detects whether a collected gesture operation is the first projection gesture.

Step 2206: If detecting the first projection gesture, the smart television waits to receive a handshake request.

Step 2207: If detecting the first projection gesture, the mobile phone sends the handshake request.

Step 2208: If receiving the handshake request, the smart television sends a handshake confirmation message to the mobile phone, where the handshake confirmation message is used to indicate that a communication connection between the smart television and the mobile phone is successfully established.

Step 2209: The mobile phone obtains call transfer information of the current video call.

Step 2210: The mobile phone sends the obtained call transfer information to the smart television through the communication connection.

Step 2211: The smart television performs call transfer of the video call based on the received call transfer information.

Step 2212: The smart television sends a transfer success response to the mobile phone.

The transfer success response is used to indicate that the smart television successfully performs call transfer.

After receiving the transfer success response sent by the smart television, the mobile phone stops the video call.

Step 2213: The smart television makes the video call.

Figure 23A:
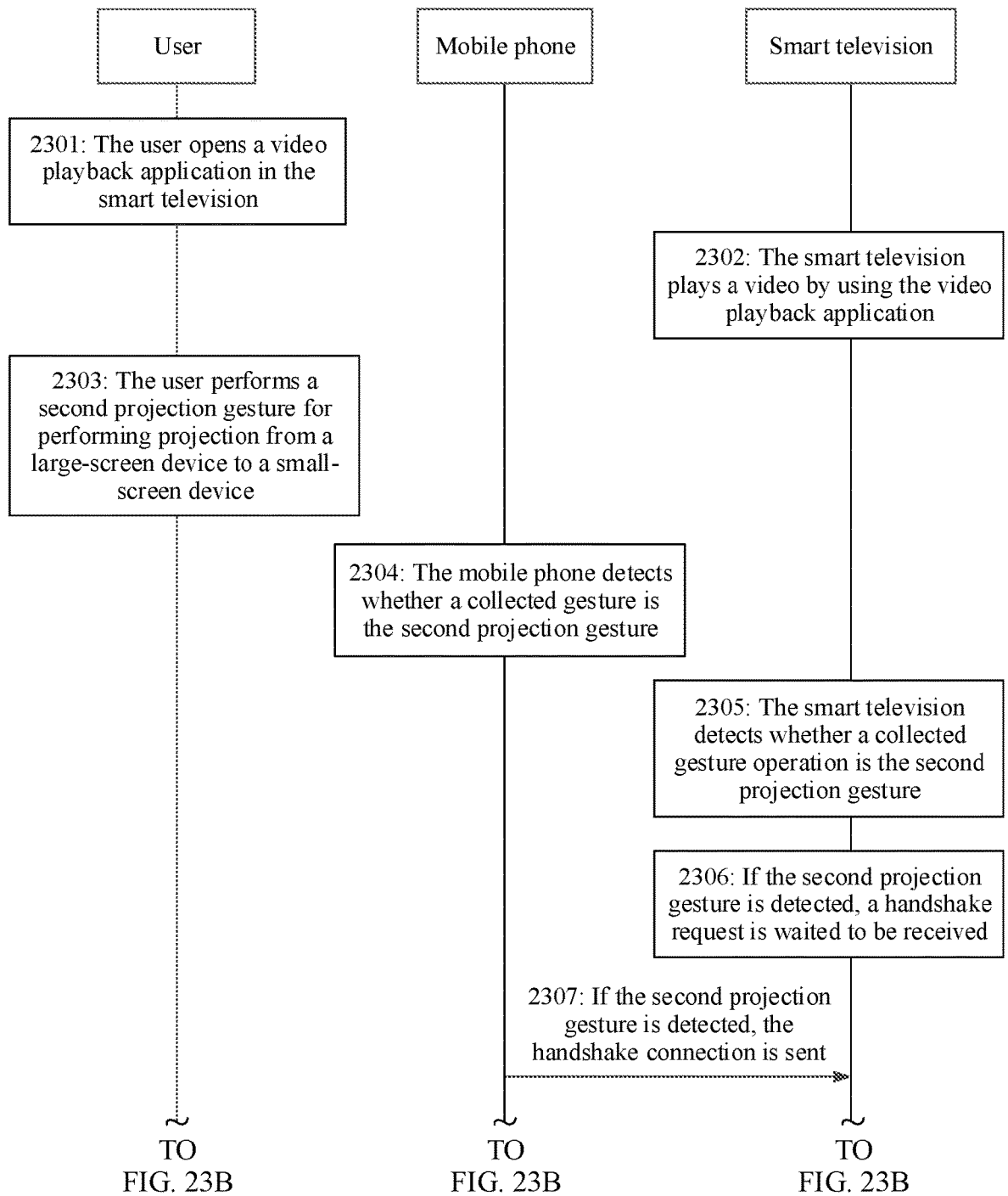
FIG. 23A and FIG. 23B are a schematic flowchart of projecting a video playback interface to a mobile phone by a smart television according to an embodiment of this application.
Figure 23B:
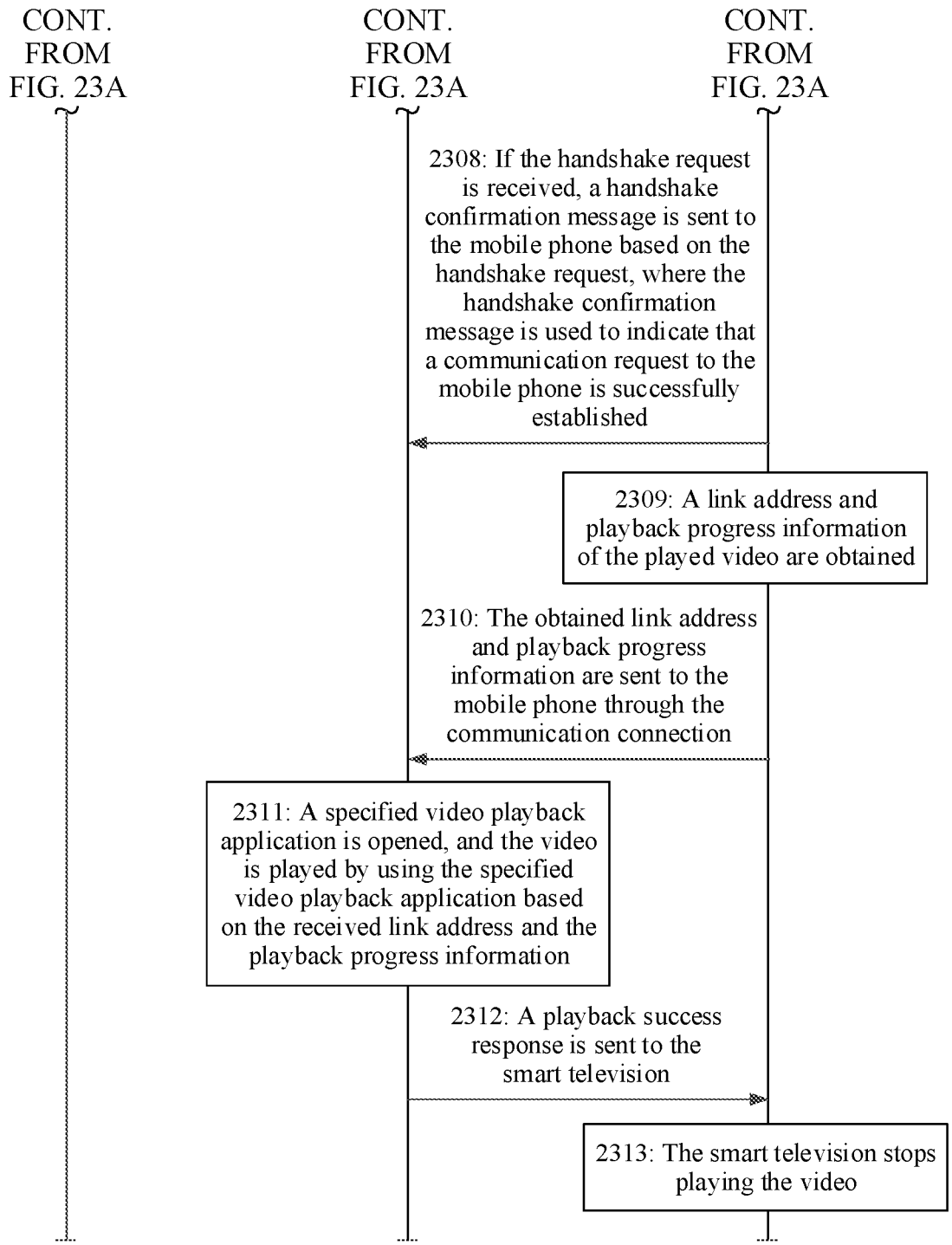

FIG. 23A and FIG. 23B are a schematic flowchart of projecting a video playback interface to a mobile phone by a smart television according to an embodiment of this application. As shown in FIG. 23A and FIG. 23B, a process in which the smart television projects the video playback interface to the mobile phone may include the following steps.

Step 2301: A user opens a video playback application in the smart television.

The video playback application may be any video playback application, or may be a specified playback application, such as a Huawei video application.

Step 2302: The smart television plays a video by using the video playback application.

Step 2303: The user performs a second projection gesture for performing projection from a large-screen device to a small-screen device.

Step 2304: The mobile phone detects whether a collected gesture is the second projection gesture.

Step 2305: The smart television detects whether a collected gesture operation is the second projection gesture.

Step 2306: If detecting the second projection gesture, the smart television waits to receive a handshake request.

Step 2307: If detecting the second projection gesture, the mobile phone sends the handshake request.

Step 2308: If receiving the handshake request, the smart television sends a handshake confirmation message to the mobile phone, where the handshake confirmation message is used to indicate that a communication connection between the smart television and the mobile phone is successfully established.

Step 2309: The smart television obtains a link address and playback progress information of the played video.

Step 2310: The smart television sends the obtained link address and playback progress information to the mobile phone through the communication connection.

Step 2311: After receiving the link address and the playback progress information of the video, the mobile phone opens a specified video playback application, and plays the video by using the specified video playback application based on the received link address and the playback progress information.

Step 2312: The mobile phone sends a playback success response to the smart television.

Step 2313: The smart television stops playing the video.

Figure 24A:
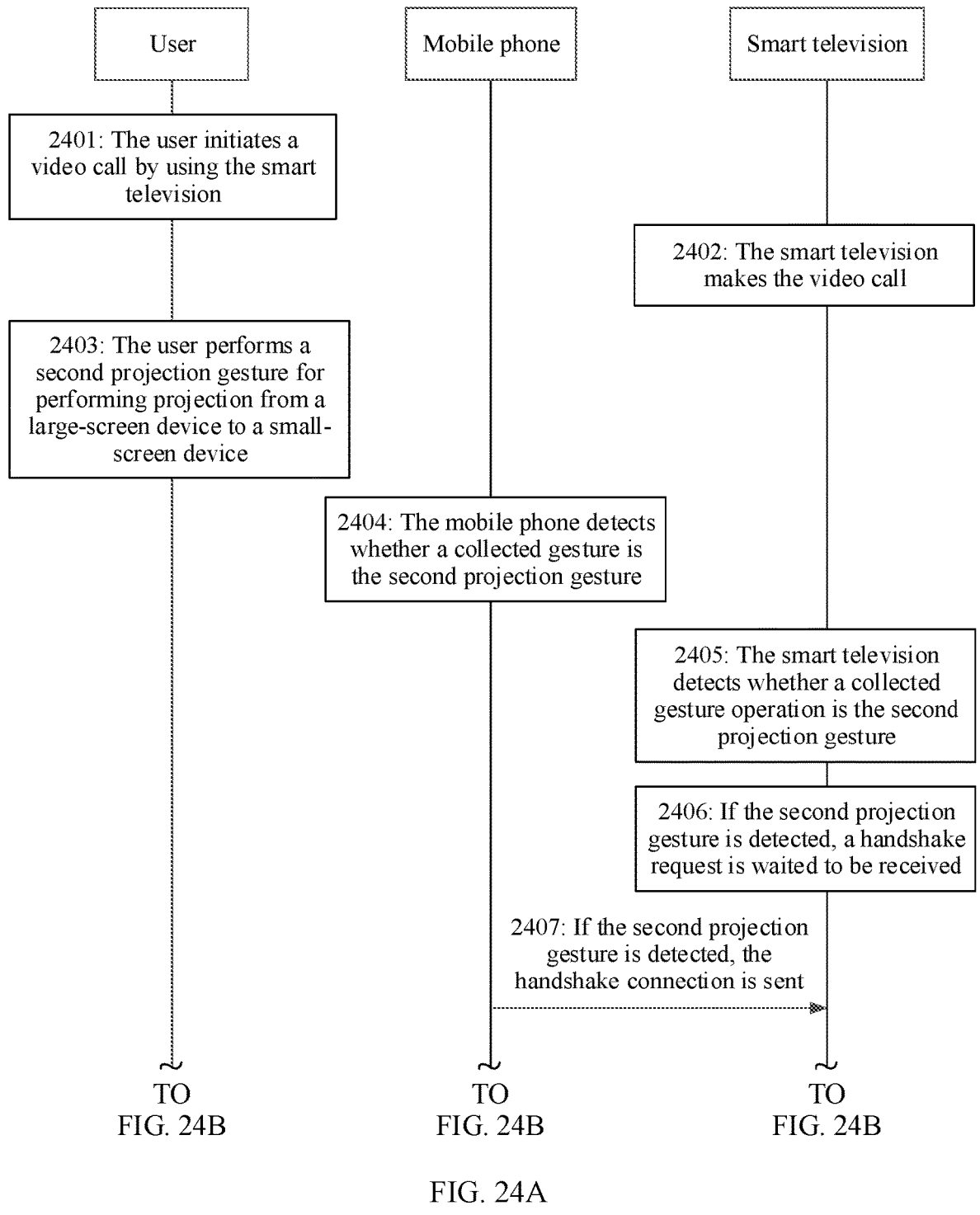
FIG. 24A and FIG. 24B are a schematic flowchart of projecting a video call interface to a mobile phone by a smart television according to an embodiment of this application.
Figure 24B:
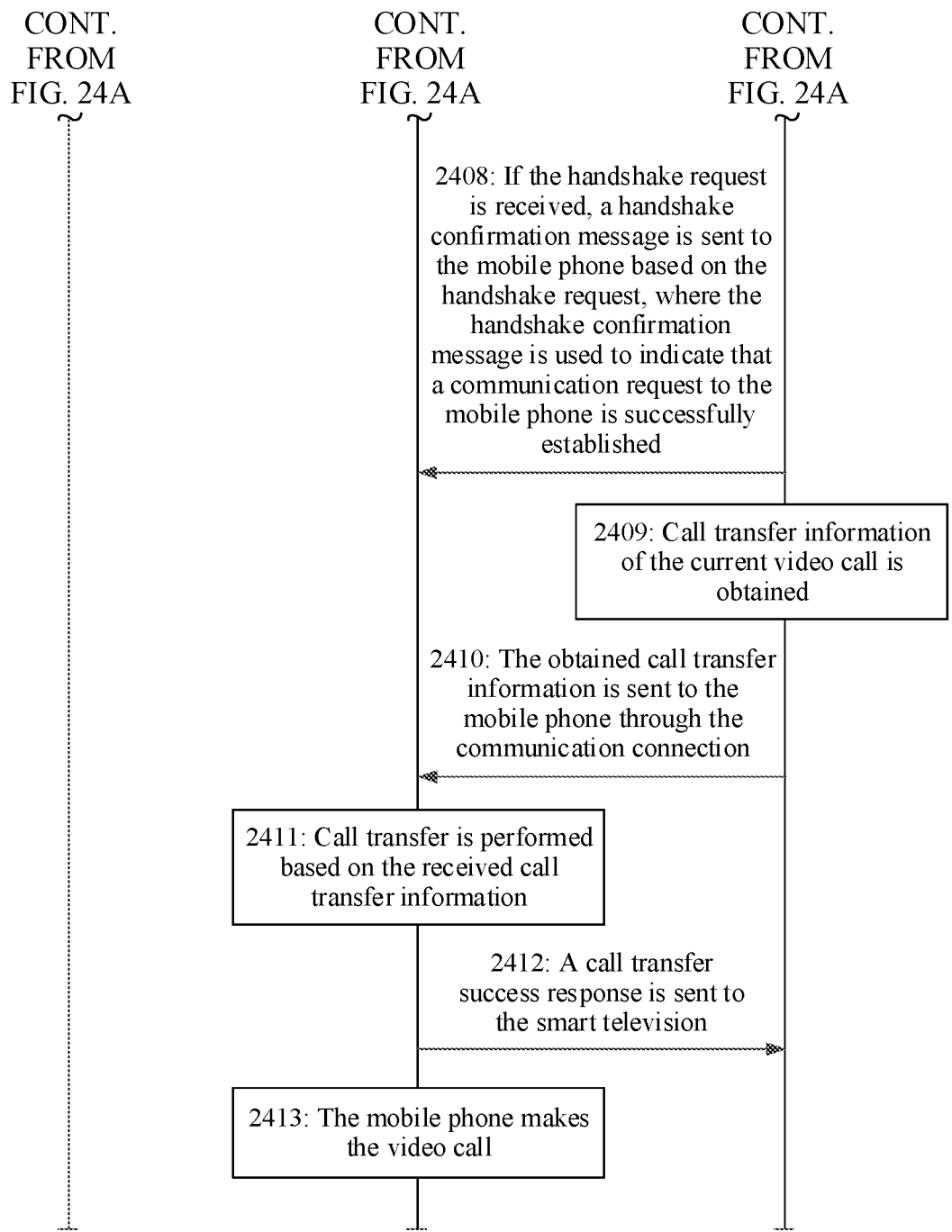

FIG. 24A and FIG. 24B are a schematic flowchart of projecting a video call interface to a mobile phone by a smart television according to an embodiment of this application. As shown in FIG. 24A and FIG. 24B, a process in which the smart television projects the video call interface to the mobile phone may include the following steps.

Step 2401: A user initiates a video call by using the smart television.

The user may initiate the video call based on a video call application installed on the smart television, or may initiate the video call based on a video call function provided by a system of the smart television. This is not limited in this embodiment of this application.

Step 2402: The smart television makes the video call with another device.

Step 2403: The user performs a second projection gesture for performing projection from a large-screen device to a small-screen device.

Step 2404: The mobile phone detects whether a collected gesture is the second projection gesture.

Step 2405: The smart television detects whether a collected gesture operation is the second projection gesture.

Step 2406: If detecting the second projection gesture, the smart television waits to receive a handshake request.

Step 2407: If detecting the second projection gesture, the mobile phone sends the handshake request.

Step 2408: If receiving the handshake request, the smart television sends a handshake confirmation message to the mobile phone, where the handshake confirmation message is used to indicate that a communication connection between the smart television and the mobile phone is successfully established.

Step 2409: The smart television obtains call transfer information of the current video call.

Step 2410: The smart television sends the obtained call transfer information to the mobile phone through the communication connection.

Step 2411: The mobile phone performs call transfer of the video call based on the received call transfer information.

Step 2412: The mobile phone sends a transfer success response to the smart television.

The transfer success response is used to indicate that the smart television successfully performs call transfer.

After receiving the transfer success response send by the mobile phone, the smart television stops the video call.

Step 2413: The mobile phone makes the video call.

It can be learned from FIG. 21A and FIG. 21B and FIG. 22A and FIG. 22B that the user may project the video playback interface or the video call interface of the mobile phone to the smart television by performing the first projection gesture for performing projection from the small-screen device to the large-screen device. It can be learned from FIG. 23A and FIG. 23B and FIG. 24A and FIG. 24B that the user may also project the video playback interface or the video call interface of the smart television to the mobile phone by performing the second projection gesture for performing projection from the large-screen device to the small-screen device.

Figure 25:
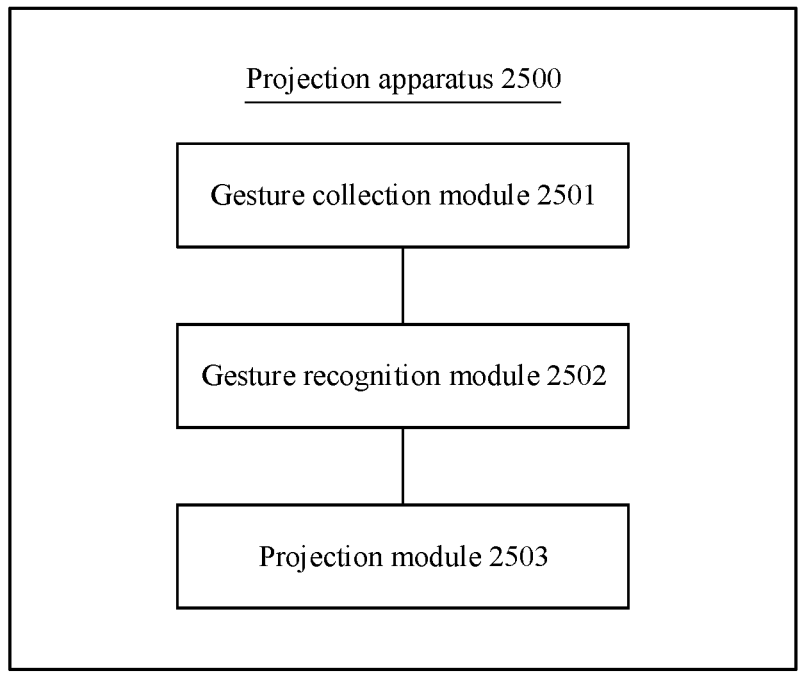
FIG. 25 is a schematic diagram of a projection apparatus according to an embodiment of this application.

FIG. 25 is a schematic diagram of a projection apparatus 2500 according to an embodiment of this application. The projection apparatus 2500 may be implemented as a part or all of an electronic device by using software, hardware, or a combination thereof. The electronic device may be the first device 10 shown in FIG. 1. As shown in FIG. 25, the projection apparatus 2500 includes:
- a gesture collection module 2501, configured to perform step 1803 in the embodiment in FIG. 18 or step 2003 in the embodiment in FIG. 20A;
- a gesture recognition module 2502, configured to perform step 1804 in the embodiment in FIG. 18 or step 2004 in the embodiment in FIG. 20A; and
- a projection module 2503, configured to perform step 1805 in the embodiment in FIG. 18.

Optionally, a projecting gesture is a gesture in which a palm faces the first device and moves away from the first device. Alternatively, a projecting gesture is a gesture in which a back of a hand faces the first device and moves away from the first device.

Optionally, the projection apparatus further includes a moving-out module configured to perform step 2005 in the embodiment in FIG. 20A.

Optionally, the moving-out module is configured to:
- determine a movement distance of the projecting gesture in a moving process of the projecting gesture; and
- gradually move out screen content from a side of a display screen based on the movement distance of the projecting gesture.

Optionally, the moving-out module is configured to:
- determine a moving-out proportion of the screen content based on the movement distance of the projecting gesture and a stored correspondence between a movement distance range and a moving-out proportion, where the moving-out proportion is a proportion of a part of the screen content moved out of the display screen to an entire part of the screen content; and
- move out the screen content from the side of the display screen based on the moving-out proportion.

Optionally, the moving-out module is configured to:
- determine a movement direction of the projecting gesture; and
- determine, based on the movement direction of the projecting gesture and a stored correspondence between a movement direction and each side of the display screen, the side that is of the display screen and from which the screen content is moved out.

Optionally, the moving-out module is configured to:
- if the screen content is successfully sent to a second device, or a projection success response from a second device is received, determine that the first device starts projection;
- after the first device starts projection, determine duration between a current time point and a projection start time point; and
- gradually move out the screen content from the side of the display screen based on the duration.

Optionally, the moving-out module is configured to:
- determine a moving-out proportion of the first screen content based on the duration and a stored correspondence between a duration range and a moving-out proportion, where the moving-out proportion is a proportion of a part of the screen content moved out of the display screen to an entire part of the screen content; and
- gradually move out the screen content from the side of the display screen based on the moving-out proportion.

Optionally, the projection module 2503 is configured to:
- perform screen recording on the display screen of the first device, and send screen recording data to the second device; or
- obtain streaming media data of the screen content of the first device, and send the streaming media data to the second device; or
- obtain content-related information of the screen content of the first device, and send the content-related information to the second device, where the content-related information is used to indicate the screen content.

Optionally, the projection module 2503 is configured to:
- if the first device is playing a multimedia file, obtain file-related information of the multimedia file, and send the file-related information of the multimedia file to the second device, where the file-related information includes at least a link address of the multimedia file; or
- if the first device is making a video call, obtain call transfer information of the video call, and send the call transfer information to the second device.

Optionally, the projection apparatus further includes:
- a sending module, configured to perform step 2006 in the embodiment in FIG. 20A;
- a receiving module, configured to perform step 2010 in the embodiment in FIG. 20B; and
- a projection device 2503, configured to perform step 2011 in the embodiment in FIG. 20B.

Optionally, the handshake request carries projection indication information, the projection indication information is used to indicate that the first device detects the projecting gesture, and the handshake confirmation information is sent by the second device after it is determined that the projection indication information matches a gesture operation detected by the second device.

Optionally, the sending module is further configured to send a gesture recognition result to the second device.

Optionally, the gesture collection module 2501 is configured to capture, by using a photographing assembly, an image including the gesture operation.

The gesture recognition module 2502 is configured to perform image analysis on the captured image to obtain the gesture recognition result.

In this embodiment of this application, the first device may detect the gesture operation of the user, perform gesture recognition on the detected gesture operation, and trigger the first device to project the screen content to the second device when the projecting gesture is recognized. In this way, the user performs the projection gesture near the first device, to quickly trigger the first device to perform projection, thereby improving projection efficiency and flexibility, and increasing projection manners.

Figure 26:
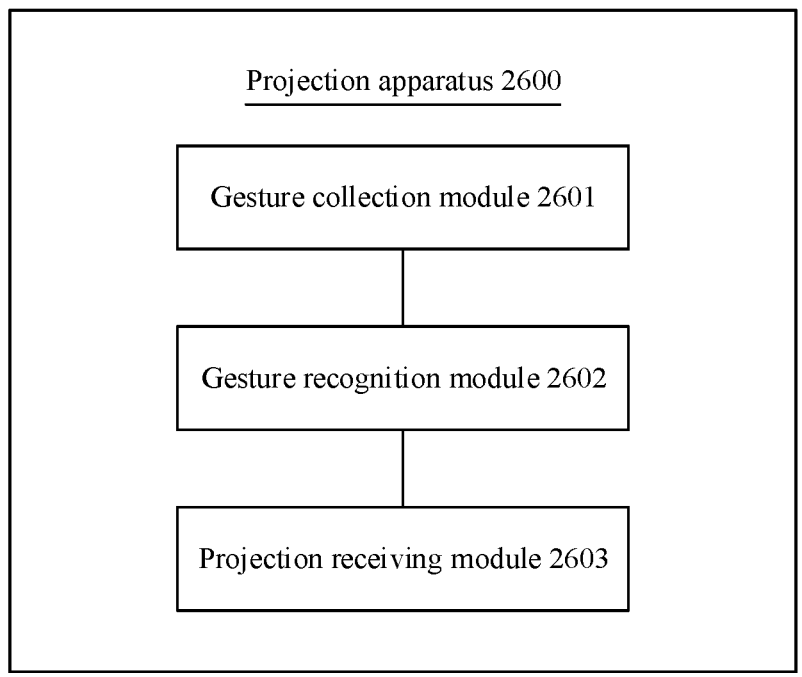
FIG. 26 is a schematic diagram of another projection apparatus according to an embodiment of this application.

FIG. 26 is a schematic diagram of another projection apparatus 2600 according to an embodiment of this application. The projection apparatus 2600 may be implemented as a part or all of an electronic device by using software, hardware, or a combination thereof. The electronic device may be the second device 20 shown in FIG. 1. As shown in FIG. 26, the projection apparatus 2600 includes:

a gesture collection module 2601, configured to perform step 1806 in the embodiment in FIG. 18 or step 2007 in the embodiment in FIG. 20A;

a gesture recognition module 2602, configured to perform step 1807 in the embodiment in FIG. 18 or step 2008 in the embodiment in FIG. 20A; and a projection receiving module 2603, configured to perform step 1808 in the embodiment in FIG. 18.

Optionally, a projected gesture is a gesture in which a back of a hand faces the second device and moves closer to the second device. Alternatively, a projected gesture is a gesture in which a palm faces the second device and moves closer to the second device.

Optionally, the projection receiving module 2603 is configured to perform step 2012 in the embodiment in FIG. 20B.

Optionally, the projection receiving module 2603 is configured to:

determine a movement distance of the projected gesture in a moving process of the projected gesture; and gradually move in screen content to a display screen from a side of the display screen based on the movement distance of the projected gesture.

Optionally, the projection receiving module 2603 is configured to:

determine a moving-in proportion of the screen content based on the movement distance of the projected gesture and a stored correspondence between a movement distance range and a moving-in proportion, where the moving-in proportion is a proportion of a part of the screen content moved into the display screen to an entire part of the screen content; and move in the screen content from the side of the display screen based on the moving-in proportion.

Optionally, the projection receiving module 2603 is configured to:

in the moving process of the projected gesture, receive a gesture recognition result sent by a first device; and determine the movement distance of the projected gesture based on the gesture recognition result.

Optionally, the projection receiving module 2603 is configured to:

determine a movement direction of the projected gesture; and determine, based on the movement direction of the projected gesture and a stored correspondence between a movement direction and each side of the display screen, the side that is of the display screen and from which the screen content is moved in.

Optionally, the projection receiving module 2603 is configured to:

after receiving the screen content projected by the first device, determine duration between a current time point and a time point at which the screen content is received; and gradually move in the screen content to the display screen from the side of the display screen based on the duration.

Optionally, the projection receiving module 2603 is configured to:

determine a moving-in proportion of the screen content based on the duration and a stored correspondence between a duration range and a moving-in proportion, where the moving-in proportion is a proportion of a part of the screen content moved into the display screen to an entire part of the screen content; and gradually move in the screen content to the display screen from the side of the display screen based on the moving-in proportion.

Optionally, the projection receiving module 2603 is configured to:

receive screen recording data sent by the first device, and play the screen recording data, where the screen recording data is obtained by the first device by performing screen recording on a display screen of the first device; or receive streaming media data that is of the screen content and that is sent by the first device, and play the streaming media data; or receive content-related information that is of the screen content and that is sent by the first device, and display the screen content based on the content-related information, where the content-related information is used to indicate the screen content.

Optionally, the projection receiving module 2603 is configured to:

if the content-related information is file-related information of a multimedia file being played by the first device, and the file-related information includes at least a link address of the multimedia file, obtain the multimedia file based on the link address, and play the multimedia file; or if the content-related information is call transfer information of a video call being made by the first device, transfer the video call of the first device to the second device based on the call transfer information, and display a video call interface obtained after call transfer.

Optionally, the projection apparatus further includes:

a receiving module, configured to perform step 2009 in the embodiment in FIG. 20B;

a sending module, configured to perform step 2010 in the embodiment in FIG. 20B; and the projection receiving module 2603, configured to receive, through a communication connection, the screen content projected by the first device.

Optionally, the handshake request carries projection indication information. The projection indication information is used to indicate that the first device detects a projecting gesture.

The sending module is configured to: if it is determined that the projection indication information matches a gesture recognition result of the second device, send a handshake confirmation message to the first device.

Optionally, the gesture collection module 2601 is configured to capture, by using a photographing assembly, an image including a gesture operation.

The gesture recognition module 2602 is configured to perform image analysis on the captured image to obtain the gesture recognition result.

In this embodiment of this application, the second device may detect a gesture operation of a user, perform gesture recognition on the detected gesture operation, and when recognizing the projecting gesture, trigger to receive the screen content projected by the first device, and display the projected screen content. In this way, the user performs a projection gesture near the first device and the second device, to quickly trigger the first device to perform projection to the second device, thereby improving projection efficiency and flexibility, and increasing projection manners.

It should be noted that, when the projection apparatuses according to the foregoing embodiments perform projection, division of the foregoing functional modules is merely taken as an example for illustration. During actual application, the foregoing functions can be allocated to different functional modules and implemented according to a requirement, that is, an inner structure of an apparatus is divided into different functional modules to implement all or part of the functions described above. In addition, the projection apparatuses according to the foregoing embodiments and the projection method embodiments pertain to a same concept. For a specific implementation process of the projection apparatuses, refer to the method embodiments. Details are not described herein again.

The foregoing descriptions are embodiments of this application, but are not intended to limit this application. Any modification, equivalent replacement, or improvement made without departing from the spirit and principle of this application should fall within the protection scope of this application.

What is claimed is:

1. A projection method comprising:
    displaying, by a first device of a projection system, first content;
    detecting, by the first device, a first gesture operation;
    identifying, by the first device, the detected first gesture operation, wherein the first gesture operation is a continuous and moving gesture operation;
    detecting, by a second device, the first gesture operation;
    establishing, by the second device, a communication connection to the first device;
    identifying, by the second device, whether the detected first gesture operation is a projected gesture or a projecting gesture;
        in response to identifying that the first gesture operation is a projected gesture:
        receiving, by the second device, the first content displayed by the first device; and
        displaying the first content on the second device; and
        in response to identifying that the first gesture operation is a projecting gesture:
        sending, by the first device, a handshake request to the second device to establish a communication connection to the second device;
        receiving, by the second device, the handshake request sent by the first device;
        sending a handshake confirmation message to the first device based on the handshake request to indicate that the communication connection between the first device and the second device is successfully established;
        receiving, by the first device, the handshake confirmation message sent by the second device; and
        projecting, by the first device to the second device through the communication connection, the first content displayed by the first device.

2. The method according to claim 1, wherein the projecting, to the second device, the first content displayed by the first device comprises:
    moving out, by the first device, the first content from a side of a display screen of the first device in a moving process of the first gesture operation, wherein a proportion of the first content that moves out from the display screen of the first device is associated with a movement distance of the first gesture operation relative to the first device.

3. The method according to claim 1, wherein the receiving the first content projected by the first device, and displaying the first content on the second device comprises:
    moving in, by the second device, the first content from a side of a display screen of the second device in a moving process of the first gesture operation, wherein a proportion of the first content to the display screen of the second device is associated with a movement distance of the first gesture operation relative to the second device.

4. The method according to claim 2, wherein the moving out, by the first device, the first content from a side of a display screen of the first device in a moving process of the first gesture operation comprises:
    determining, by the first device in the moving process of the first gesture operation, the movement distance of the first gesture operation relative to the first device; and
    determining, by the first device based on the movement distance of the first gesture operation relative to the first device, and a prestored mapping relationship between a movement distance of the first gesture operation relative to the first device and a proportion of the first content that moves out from the display screen of the first device, the proportion of the first content that moves out from the display screen of the first device.

5. The method according to claim 3, wherein the moving in, by the second device, the first content from a side of a display screen of the second device in a moving process of the first gesture operation comprises:
    determining, by the second device in the moving process of the first gesture operation, the movement distance of the first gesture operation relative to the second device; and
    determining, by the second device based on the movement distance of the first gesture operation relative to the second device, and a prestored mapping relationship between a movement distance of the first gesture operation relative to the second device and a proportion of the first content that moves in to the display screen of the second device, the proportion of the first content that moves in to the display screen of the second device.

6. The method according to claim 1, wherein after recognizing the detected first gesture operation, the method further comprises:
    sending, by the first device, a recognition result of the first gesture operation to the second device; and receiving, by the second device, the recognition result of the first gesture operation sent by the first device.

7. The method according to claim 2, wherein before the moving out the first content from a side of a display screen of the first device, the method further comprises:
determining, by the first device, a movement direction of the first gesture operation; and
determining, by the first device based on the movement direction of the first gesture operation and a prestored mapping relationship between a movement direction of the first gesture operation and each side of the display screen of the first device, the side of the display screen of the first device and from which the first content is moved out.

8. The method according to claim 3, wherein before the moving in the first content from a side of a display screen of the second device, the method further comprises:
determining, by the second device, a movement direction of the first gesture operation; and
determining, by the second device based on the movement direction of the first gesture operation and a prestored mapping relationship between a movement direction of the first gesture operation and each side of the display screen of the second device, the side of the display screen of the second device and from which the first content is moved in.

9. The method according to claim 1, wherein the projecting, to the second device, the first content displayed by the first device comprises one of:
performing, by the first device, screen recording on the first content displayed by the first device, and sending screen recording data to the second device;
obtaining, by the first device, streaming media data of the first content displayed by the first device, and sending the streaming media data to the second device; or
obtaining, by the first device, content-related information of the first content displayed by the first device, and sending the content-related information to the second device.

10. The method according to claim 1, wherein the detecting, by the first device, a first gesture operation, and recognizing the detected first gesture operation comprises:
capturing, by the first device by using a photographing assembly, an image comprising the first gesture operation, and performing image analysis on the captured image to obtain a gesture recognition result; and
the detecting, by the second device, the first gesture operation, and recognizing the detected first gesture operation comprises:
capturing, by the second device by using a photographing assembly, an image comprising the first gesture operation, and performing image analysis on the captured image to obtain a gesture recognition result.

11. A projection system, wherein the projection system comprises a first device and a second device;
the first device is configured to:
display first content;
detect a first gesture operation; and
identify the detected first gesture operation, wherein the first gesture operation is a continuous and moving gesture operation;
the second device is configured to:
detect the first gesture operation;
establish a communication connection to the first device;
identify whether the detected first gesture operation is a projected gesture or a projecting gesture, wherein the second device establishes a communication connection to the first device;
in response to identifying that the first gesture operation is a projected gesture, the second device is further configured to:
receive the first content projected by the first device, and display the first content on the second device;
in response to identifying that the first gesture operation is a projecting gesture:
the first device is configured to:
project, to the second device, the first content displayed by the first device; and
send a handshake request to the second device, wherein the handshake request is used to request to establish a communication connection to the second device;
the second device is further configured to:
receive the handshake request sent by the first device, and send a handshake confirmation message to the first device based on the handshake request, wherein the handshake confirmation message indicates that the communication connection between the first device and the second device is successfully established;
the first device is further configured to:
receive the handshake confirmation message sent by the second device; and
project, to the second device through the communication connection, the first content displayed by the first device.

12. The projection system according to claim 11, wherein the first device is configured to move out the first content from a side of a display screen of the first device in a moving process of the first gesture operation, wherein a proportion of the first content that moves out from the display screen of the first device is associated with a movement distance of the first gesture operation relative to the first device.

13. The projection system according to claim 11, wherein the second device is configured to move in the first content from a side of a display screen of the second device in a moving process of the first gesture operation, wherein a proportion of the first content to the display screen of the second device is associated with a movement distance of the first gesture operation relative to the second device.

14. The projection system according to claim 12, wherein the first device is configured to: determine, in the moving process of the first gesture operation, the movement distance of the first gesture operation relative to the first device; and determine, based on the movement distance of the first gesture operation relative to the first device, and a prestored mapping relationship between a movement distance of the first gesture operation relative to the first device and a proportion of the first content that moves out from the display screen of the first device, the proportion of the first content that moves out from the display screen of the first device.

15. The projection system according to claim 13, wherein the second device is configured to: determine, in the moving process of the first gesture operation, the movement distance of the first gesture operation relative to the second device; and determine, based on the movement distance of the first gesture operation relative to the second device, and a prestored mapping relationship between a movement distance of the first gesture operation relative to the second device and a proportion of the first content that moves in to the display screen of the second device, the proportion of the first content that moves in to the display screen of the second device.

16. The projection system according to claim 11, wherein the first device is further configured to send a recognition result of the first gesture operation to the second device; and the second device is further configured to receive the recognition result of the first gesture operation sent by the first device.

17. The projection system according to claim 12, wherein the first device is further configured to: determine a movement direction of the first gesture operation; and determine, based on the movement direction of the first gesture operation and a prestored mapping relationship between a movement direction of the first gesture operation and each side of the display screen of the first device, the side that is of the display screen of the first device and from which the first content is moved out.

18. The projection system according to claim 13, wherein the second device is further configured to: determine a movement direction of the first gesture operation; and determine, based on the movement direction of the first gesture operation and a prestored mapping relationship between a movement direction of the first gesture operation and each side of the display screen of the second device, the side of the display screen of the second device and from which the first content is moved in.

19. The projection system according to claim 11, wherein the first device is configured to:

perform screen recording on the first content displayed by the first device, and send screen recording data to the second device;

obtain streaming media data of the first content displayed by the first device, and send the streaming media data to the second device; or obtain content-related information of the first content displayed by the first device, and send the content-related information to the second device.

20. The projection system according to claim 11, wherein the first device is configured to: capture, by using a photographing assembly, an image comprising the first gesture operation, and perform image analysis on the captured image to obtain a gesture recognition result; and the second device is configured to: capture, by using a photographing assembly, an image comprising the first gesture operation, and perform image analysis on the captured image to obtain a gesture recognition result.

* * * * *